(12) United States Patent
Wang et al.

(10) Patent No.: US 11,318,413 B2
(45) Date of Patent: May 3, 2022

(54) SWING ADSORPTION PROCESSES USING ZEOLITE STRUCTURES

(71) Applicant: ExxonMobil Upstream Research Company, Spring, TX (US)

(72) Inventors: Yu Wang, Lebanon, NJ (US); Harry W. Deckman, Clinton, NJ (US); Ashley M. Wittrig, Washington, NJ (US); Karl G. Strohmaier, Port Murray, NJ (US); Daniel P. Leta, Flemington, NJ (US); Peter I. Ravikovitch, Princeton, NJ (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 16/792,752

(22) Filed: Feb. 17, 2020

(65) Prior Publication Data
US 2020/0179870 A1    Jun. 11, 2020

Related U.S. Application Data

(62) Division of application No. 15/669,161, filed on Aug. 4, 2017, now Pat. No. 10,603,626.
(Continued)

(51) Int. Cl.
*B01D 53/02* (2006.01)
*B01D 53/26* (2006.01)
(Continued)

(52) U.S. Cl.
CPC ........... *B01D 53/261* (2013.01); *B01D 53/02* (2013.01); *B01D 53/0423* (2013.01); *B01D 53/0462* (2013.01); *B01D 53/0473* (2013.01); *B01J 20/18* (2013.01); *B01J 20/2808* (2013.01); *B01J 20/28042* (2013.01); *B01J 20/3408* (2013.01);
(Continued)

(58) Field of Classification Search
None
See application file for complete search history.

(56) References Cited

U.S. PATENT DOCUMENTS

| 1,868,138 A | 7/1932 | Fisk |
| 2,646,391 A | 7/1953 | Houdry |

(Continued)

FOREIGN PATENT DOCUMENTS

| CN | 102585953 A | 7/2012 |
| CN | 105038881 A | 11/2015 |

(Continued)

OTHER PUBLICATIONS

Agrafiotis, C. et al., "The effect of particle size on the adhesion properties of oxide washcoats on cordierite honeycombs," Journal of Materials Science Letters, 1999, vol. 18, pp. 1421-1424.
(Continued)

*Primary Examiner* — Tam M Nguyen
(74) *Attorney, Agent, or Firm* — ExxonMobil Upstream Research Company—Law Department

(57) ABSTRACT

The present disclosure describes the use of a specific adsorbent material in a rapid cycle swing adsorption to perform dehydration of a gaseous feed stream. The adsorbent material includes a zeolite 3A that is utilized in the dehydration process to enhance recovery of hydrocarbons.

24 Claims, 12 Drawing Sheets

Related U.S. Application Data

(60) Provisional application No. 62/382,544, filed on Sep. 1, 2016.

(51) Int. Cl.

| | | |
|---|---|---|
| *B01J 20/28* | (2006.01) | |
| *B01J 20/18* | (2006.01) | |
| *B01J 20/34* | (2006.01) | |
| *C10L 3/10* | (2006.01) | |
| *B01D 53/04* | (2006.01) | |
| *B01D 53/047* | (2006.01) | |

(52) U.S. Cl.
CPC ............ *B01J 20/3458* (2013.01); *C10L 3/106* (2013.01); *B01D 2253/1085* (2013.01); *B01D 2253/1122* (2013.01); *B01D 2253/308* (2013.01); *B01D 2253/3425* (2013.01); *B01D 2256/24* (2013.01); *B01D 2256/245* (2013.01); *B01D 2257/80* (2013.01); *B01D 2259/4009* (2013.01); *B01D 2259/40056* (2013.01); *C10L 2290/542* (2013.01)

(56) References Cited

U.S. PATENT DOCUMENTS

| | | | |
|---|---|---|---|
| 2,760,594 A * | 8/1956 | Browning | B01D 53/0446 |
| | | | 96/145 |
| 3,237,377 A | 4/1962 | Skartrom | |
| 3,103,425 A | 9/1963 | Meyer | |
| 3,124,152 A | 3/1964 | Payne | |
| 3,142,547 A | 7/1964 | Marsh et al. | |
| 3,508,758 A | 4/1970 | Strub | |
| 3,594,983 A | 7/1971 | Yearout | |
| 3,602,247 A | 8/1971 | Bunn et al. | |
| 3,788,036 A | 1/1974 | Lee et al. | |
| 3,967,464 A | 7/1976 | Cormier et al. | |
| 4,187,092 A | 2/1980 | Woolley | |
| 4,261,815 A | 4/1981 | Kelland | |
| 4,324,565 A | 4/1982 | Benkmann | |
| 4,325,565 A | 4/1982 | Winchell | |
| 4,329,162 A | 5/1982 | Pitcher | |
| 4,340,398 A | 7/1982 | Doshi et al. | |
| 4,386,947 A | 6/1983 | Mizuno et al. | |
| 4,421,531 A | 12/1983 | Dalton, Jr. et al. | |
| 4,424,144 A | 1/1984 | Pryor et al. | |
| 4,445,441 A | 5/1984 | Tanca | |
| 4,461,630 A | 7/1984 | Cassidy et al. | |
| 4,496,376 A | 1/1985 | Hradek | |
| 4,559,065 A | 12/1985 | Null et al. | |
| 4,631,073 A | 12/1986 | Null et al. | |
| 4,693,730 A | 9/1987 | Miller et al. | |
| 4,705,627 A | 11/1987 | Miwa et al. | |
| 4,711,968 A | 12/1987 | Oswald et al. | |
| 4,737,170 A | 4/1988 | Searle | |
| 4,769,053 A | 9/1988 | Fischer, Jr. | |
| 4,770,676 A | 9/1988 | Sircar et al. | |
| 4,783,205 A | 11/1988 | Searle | |
| 4,784,672 A | 11/1988 | Sircar | |
| 4,790,272 A | 12/1988 | Woolenweber | |
| 4,814,146 A | 3/1989 | Brand et al. | |
| 4,816,039 A | 3/1989 | Krishnamurthy et al. | |
| 4,877,429 A | 10/1989 | Hunter | |
| 4,977,745 A | 12/1990 | Heichberger | |
| 5,110,328 A | 5/1992 | Yokota et al. | |
| 5,125,934 A | 6/1992 | Krishnamurthy et al. | |
| 5,169,006 A | 12/1992 | Stelzer | |
| 5,169,414 A | 12/1992 | Panzica et al. | |
| 5,174,796 A | 12/1992 | Davis et al. | |
| 5,224,350 A | 7/1993 | Mehra | |
| 5,228,888 A | 7/1993 | Gmelin et al. | |
| 5,234,472 A | 8/1993 | Krishnamurthy et al. | |
| 5,292,990 A | 3/1994 | Kantner et al. | |
| 5,306,331 A | 4/1994 | Auvil et al. | |
| 5,354,346 A | 10/1994 | Kumar | |
| 5,365,011 A | 11/1994 | Ramachandran et al. | |
| 5,370,728 A | 12/1994 | LaSala et al. | |
| 5,486,227 A | 1/1996 | Kumar et al. | |
| 5,503,782 A | 4/1996 | Dyrud et al. | |
| 5,547,641 A | 8/1996 | Smith et al. | |
| 5,565,018 A | 10/1996 | Baksh et al. | |
| 5,612,522 A * | 3/1997 | Levy | A23L 2/72 |
| | | | 204/157.4 |
| 5,647,891 A | 7/1997 | Blizzard et al. | |
| 5,669,962 A | 9/1997 | Dunne | |
| 5,672,196 A | 9/1997 | Acharya et al. | |
| 5,700,310 A | 12/1997 | Bowman et al. | |
| 5,733,451 A | 3/1998 | Coellner et al. | |
| 5,735,938 A | 4/1998 | Baksh et al. | |
| 5,750,026 A | 5/1998 | Gadkaree et al. | |
| 5,769,928 A | 6/1998 | Leavitt | |
| 5,779,768 A | 7/1998 | Anand et al. | |
| 5,792,239 A | 8/1998 | Reinhold, III et al. | |
| 5,807,423 A | 9/1998 | Lemcoff et al. | |
| 5,811,616 A | 9/1998 | Holub et al. | |
| 5,827,358 A | 10/1998 | Kulish et al. | |
| 5,827,577 A | 10/1998 | Spencer | |
| 5,855,863 A * | 1/1999 | Verduijn | C10G 45/64 |
| | | | 423/700 |
| 5,882,380 A | 3/1999 | Sircar | |
| 5,906,673 A | 5/1999 | Reinhold, III et al. | |
| 5,908,480 A | 6/1999 | Ban et al. | |
| 5,912,426 A | 6/1999 | Smolarek. et al. | |
| 5,914,294 A | 6/1999 | Park et al. | |
| 5,924,307 A | 7/1999 | Nenov | |
| 5,935,444 A | 8/1999 | Johnson et al. | |
| 5,951,744 A | 9/1999 | Rohrbach et al. | |
| 5,968,234 A | 10/1999 | Midgett, II et al. | |
| 5,976,221 A | 11/1999 | Bowman et al. | |
| 5,997,617 A | 12/1999 | Czabala et al. | |
| 6,007,606 A | 12/1999 | Baksh et al. | |
| 6,011,192 A | 1/2000 | Baker et al. | |
| 6,023,942 A | 2/2000 | Thomas et al. | |
| 6,053,966 A | 4/2000 | Moreau et al. | |
| 6,063,161 A | 5/2000 | Keefer et al. | |
| 6,096,115 A | 8/2000 | Kleinberg | |
| 6,099,621 A | 8/2000 | Ho | |
| 6,102,985 A | 8/2000 | Naheiri et al. | |
| 6,129,780 A | 10/2000 | Millet et al. | |
| 6,136,222 A | 10/2000 | Friesen et al. | |
| 6,147,126 A | 11/2000 | DeGeorge et al. | |
| 6,152,991 A | 11/2000 | Ackley | |
| 6,156,101 A | 12/2000 | Naheiri | |
| 6,171,371 B1 | 1/2001 | Derive et al. | |
| 6,176,897 B1 | 1/2001 | Keefer | |
| 6,179,900 B1 | 1/2001 | Behling et al. | |
| 6,183,538 B1 | 2/2001 | Naheiri | |
| 6,194,079 B1 | 2/2001 | Hekal | |
| 6,210,466 B1 | 4/2001 | Whysall et al. | |
| 6,231,302 B1 | 5/2001 | Bonardi | |
| 6,245,127 B1 | 6/2001 | Kane et al. | |
| 6,284,021 B1 | 9/2001 | Lu et al. | |
| 6,311,719 B1 | 11/2001 | Hill et al. | |
| 6,345,954 B1 | 2/2002 | Al-Himyary et al. | |
| 6,398,853 B1 | 6/2002 | Keefer et al. | |
| 6,402,813 B2 | 6/2002 | Monereau et al. | |
| 6,406,523 B1 | 6/2002 | Connor et al. | |
| 6,409,800 B1 * | 6/2002 | Ojo | B01D 53/02 |
| | | | 95/96 |
| 6,425,938 B1 | 7/2002 | Xu et al. | |
| 6,432,379 B1 | 8/2002 | Heung | |
| 6,436,171 B1 | 8/2002 | Wang et al. | |
| 6,444,012 B1 | 9/2002 | Dolan et al. | |
| 6,444,014 B1 | 9/2002 | Mullhaupt et al. | |
| 6,444,523 B1 | 9/2002 | Fan et al. | |
| 6,444,610 B1 | 9/2002 | Yamamoto | |
| 6,451,095 B1 | 9/2002 | Keefer et al. | |
| 6,457,485 B2 | 10/2002 | Hill et al. | |
| 6,458,187 B1 | 10/2002 | Fritz et al. | |
| 6,464,761 B1 | 10/2002 | Bugli | |
| 6,471,749 B1 | 10/2002 | Kawai et al. | |
| 6,471,939 B1 | 10/2002 | Boix et al. | |
| 6,488,747 B1 | 12/2002 | Keefer | |
| 6,497,750 B2 | 12/2002 | Butwell et al. | |

(56) References Cited

U.S. PATENT DOCUMENTS

| | | |
|---|---|---|
| 6,500,234 B1 | 12/2002 | Ackley et al. |
| 6,500,241 B2 | 12/2002 | Reddy |
| 6,500,404 B1 | 12/2002 | Camblor Fernandez et al. |
| 6,503,299 B2 | 1/2003 | Baksh et al. |
| 6,506,351 B1 | 1/2003 | Jain et al. |
| 6,514,318 B2 | 2/2003 | Keefer |
| 6,514,319 B2 | 2/2003 | Keefer et al. |
| 6,517,609 B1 | 2/2003 | Monereau et al. |
| 6,531,516 B2 | 3/2003 | Davis et al. |
| 6,533,846 B1 | 3/2003 | Keefer et al. |
| 6,565,627 B1 | 5/2003 | Golden et al. |
| 6,565,635 B2 | 5/2003 | Keefer et al. |
| 6,565,825 B2 | 5/2003 | Ohji et al. |
| 6,572,678 B1 | 6/2003 | Wijmans et al. |
| 6,579,341 B2 | 6/2003 | Baker et al. |
| 6,593,541 B1 | 7/2003 | Herren |
| 6,595,233 B2 | 7/2003 | Pulli |
| 6,605,136 B1 | 8/2003 | Graham et al. |
| 6,607,584 B2 | 8/2003 | Moreau et al. |
| 6,630,012 B2 | 10/2003 | Wegeng et al. |
| 6,631,626 B1 | 10/2003 | Hahn |
| 6,641,645 B1 | 11/2003 | Lee et al. |
| 6,651,645 B1 | 11/2003 | Nunez-Suarez |
| 6,660,064 B2 | 12/2003 | Golden et al. |
| 6,660,065 B2 | 12/2003 | Byrd et al. |
| 6,692,626 B2 | 2/2004 | Keefer et al. |
| 6,712,087 B2 | 3/2004 | Hill et al. |
| 6,742,507 B2 | 6/2004 | Keefer et al. |
| 6,746,515 B2 | 6/2004 | Wegeng et al. |
| 6,752,852 B1 | 6/2004 | Jacksier et al. |
| 6,770,120 B2 | 8/2004 | Neu et al. |
| 6,773,225 B2 | 8/2004 | Yuri et al. |
| 6,802,889 B2 | 10/2004 | Graham et al. |
| 6,814,771 B2 | 11/2004 | Scardino et al. |
| 6,835,354 B2 | 12/2004 | Woods et al. |
| 6,840,985 B2 | 1/2005 | Keefer |
| 6,866,950 B2 | 3/2005 | Connor et al. |
| 6,889,710 B2 | 5/2005 | Wagner |
| 6,890,376 B2 | 5/2005 | Arquin et al. |
| 6,893,483 B2 | 5/2005 | Golden et al. |
| 6,902,602 B2 | 6/2005 | Keefer et al. |
| 6,916,358 B2 | 7/2005 | Nakamura et al. |
| 6,918,953 B2 | 7/2005 | Lomax, Jr. et al. |
| 6,921,597 B2 | 7/2005 | Keefer et al. |
| 6,936,561 B2 | 8/2005 | Marques et al. |
| 6,974,496 B2 | 12/2005 | Wegeng et al. |
| 7,025,801 B2 | 4/2006 | Monereau |
| 7,027,929 B2 | 4/2006 | Wang |
| 7,029,521 B2 | 4/2006 | Johansson |
| 7,074,323 B2 | 7/2006 | Ghijsen |
| 7,077,891 B2 | 7/2006 | Jaffe et al. |
| 7,087,331 B2 | 8/2006 | Keefer et al. |
| 7,094,275 B2 | 8/2006 | Keefer et al. |
| 7,097,925 B2 | 8/2006 | Keefer et al. |
| 7,112,239 B2 | 9/2006 | Kimbara et al. |
| 7,117,669 B2 | 10/2006 | Kaboord et al. |
| 7,122,073 B1 | 10/2006 | Notaro et al. |
| 7,128,775 B2 | 10/2006 | Celik et al. |
| 7,144,016 B2 | 12/2006 | Gozdawa |
| 7,160,356 B2 | 1/2007 | Koros et al. |
| 7,160,367 B2 | 1/2007 | Babicki et al. |
| 7,166,149 B2 | 1/2007 | Dunne et al. |
| 7,172,645 B1 | 2/2007 | Pfister et al. |
| 7,189,280 B2 | 3/2007 | Alizadeh-Khiavi et al. |
| 7,243,679 B2 | 7/2007 | Thelen |
| 7,250,073 B2 | 7/2007 | Keefer et al. |
| 7,250,074 B2 | 7/2007 | Tonkovich et al. |
| 7,255,727 B2 | 8/2007 | Monereau et al. |
| 7,258,725 B2 | 8/2007 | Ohmi et al. |
| 7,276,107 B2 | 10/2007 | Baksh et al. |
| 7,279,029 B2 | 10/2007 | Occhialini et al. |
| 7,285,350 B2 | 10/2007 | Keefer et al. |
| 7,297,279 B2 | 11/2007 | Johnson et al. |
| 7,311,763 B2 | 12/2007 | Neary |
| RE40,006 E | 1/2008 | Keefer et al. |
| 7,314,503 B2 | 1/2008 | Landrum et al. |
| 7,354,562 B2 | 4/2008 | Ying et al. |
| 7,387,849 B2 | 6/2008 | Keefer et al. |
| 7,390,350 B2 | 6/2008 | Weist, Jr. et al. |
| 7,404,846 B2 | 7/2008 | Golden et al. |
| 7,438,079 B2 | 10/2008 | Cohen et al. |
| 7,449,049 B2 | 11/2008 | Thomas et al. |
| 7,456,131 B2 | 11/2008 | Klett et al. |
| 7,510,601 B2 | 3/2009 | Whitley et al. |
| 7,527,670 B2 | 5/2009 | Ackley et al. |
| 7,553,568 B2 | 6/2009 | Keefer |
| 7,560,154 B2 | 7/2009 | Katoh |
| 7,578,864 B2 | 8/2009 | Watanabe et al. |
| 7,604,682 B2 | 10/2009 | Seaton |
| 7,637,989 B2 | 12/2009 | Bong |
| 7,641,716 B2 | 1/2010 | Lomax, Jr. et al. |
| 7,645,324 B2 | 1/2010 | Rode et al. |
| 7,651,549 B2 | 1/2010 | Whitley |
| 7,674,319 B2 | 3/2010 | Lomax, Jr. et al. |
| 7,674,539 B2 | 3/2010 | Keefer et al. |
| 7,687,044 B2 | 3/2010 | Keefer et al. |
| 7,713,333 B2 | 5/2010 | Rege et al. |
| 7,717,981 B2 | 5/2010 | LaBuda et al. |
| 7,722,700 B2 | 5/2010 | Sprinkle |
| 7,731,782 B2 | 6/2010 | Kelley et al. |
| 7,740,687 B2 | 6/2010 | Reinhold, III |
| 7,744,676 B2 | 6/2010 | Leitmayr et al. |
| 7,744,677 B2 | 6/2010 | Barclay et al. |
| 7,758,051 B2 | 7/2010 | Roberts-Haritonov et al. |
| 7,758,988 B2 | 7/2010 | Keefer et al. |
| 7,763,098 B2 | 7/2010 | Alizadeh-Khiavi et al. |
| 7,763,099 B2 | 7/2010 | Verma et al. |
| 7,792,983 B2 | 9/2010 | Mishra et al. |
| 7,793,675 B2 | 9/2010 | Cohen et al. |
| 7,806,965 B2 | 10/2010 | Stinson |
| 7,819,948 B2 | 10/2010 | Wagner |
| 7,828,877 B2 | 11/2010 | Sawada et al. |
| 7,828,880 B2 | 11/2010 | Moriya et al. |
| 7,854,793 B2 | 12/2010 | Rarig et al. |
| 7,858,169 B2 | 12/2010 | Yamashita |
| 7,862,645 B2 | 1/2011 | Whitley et al. |
| 7,867,320 B2 | 1/2011 | Baksh et al. |
| 7,902,114 B2 | 3/2011 | Bowie et al. |
| 7,938,886 B2 | 5/2011 | Hershkowitz et al. |
| 7,947,118 B2 | 5/2011 | Rarig et al. |
| 7,947,120 B2 | 5/2011 | Deckman et al. |
| 7,959,720 B2 | 6/2011 | Deckman et al. |
| 8,016,918 B2 | 9/2011 | LaBuda et al. |
| 8,034,164 B2 | 10/2011 | Lomax, Jr. et al. |
| 8,071,063 B2 | 12/2011 | Reyes et al. |
| 8,128,734 B2 | 3/2012 | Song |
| 8,142,745 B2 | 3/2012 | Reyes et al. |
| 8,142,746 B2 | 3/2012 | Reyes et al. |
| 8,192,709 B2 | 6/2012 | Reyes et al. |
| 8,210,772 B2 | 7/2012 | Gillecriosd |
| 8,227,121 B2 | 7/2012 | Adams et al. |
| 8,262,773 B2 | 9/2012 | Northrop et al. |
| 8,262,783 B2 | 9/2012 | Stoner et al. |
| 8,268,043 B2 | 9/2012 | Celik et al. |
| 8,268,044 B2 | 9/2012 | Wright et al. |
| 8,272,401 B2 | 9/2012 | McLean |
| 8,287,629 B2 | 10/2012 | Fujita et al. |
| 8,319,090 B2 | 11/2012 | Kitamura |
| 8,337,594 B2 | 12/2012 | Corma Canos et al. |
| 8,361,200 B2 | 1/2013 | Sayari et al. |
| 8,361,205 B2 | 1/2013 | Desai et al. |
| 8,377,173 B2 | 2/2013 | Chuang |
| 8,444,750 B2 | 5/2013 | Deckman et al. |
| 8,449,649 B2 | 5/2013 | Greenough |
| 8,470,395 B2 | 6/2013 | Khiavi et al. |
| 8,476,180 B2 | 7/2013 | Hilaly et al. |
| 8,480,795 B2 | 7/2013 | Siskin et al. |
| 8,512,569 B2 | 8/2013 | Eaton et al. |
| 8,518,356 B2 | 8/2013 | Schaffer et al. |
| 8,529,662 B2 | 9/2013 | Kelley et al. |
| 8,529,663 B2 | 9/2013 | Reyes et al. |
| 8,529,664 B2 | 9/2013 | Deckman et al. |
| 8,529,665 B2 | 9/2013 | Manning et al. |
| 8,535,414 B2 | 9/2013 | Johnson et al. |

(56) References Cited

U.S. PATENT DOCUMENTS

| | | | |
|---|---|---|---|
| 8,545,602 B2 | 10/2013 | Chance et al. | |
| 8,551,444 B2 | 10/2013 | Agnihotri et al. | |
| 8,573,124 B2 | 11/2013 | Havran et al. | |
| 8,591,627 B2 | 11/2013 | Jain | |
| 8,591,634 B2 | 11/2013 | Winchester et al. | |
| 8,616,233 B2 | 12/2013 | McLean et al. | |
| 8,657,922 B2 | 2/2014 | Yamawaki et al. | |
| 8,673,059 B2 | 3/2014 | Leta et al. | |
| 8,680,344 B2 | 3/2014 | Weston et al. | |
| 8,715,617 B2 | 5/2014 | Genkin et al. | |
| 8,741,243 B2 | 6/2014 | Gadkaree et al. | |
| 8,752,390 B2 | 6/2014 | Wright et al. | |
| 8,753,428 B2 | 6/2014 | Lomax, Jr. et al. | |
| 8,778,051 B2 | 7/2014 | Weist, Jr. et al. | |
| 8,784,533 B2 | 7/2014 | Leta et al. | |
| 8,784,534 B2 | 7/2014 | Kamakoti et al. | |
| 8,784,535 B2 | 7/2014 | Ravikovitch et al. | |
| 8,790,618 B2 | 7/2014 | Adams et al. | |
| 8,795,411 B2 | 8/2014 | Hufton et al. | |
| 8,808,425 B2 | 8/2014 | Genkin et al. | |
| 8,808,426 B2 | 8/2014 | Sundaram | |
| 8,814,985 B2 | 8/2014 | Gerds et al. | |
| 8,852,322 B2 | 10/2014 | Gupta et al. | |
| 8,858,683 B2 | 10/2014 | Deckman | |
| 8,875,483 B2 | 11/2014 | Wettstein | |
| 8,906,138 B2 | 12/2014 | Rasmussen et al. | |
| 8,921,637 B2 | 12/2014 | Sundaram et al. | |
| 8,932,386 B2 | 1/2015 | Bouvier et al. | |
| 8,939,014 B2 | 1/2015 | Kamakoti et al. | |
| 9,005,561 B2 | 4/2015 | Leta | |
| 9,017,457 B2 | 4/2015 | Tammera | |
| 9,028,595 B2 | 5/2015 | Sundaram et al. | |
| 9,034,078 B2 | 5/2015 | Wanni et al. | |
| 9,034,079 B2 | 5/2015 | Deckman et al. | |
| 9,050,553 B2 | 6/2015 | Alizadeh-Khiavi et al. | |
| 9,067,168 B2 | 6/2015 | Frederick et al. | |
| 9,067,169 B2 | 6/2015 | Patel | |
| 9,095,809 B2 | 8/2015 | Deckman et al. | |
| 9,108,145 B2 | 8/2015 | Kalbassi et al. | |
| 9,120,049 B2 | 9/2015 | Sundaram et al. | |
| 9,126,138 B2 | 9/2015 | Deckman et al. | |
| 9,162,175 B2 | 10/2015 | Sundaram | |
| 9,168,483 B2 | 10/2015 | Ravikovitch et al. | |
| 9,168,485 B2 | 10/2015 | Deckman et al. | |
| 9,272,264 B2 | 3/2016 | Coupland | |
| 9,278,338 B2 | 3/2016 | Coupland | |
| 9,358,493 B2 | 6/2016 | Tammera et al. | |
| 9,573,116 B2 | 2/2017 | Johnson et al. | |
| 9,597,655 B2 | 3/2017 | Beeckman | |
| 9,713,787 B2 | 7/2017 | Owens et al. | |
| 9,737,846 B2 | 8/2017 | Carstensen et al. | |
| 9,744,521 B2 | 8/2017 | Brody et al. | |
| 10,040,022 B2 | 8/2018 | Fowler et al. | |
| 10,080,991 B2 | 9/2018 | Johnson et al. | |
| 10,080,992 B2 | 9/2018 | Nagavarapu et al. | |
| 10,124,286 B2 | 11/2018 | McMahon et al. | |
| 10,882,002 B2 | 1/2021 | Vittenet | |
| 2001/0047824 A1 | 12/2001 | Hill et al. | |
| 2002/0053547 A1 | 5/2002 | Schlegel et al. | |
| 2002/0124885 A1 | 9/2002 | Hill et al. | |
| 2002/0162452 A1 | 11/2002 | Butwell et al. | |
| 2003/0075485 A1 | 4/2003 | Ghijsen | |
| 2003/0129101 A1 | 7/2003 | Zettel | |
| 2003/0131728 A1 | 7/2003 | Kanazirev et al. | |
| 2003/0145726 A1 | 8/2003 | Gueret et al. | |
| 2003/0170527 A1 | 9/2003 | Finn et al. | |
| 2003/0188635 A1 | 10/2003 | Lomax, Jr. et al. | |
| 2003/0202918 A1 | 10/2003 | Ashida et al. | |
| 2003/0205130 A1 | 11/2003 | Neu et al. | |
| 2003/0223856 A1 | 12/2003 | Yuri et al. | |
| 2004/0099142 A1 | 5/2004 | Arquin et al. | |
| 2004/0118277 A1 | 6/2004 | Kim | |
| 2004/0118747 A1 | 6/2004 | Cutler et al. | |
| 2004/0179998 A1 | 9/2004 | Gittlman et al. | |
| 2004/0197596 A1 | 10/2004 | Connor et al. | |
| 2004/0232622 A1 | 11/2004 | Gozdawa | |
| 2005/0045041 A1 | 3/2005 | Hechinger et al. | |
| 2005/0109419 A1 | 5/2005 | Ohmi et al. | |
| 2005/0114032 A1 | 5/2005 | Wang | |
| 2005/0129952 A1 | 6/2005 | Sawada et al. | |
| 2005/0145111 A1 | 7/2005 | Keefer et al. | |
| 2005/0150378 A1 | 7/2005 | Dunne et al. | |
| 2005/0229782 A1 | 10/2005 | Monereau et al. | |
| 2005/0252378 A1 | 11/2005 | Celik et al. | |
| 2006/0017940 A1 | 1/2006 | Takayama | |
| 2006/0048648 A1 | 3/2006 | Gibbs et al. | |
| 2006/0049102 A1 | 3/2006 | Miller et al. | |
| 2006/0076270 A1 | 4/2006 | Poshusta et al. | |
| 2006/0099096 A1 | 5/2006 | Shaffer et al. | |
| 2006/0105158 A1 | 5/2006 | Fritz et al. | |
| 2006/0115399 A1* | 6/2006 | Yuen | F01N 3/0842 423/213.2 |
| 2006/0115400 A1* | 6/2006 | Yuen | B01D 53/9486 423/213.2 |
| 2006/0116430 A1 | 6/2006 | Wentink et al. | |
| 2006/0116460 A1 | 6/2006 | Georget et al. | |
| 2006/0162556 A1 | 7/2006 | Ackley et al. | |
| 2006/0165574 A1 | 7/2006 | Sayari | |
| 2006/0169142 A1 | 8/2006 | Rode et al. | |
| 2006/0236862 A1 | 10/2006 | Golden et al. | |
| 2006/0236867 A1 | 10/2006 | Neary | |
| 2007/0084241 A1 | 4/2007 | Kretchmer et al. | |
| 2007/0084344 A1 | 4/2007 | Moriya et al. | |
| 2007/0187029 A1 | 8/2007 | Axtell et al. | |
| 2007/0209518 A1* | 9/2007 | Hidano | B01J 20/18 96/154 |
| 2007/0222160 A1 | 9/2007 | Roberts-Haritonov et al. | |
| 2007/0253872 A1 | 11/2007 | Keefer et al. | |
| 2007/0261550 A1 | 11/2007 | Ota | |
| 2007/0261557 A1 | 11/2007 | Gadkaree et al. | |
| 2007/0283807 A1 | 12/2007 | Whitley | |
| 2008/0051279 A1 | 2/2008 | Klett et al. | |
| 2008/0072822 A1 | 3/2008 | White | |
| 2008/0128655 A1 | 6/2008 | Garg et al. | |
| 2008/0202336 A1 | 8/2008 | Hofer et al. | |
| 2008/0236389 A1 | 10/2008 | Leedy et al. | |
| 2008/0282883 A1 | 11/2008 | Rarig et al. | |
| 2008/0282884 A1 | 11/2008 | Kelley et al. | |
| 2008/0282885 A1 | 11/2008 | Deckman et al. | |
| 2008/0282886 A1 | 11/2008 | Reyes et al. | |
| 2008/0282887 A1 | 11/2008 | Chance | |
| 2008/0282892 A1 | 11/2008 | Deckman et al. | |
| 2008/0289497 A1 | 11/2008 | Barclay et al. | |
| 2008/0307966 A1 | 12/2008 | Stinson | |
| 2008/0314550 A1 | 12/2008 | Greco | |
| 2009/0004073 A1 | 1/2009 | Gleize et al. | |
| 2009/0014902 A1 | 1/2009 | Koivunen et al. | |
| 2009/0025553 A1 | 1/2009 | Keefer et al. | |
| 2009/0025555 A1 | 1/2009 | Lively et al. | |
| 2009/0037550 A1 | 2/2009 | Mishra et al. | |
| 2009/0071333 A1 | 3/2009 | LaBuda et al. | |
| 2009/0079870 A1 | 3/2009 | Matsui | |
| 2009/0107332 A1 | 4/2009 | Wagner | |
| 2009/0151559 A1 | 6/2009 | Verma et al. | |
| 2009/0162268 A1 | 6/2009 | Hufton et al. | |
| 2009/0180423 A1 | 7/2009 | Kroener | |
| 2009/0241771 A1 | 10/2009 | Manning et al. | |
| 2009/0284013 A1 | 11/2009 | Anand et al. | |
| 2009/0294366 A1 | 12/2009 | Wright et al. | |
| 2009/0308248 A1 | 12/2009 | Siskin et al. | |
| 2009/0314159 A1 | 12/2009 | Haggerty | |
| 2010/0059701 A1 | 3/2010 | McLean | |
| 2010/0077920 A1 | 4/2010 | Baksh et al. | |
| 2010/0089241 A1 | 4/2010 | Stoner et al. | |
| 2010/0132254 A1 | 6/2010 | Wegerer et al. | |
| 2010/0132548 A1 | 6/2010 | Dunne et al. | |
| 2010/0137657 A1 | 6/2010 | Wegerer et al. | |
| 2010/0186445 A1 | 7/2010 | Minta et al. | |
| 2010/0212493 A1 | 8/2010 | Rasmussen et al. | |
| 2010/0251887 A1 | 10/2010 | Jain | |
| 2010/0252497 A1 | 10/2010 | Ellison et al. | |
| 2010/0263534 A1 | 10/2010 | Chuang | |
| 2010/0282593 A1 | 11/2010 | Speirs et al. | |
| 2010/0288704 A1 | 11/2010 | Amsden et al. | |

(56) References Cited

U.S. PATENT DOCUMENTS

| | | |
|---|---|---|
| 2011/0011803 A1 | 1/2011 | Koros |
| 2011/0020202 A1 | 1/2011 | Gadkaree et al. |
| 2011/0031103 A1 | 2/2011 | Deckman et al. |
| 2011/0067440 A1 | 3/2011 | Van Aken |
| 2011/0067770 A1 | 3/2011 | Pederson et al. |
| 2011/0123878 A1 | 5/2011 | Jangbarwala |
| 2011/0146494 A1 | 6/2011 | Desai et al. |
| 2011/0149640 A1 | 6/2011 | Furuta et al. |
| 2011/0217218 A1 | 9/2011 | Gupta et al. |
| 2011/0277620 A1 | 11/2011 | Havran et al. |
| 2011/0291051 A1 | 12/2011 | Hershkowitz et al. |
| 2011/0296871 A1 | 12/2011 | Van Soest-Vercammen et al. |
| 2011/0308524 A1 | 12/2011 | Brey et al. |
| 2012/0024150 A1 | 2/2012 | Moniot |
| 2012/0024152 A1 | 2/2012 | Yamawaki et al. |
| 2012/0031144 A1 | 2/2012 | Northrop et al. |
| 2012/0067216 A1 | 3/2012 | Corma-Canos et al. |
| 2012/0118755 A1 | 5/2012 | Dadvand et al. |
| 2012/0118758 A1 | 5/2012 | Ellis et al. |
| 2012/0152115 A1 | 6/2012 | Gerds et al. |
| 2012/0222551 A1 | 9/2012 | Deckman |
| 2012/0222552 A1 | 9/2012 | Ravikovitch et al. |
| 2012/0222553 A1 | 9/2012 | Kamakoti et al. |
| 2012/0222554 A1 | 9/2012 | Leta et al. |
| 2012/0222555 A1 | 9/2012 | Gupta et al. |
| 2012/0227583 A1 | 9/2012 | Monereau et al. |
| 2012/0255377 A1 | 10/2012 | Kamakoti et al. |
| 2012/0272822 A1* | 11/2012 | Sechrist ............ B01D 53/0438 95/106 |
| 2012/0272823 A1 | 11/2012 | Halder et al. |
| 2012/0308456 A1 | 12/2012 | Leta et al. |
| 2012/0312163 A1 | 12/2012 | Leta et al. |
| 2013/0061755 A1 | 3/2013 | Frederick et al. |
| 2013/0095996 A1 | 4/2013 | Buelow et al. |
| 2013/0225898 A1 | 8/2013 | Sundaram et al. |
| 2013/0327216 A1 | 12/2013 | Deckman et al. |
| 2014/0013955 A1 | 1/2014 | Tammera et al. |
| 2014/0060326 A1 | 3/2014 | Sundaram et al. |
| 2014/0157984 A1 | 6/2014 | Deckman et al. |
| 2014/0157986 A1 | 6/2014 | Ravikovitch et al. |
| 2014/0174291 A1 | 6/2014 | Gupta et al. |
| 2014/0208797 A1 | 7/2014 | Kelley et al. |
| 2014/0216254 A1 | 8/2014 | Tammera et al. |
| 2015/0013377 A1 | 1/2015 | Oelfke |
| 2015/0068397 A1 | 3/2015 | Boulet et al. |
| 2015/0010483 A1 | 4/2015 | Perry et al. |
| 2015/0101483 A1 | 4/2015 | Perry et al. |
| 2015/0196870 A1 | 7/2015 | Albright et al. |
| 2015/0328578 A1 | 11/2015 | Deckman et al. |
| 2015/0361102 A1 | 12/2015 | Inubshi et al. |
| 2016/0016865 A1 | 1/2016 | Dolan |
| 2016/0023155 A1 | 1/2016 | Ramkumar et al. |
| 2016/0129433 A1 | 5/2016 | Tammera et al. |
| 2016/0166972 A1 | 6/2016 | Owens et al. |
| 2016/0175759 A1 | 6/2016 | Carstensen et al. |
| 2016/0236135 A1 | 8/2016 | Tammera et al. |
| 2016/0332105 A1 | 11/2016 | Tammera et al. |
| 2016/0332106 A1 | 11/2016 | Tammera et al. |
| 2017/0056814 A1 | 3/2017 | Marshall et al. |
| 2017/0113173 A1 | 4/2017 | Fowler et al. |
| 2017/0113175 A1 | 4/2017 | Fowler et al. |
| 2017/0136405 A1 | 5/2017 | Ravikovitch et al. |
| 2017/0266604 A1 | 9/2017 | Tammera et al. |
| 2017/0282114 A1 | 10/2017 | Owens et al. |
| 2017/0341011 A1 | 11/2017 | Nagavarapu et al. |
| 2017/0341012 A1 | 11/2017 | Nagavarapu et al. |
| 2018/0001301 A1 | 1/2018 | Brody et al. |
| 2018/0056229 A1 | 3/2018 | Denton et al. |
| 2018/0056235 A1 | 3/2018 | Wang et al. |
| 2018/0169565 A1 | 6/2018 | Brody et al. |
| 2018/0169617 A1 | 6/2018 | Brody et al. |
| 2018/0339263 A1 | 11/2018 | Dehaas et al. |
| 2019/0224613 A1 | 7/2019 | Nagavarapu et al. |
| 2019/0262764 A1 | 8/2019 | Johnson |
| 2019/0262765 A1 | 8/2019 | Barnes et al. |
| 2020/0197856 A1 | 6/2020 | Fulton et al. |

FOREIGN PATENT DOCUMENTS

| | | |
|---|---|---|
| EP | 0257493 | 2/1988 |
| EP | 0426937 | 5/1991 |
| EP | 0904827 | 3/1999 |
| EP | 0953374 | 3/1999 |
| EP | 1110593 | 6/2001 |
| EP | 1674555 | 6/2006 |
| EP | 2754488 | 7/2014 |
| EP | 2823872 | 1/2015 |
| FR | 2854819 | 5/2003 |
| FR | 2924951 | 6/2009 |
| JP | 58-114715 | 7/1983 |
| JP | 59-232174 | 12/1984 |
| JP | 60-189318 | 12/1985 |
| JP | 2002-253818 | 10/1990 |
| JP | 04-180978 | 6/1992 |
| JP | 06006736 | 6/1992 |
| JP | H05-037318 U | 5/1993 |
| JP | H6-6736 U | 1/1994 |
| JP | 3477280 | 8/1995 |
| JP | 2011-169640 | 6/1999 |
| JP | 2011-280921 | 10/1999 |
| JP | 2000-024445 | 8/2001 |
| JP | 2002-348651 | 12/2002 |
| JP | 2003/180838 A | 7/2003 |
| JP | 2006-016470 | 1/2006 |
| JP | 2006-036849 | 2/2006 |
| JP | 2008-272534 | 11/2008 |
| JP | 2011-083726 | 4/2011 |
| JP | 2013-244469 A | 12/2013 |
| JP | 2016-121414 | 7/2016 |
| KR | 100220576 A | 10/1998 |
| KR | 101349424 | 1/2014 |
| RU | 2329094 | 12/2006 |
| RU | 2547115 C2 | 4/2015 |
| WO | WO2002/024309 | 3/2002 |
| WO | WO2002/073728 | 9/2002 |
| WO | WO 03/04438 A2 | 1/2003 |
| WO | WO2005/090793 | 9/2005 |
| WO | WO2010/024643 | 3/2010 |
| WO | WO2011/139894 | 11/2011 |

OTHER PUBLICATIONS

Allen, M. P. et al., (1987) "Computer Simulation of Liquids" Clarendon Press, pp. 156-160.

Asgari, M. et al., (2014) "Designing A Commercial Scale Pressure Swing Adsorber For Hydrogen Purification" *Petroleum & Coal*, vol. 56(5), pp. 552-561.

Baerlocher, C. et al., (2017) International Zeolite Association's "Database of Zeolite Structures," available at http://www.iza-structure.org/databases/, downloaded Jun. 15, 2018, 1 page.

Bernad, S. I. (2012) "Numberical Model for Cavitational Flow in Hydraulic Poppet Valves" *Modelling and Simulation in Engineering*, vol. 2012, Article ID 742162, 10 pages.

Burtch, N.C. et al., (2015) "Molecular-level Insight into Unusual Low Pressure $CO_2$ Affinity in Pillared Metal-Organic Frameworks," *J Am Chem Soc*, 135, pp. 7172-7180.

Beauvais, C. et al., (2004) "Distribution of Sodium Cations in Faujasite-Type Zeolite: A Canonical Parallel Tempering Simulation Study," *J Phys Chem B*, 108, pp. 399-404.

Cheung, O. et al., (2013) "Adsorption kinetics for $CO_2$ on highly selective zeolites NaKA and nano-NaKA,"*Appl Energ*, 112, pp. 1326-1336.

Cygan, R. T. et al., (2004) "Molecular Models of Hydroxide, Oxyhydroxide, and Clay Phases and the Development of a General Force Field", *J Phys Chem B*, vol. 108, pp. 1255-1266.

Deem, M. W. et al., (2009) "Computational Discovery of New Zeolite-Like Materials", *J Phys Chem C*, 113, pp. 21353-21360.

Demiralp, E., et al., (1999) "Morse Stretch Potential Charge Equilibrium Force Field for Ceramics: Application to the Quartz-

(56) References Cited

OTHER PUBLICATIONS

Stishovite Phase Transition and to Silica Glass", *Physical Review Letters*, vol. 82(8), pp. 1708-1711.

Dubbeldam, D., et al., (2013) "On the inner workings of Monte Carlo codes" *Molecular Simulation*, vol. 39, Nos. 14-15, pp. 1253-1292.

Dubbeldam, D. et al. (2016) "RASPA: molecular simulation software for adsorption and diffusion in flexible nanoporous materials" *Molecular Simulation*, (published online Feb. 26, 2015), vol. 42(2), pp. 81-101.

Earl, D. J. et al., (2005) "Parallel tempering: Theory, applications, and new perspectives," *Phys Chem Chem Phys*, vol. 7, pp. 3910-3916.

ExxonMobil Research and Engineering and QuestAir (2008) "A New Commercialized Process for Lower Cost H2 Recovery—Rapid Cycle Pressure Swing Adsorption (RCPSA)," *Brochure*, 4 pgs.

Fang, H., et al., (2012) "Prediction of CO2 Adsorption Properties in Zeolites Using Force Fields Derived from Periodic Dispersion-Corrected DFT Calculations," J Phys Chem C, 116, ACS Publications, pp. 10692-10701.

Fang, H. et al., (2013) "First principles derived, transferable force fields for CO2 adsorption in Na-exchanged cationic zeolites," Phys Chem Chem Phys, vol. 15, pp. 12882-12894.

Fang, H. et al. (2014) "Recent Developments in First-Principles Force Fields for Molecules in Nanoporous Materials", Journal of Materials Chemistry A, 2014, vol. 2, pp. 274-291.

Fang, H. et al. (2016) "Identification of High-$CO_2$-Capacity Cationic Zeolites by Accurate Computational Screening", American Chemical Society, Chemistry of Materials, 2016, vol. 28, pp. 3887-3896.

Farooq, S. et al. (1990) "Continuous Countercurrent Flow Model for a Bulk PSA Separation Process," *AIChE J.*, v36 (2) p. 310-314.

FlowServe (2005) "Exceeding Expectations, US Navy Cuts Maintenance Costs With Flowserve GX-200 Non-Contacting Seal Retrofits," *Face-to-Face*, v17.1, 8 pgs.

Foster, M.D., et al. "A geometric solution to the largest-free-sphere problem in zeolite frameworks", *Microporous and Mesoporous Materials*, vol. 90, pp. 32-38.

Frenkel, D. et al., (2002) "Understanding Molecular Simulation: From Algorithms to Applications", 2nd ed., *Academic Press*, pp. 292-301.

Garcia, E. J., et al. (2014) "Tuning the Adsorption Properties of Zeolites as Adsorbents for CO2 Separation: Best Compromise between the Working Capacity and Selectivity", *Ind. Eng. Chem. Res.*, vol. 53, pp. 9860-9874.

Garcia-Sanchez, A., et al. (2009) "Transferable Force Field for Carbon Dioxide Adsorption in Zeolites", J. Phys. Chem. C 2009, vol. 113, pp. 8814-8820.

GE Oil & Gas (2007) "Dry Gas Seal Retrofit," Florence, Italy, www.ge.com/oilandgas. 3 pgs.

Harris, J. G. et al., (1995) "Carbon Dioxide's Liquid-Vapor Coexistence Curve and Critical Properties as Predicted by a Simple Molecular Model", *J Phys Chem*, vol. 99, pp. 12021-12024.

Hill, J. R. et al., (1995) "Molecular Mechanics Potential for Silica and Zeolite Catalysts Based on an ab Initio Calculations. 2. Aluminosilicates", *J Phys Chem*, vol. 99, pp. 9536-9550.

Hopper, B. et al. (2008) "World's First 10,000 psi Sour Gas Injection Compressor," *Proceedings of the 37th Turbomachinery Symposium*, pp. 73-95.

Jain, S., et al. (2003) "Heuristic design of pressure swing adsorption: a preliminary study", *Separation and Purification Technology*, vol. 33, pp. 25-43.

Jaramillo, E. et al. (2004) "Adsorption of Small Molecules in LTA Zeolites, 1. $NH_3$, $CO_2$, and $H_2O$ in Zeolite 4A", J. Phys. Chem. B 2004, vol. 108, pp. 20155-20159.

Kim J. et al. (2012) "Predicting Large CO2 Adsorption in Aluminosilicate Zeolites for Postcombustion Carbon Dioxide Capture", *J. Am. Chem, Soc.*, vol. 134, pp. 18940-18940.

Kärger, J., et al. (2012) "Diffusion in Nanoporous Materials", Whiley-VCH publisher, vol. 1, Chapter 16, pp. 483-501.

Kikkinides, E. S. et al. (1995) "Natural Gas Desulfurization by Adsorption: Feasibility and Multiplicity of Cyclic Steady States," *Ind. Eng. Chem. Res.* V. 34, pp. 255-262.

Lin, L., et al. (2012) "In silicoa screening of carbon-capture materials", *Nature Materials*, vol. 1, pp. 633-641.

Liu, Q. et al., (2010) "NaKA sorbents with high $CO_2$-over-$N_2$ selectivity and high capacity to adsorb $CO_2$," *Chem Commun.*, vol. 46, pp. 4502-4504.

Loewenstein, W., (1954) "The Distribution of Aluminum in the Tetra-Hedra of Silicates and Aluminates" Am Mineral, 92-96.

Maurin et al. (2005) "Adsorption Mechanism of Carbon Dioxide in Faujasites: Grand Canonical Monte Carlo Simulations and Microcalorimetry Measurements", J. Phys. Chem. B 2005, vol. 109, pp. 16084-16091.

Neimark, A. V. et al., (1997) "Calibration of Pore Volume in Adsorption Experiments and Theoretical Models", *Langmuir*, vol. 13, pp. 5148-5160.

Palomino, M., et al. (2009) "New Insights on CO2-Methane Separation Using LTA Zeolites with Different Si/Al Ratios and a First Comparison with MOFs", Langmar, vol. 26(3), pp. 1910-1917.

Patcas, F.C. et al. (2007) "CO Oxidation Over Structured Carriers: A Comparison of Ceramic Forms, Honeycombs and Beads", *Chem Engineering Science*, v. 62, pp. 3984-3990.

Peng, D. Y., et al., (1976) "A New Two-Constant Equation of State", *Ind Eng Chem Fundam*, vol. 15, pp. 59-64.

Pham, T. D. et al., (2013) "Carbon Dioxide and Nitrogen Adsorption on Cation-Exchanged SSZ-13 Zeolites", Langmuir, vol. 29, pp. 832-839.

Pophale, R., et al., (2011) "A database of new zeolite-like materials", *Phys Chem Chem Phys*, vol. 13(27), p. 1412.

Potoff, J. J. et al., (2001) "Vapor-Liquid Equilibria of Mixtures Containing Alkanes, Carbon Dioxide, and Nitrogen", AIChE J, vol. 47(7), pp. 1676-1682.

Rameshni, Mahin "Strategies for Sour Gas Field Developments," *Worley Parsons—Brochure*, 20 pp.

Reyes, S. C. et al. (1997) "Frequency Modulation 2407-12Methods for Diffusion and Adsorption Measurements in Porous Solids," *J. Phys. Chem. B.* v101, pp. 614-622.

Rezaei, F. et al. (2009) "Optimum Structured Adsorbents for Gas Separation Process", *Chem. Engineering Science*, v. 64, pp. 5182-5191.

Richardson, J.T. et al. (2000) "Properties of Ceramic Foam Catalyst Supports: Pressure Dop", *Applied Catalysis A: General* v. 204, pp. 19-32.

Robinson, D. B., et al., (1985) "The development of the Peng-Robinson Equation and its Application to Phase Equilibria in a System Containing Methanol," *Fluid Phase Equilibria*, vol. 24, pp. 25-41.

Ruthven, D. M. et al. (1996) "Performance of a Parallel Passage Adsorbent Contactor," *Gas. Sep. Purif.*, vol. 10, No. 1, pp. 63-73.

Stahley, J. S. (2003) "Design, Operation, and Maintenance Considerations for Improved Dry Gas Seal Reliability in Centrifugal Compressors," *Dresser-Rand, Tech. Paper 134*, 15 pages.

Santos, M. S (2011) "New Cycle configuration to enhance performance of kinetic PSA processes" Chemical Engineering Science 66, pp. 1590-1599.

Snurr, R. Q. et al., (1993) "Prediction of Adsorption of Aromatic Hydrocarbons in Silicalite from Grand Canonical Monte Carlo Simulations with Biased Insertions", *J Phys Chem*, vol. 97, pp. 13742-13752.

Stemmet, C.P. et al. (2006) "Solid Foam Packings for Multiphase Reactors: Modelling of Liquid Holdup and Mass Transfer", *Chem. Engineering Research and Design*, v. 84(A12), pp. 1134-1141.

Suzuki, M. (1985) "Continuous-Countercurrent-Flow Approximation for Dynamic Steady State Profile of Pressure Swing Adsorption" *AIChE Symp. Ser.* v81 (242) pp. 67-73.

Talu, O. et al., (2001), "Reference potentials for adsorption of helium, argon, methane, and krypton in high-silica zeolites," *Colloids and Surfaces A: Physicochemical and Engineering Aspects*, vol. 83-93, pp. 83-93.

Walton, K. S. et al., (2006) "CO2 adsorption in Y and X zeolites modified by alkali metal cation exchange," *Microporous and Mesoporous Mat*, vol. 91, pp. 78-84.

(56) References Cited

OTHER PUBLICATIONS

Willems, T. F. et al., (2012) "Algorithms and tools for high-throughput geometry-based analysis of crystalline porous materials" *Microporous Mesoporous Mat*, vol. 149, pp. 134-141.

Zukal, A., et al., (2009) "Isosteric heats of adsorption of carbon dioxide on zeolite MCM-22 modified by alkali metal cations", *Adsorption*, vol. 15, pp. 264-270.

"Molecular Sieve", https;//en.wikipedia.org/wiki/Molecular_sieve, Wikimedia Foundation, Inc., Dec. 9, 2021, 8 Pages.

"Molecular Sieves" Mineral Adsorbents, Filter Agents, and Drying Agents, https://www.sigmaaldrich.com/chemistry/chemical-synthesis/learning-center/technical-bulletins/al-1430/molecular-sieves. html?gclid=EAIaIQobChMlpPSRg5r86wlVROmyCh3xFQyqEAAYAiAAEgJwPD_BwE, 2022, 2021, 4 Pages.

3A Molecular Sieve-Guangzhou Chemxin Environmental material Co., Ltd, http://www.chemxin.com/product/html?43. html&gclid=EAIaIQobChM lpPSRg5r86wlVROmyCh3xFQyqEAA YASAAEglyefD BwE, 3 Pages.

ACS Material LLC, "Type A and X Zeolites", https://www.acsmaterial.com/blog-detail/type-a-and-x-zeolites.html, Jul. 16, 2019, 3 Pages.

Carmo et al. (2002) "Ethanol-Water Separation in the PSA Process", Adsorption, vol. 8, pp. 235-248.

Carmo et al. (2001) "Separation of an Ethanol-Water Mixture in the P.S.A. Adsorption Process", Latin American Applied Research, vol. 31, pp. 353-357.

Do, D. D. (1998) "Adsorption Analysis: Equilibrium and Kinetics", Imperial College Press, p. 412.

Gorbach et al. (2005) "Compact Pressure Swing Adsorption Processes-Impact and Potential of New-Type Adsorbent-Polymer Monoliths", Adsorption, vol. 11, pp. 515-520.

Lin et al. (2014) "Kinetics of Water Vapor Adsorption on Single-Layer Molecular Sieve 3A: Experiments and Modeling", Industrial & Engineering Chemistry Research, vol. 53, pp. 16015-16024.

Llano-Restrep et al. (2009) "Accurate correlation, thermochemistry, and structural interpretation of equilibrium adsorption isotherms of water vapor in zeolite 3A by means of a generalized statistical thermodynamic adsorption model", Fluid Phase Equilibria, vol. 283, pp. 73-88.

Rivera et al. (2013) "Optimization of Ethanol Dehydration by PSA with 3A Zeolite", Paper 342044, AIChE Annual Meeting, Nov. 3-8, 2013, p. 212.

Simo et al. (2009) "Adsorption/Desorption of Water and Ethanol on 3A Zeolite in Near-Adiabatic Fixed Bed", Ind. Eng. Chem. Res., vol. 48, pp. 9247-9260.

Song et al. (2008) "Frequency Response Measurements of Diffusion in Microporous Materials", Mol Sieves, vol. 7, pp. 235-276.

Wang et al. (2007) "Mixture Diffusion in Nanoporous Adsorbents: Development of Fickian Flux Relationship and Concentration-Swing Frequency Response Method", Ind. Eng. Chem. Res., vol. 46, pp. 2141-2154.

* cited by examiner

SWING ADSORPTION PROCESSES USING ZEOLITE STRUCTURES

CROSS REFERENCE TO RELATED APPLICATION

This application is a divisional of and claims priority to U.S. patent application Ser. No. 15/669,161 filed Aug. 4, 2017, which claims the benefit of U.S. Provisional Patent Application 62/382,544, filed Sep. 1, 2016, entitled SWING ADSORPTION PROCESSES USING ZEOLITE STRUCTURES, the entirety of which is incorporated by reference herein.

FIELD

The present techniques relate to rapid cycle swing adsorption using zeolite structures. In particular, the zeolite structures may be used in processes for separations, such as swing adsorption processes and system to enhance recovery of hydrocarbons.

BACKGROUND

Gas separation is useful in many industries and can typically be accomplished by flowing a mixture of gases over an adsorbent material that preferentially adsorbs one or more gas components, while not adsorbing one or more other gas components. The non-adsorbed components are recovered as a separate product.

By way of example, one particular type of gas separation technology is swing adsorption, such as temperature swing adsorption (TSA), pressure swing adsorption (PSA), partial pressure purge swing adsorption (PPSA), rapid cycle pressure swing adsorption (RCPSA), rapid cycle partial pressure swing adsorption (RCPPSA), and not limited to but also combinations of the fore mentioned processes, such as pressure and temperature swing adsorption. As an example, PSA processes rely on the phenomenon of gases being more readily adsorbed within the pore structure or free volume of an adsorbent material when the gas is under pressure. That is, the higher the gas pressure, the greater the amount of readily-adsorbed gas adsorbed. When the pressure is reduced, the adsorbed component is released, or desorbed from the adsorbent material.

The swing adsorption processes (e.g., PSA and TSA) may be used to separate gases of a gas mixture because different gases tend to fill the micropore of the adsorbent material to different extents. For example, if a gas mixture, such as natural gas, is passed under pressure through a vessel containing an adsorbent material that is more selective towards water vapor than it is for methane, at least a portion of the water vapor is selectively adsorbed by the adsorbent material, and the gas exiting the vessel is enriched in methane. Before the adsorbent material reaches the end of its capacity to adsorb water vapor it is switched from an adsorption step to a regeneration step. Regeneration can be accomplished by raising the temperature of the adsorbent (TSA), purging the adsorbent with a dry stream (PPSA), reducing the pressure of the adsorbent (PSA) or by combinations of these methods. Once the adsorbent has been regenerated it is ready for another adsorption cycle. If a PSA step was used in the regeneration it has to be repressurized before it can be used in the next adsorption cycle.

Because natural gas produced from subsurface regions is typically saturated with water ($H_2O$), dehydration is used to remove water to either pipeline specifications (e.g., in a range between 4 pounds per million cubic feet and 7 pounds per million cubic feet), NGL specifications (e.g., in a range between 0.1 parts per million (ppm) and 3 ppm), or LNG specifications (e.g., less than 0.1 ppm). Accordingly, typical methods and system utilize glycol dehydration along with an addition mole sieve dehydration system to remove water from a produced stream to provide a gaseous stream that satisfies specifications. The pipeline specifications may limit the water content to be less than about 4 pounds per million cubic feet to about 7 pounds per million cubic feet or the dew point has to be less than −5° F. to −15° F.

Similarly, for cryogenic processing conventional molecular sieve adsorbent beds are used to rigorous dehydrate the gas after glycol dehydration. The rigorous dehydration reduces water concentrations to less than 0.1 part per million (ppm) in a slow cycle TSA or PTSA process. The molecular sieve adsorbent beds are large because they are only regenerated once every hour to once a day. As such, the flow of regeneration gas out of the molecular sieve adsorbent bed is not steady and occurs in pulses when the molecular sieve adsorbent beds are regenerated. Further, the footprint of the slowly cycled molecular sieve adsorbent beds is large and the beds are heavy. The molecular sieve adsorbent beds typically use adsorbents, such as zeolite 5A and silica gel, which are prone to fouling. Moreover, adsorbent material in the molecular sieve adsorbent beds is configured as millimeter sized pellets that have mass transfer rate limitations in dehydration processes.

For example, U.S. Pat. No. 8,476,180 describes a process for regenerating a molecular sieve absorbent bed used for dehydrating an organic solvent. The process describes using the molecular sieve adsorbent bed for dehydrating ethanol, which includes a dehydrating cycle where an ethanol and water vapor mixture is loaded onto the molecular sieve adsorbent bed at a first temperature to absorb water and recover a substantially dehydrated ethanol vapor effluent. In a regeneration cycle, the molecular sieve adsorbent bed is subjected to a temperature swing technique whereby a dried gas, such as dried $CO_2$, heated to a second temperature greater than the first temperature, is passed over the molecular sieve adsorbent bed. Water and residual ethanol are removed with the $CO_2$ effluent and can be condensed and combined with a feed input for a subsequent dehydrating cycle. Unfortunately, this configuration relies upon the large slowly cycled heavy molecular sieve absorbent beds to handle the separation. Further, because of the long periods of time required to heat and regenerate such molecular sieve adsorbent beds, the molecular sieve units typically have a large footprint and are heavy.

As another example, Intl. Patent Application Publication No. WO2010/024643 describes a multi-tube type ethanol dehydration device that uses a pressure swing adsorption process in which producing dehydrated ethanol and regenerating an absorbent material are alternately performed in one multi-tube type bed. The dehydration device transfers heat by using a heat source generated during the absorption step. Again, the dehydration device as described uses long cycle times and has a larger footprint and are heavy.

As yet another example, U.S. Pat. No. 4,424,144 describes a method for shaping products of a 3A zeolite that are formed as beads or extrudates without any binder remaining. In this method, a 4A zeolite powder is mixed with a caustic solution and a metakaolin clay binder to form beads. Then, the beads are converted to a binderless 4A zeolite product, which is given a partial calcium exchange followed by a potassium exchange to obtain the desired 3A zeolite binderless bead. The size of the bead limits the mass transfer rate and the productivity. As a result, the rate at which feed is processed per unit of adsorbent material is significantly high.

Further, in addition to disadvantageous of certain types of configurations for dehydration, the intrinsic performance of the adsorbent material may be problematic. For example, in Lin et al., the fundamental adsorption kinetic data for water on single-layer 3A is given. The linear driving force coefficients are in the range between 3 per hour (h) and 7.4e-3/h (e.g., a range between 3/h and $7.4 \times 10^{-3}$/h) for different partial pressures from 1.24 kPa and 3.1e-4 kPa (e.g., a range between 1.24 kPa and $3.1 \times 10^{-4}$ kPa). See e.g., Lin et al., Kinetics of water vapor adsorption on single-layer molecular sieve 3A: experiments and modeling, IECR, 53, pp. 16015-16024 (2014). This process is slow as the kinetics are slow acting.

Further still, in Simo et al., a pilot scale adsorber apparatus was designed and constructed to investigate water and ethanol adsorption/desorption kinetics on 3A zeolite pellet for the design purposes of a fuel ethanol dehydration pressure swing adsorption (PSA) process. See, e.g., at Marian Simo, Siddharth Sivashanmugam, Christopher J. Brown, and Vladimir Hlavacek, Adsorption/Desorption of Water and Ethanol on 3A Zeolite in Near-Adiabatic Fixed Bed, Ind. Eng. Chem. Res., 48 (20), pp. 9247-9260 (2009). The breakthrough curves were utilized to study the effects of column pressure, temperature, flow rate, pellet size, and adsorbate concentration on the overall mass transfer resistance. The reference describes that the macropore and micropore diffusion mechanisms are the controlling diffusion mechanisms. The adsorbent is in pellet form with mass transfer resistances and rates.

Further, other publications describe the use of zeolite 4A in rapid cycle dehydration. These methods typically involve air drying and are not as fouling prone as treatment of natural gas streams. Indeed, many of the potential foulants in natural gas streams have the potential to diffuse into zeolite 4A over long exposure times. An example of the use of zeolite 4A in rapid cycle air drying is described in Gorbach et al. See Andreas B. Gorbach, Matthias Stegmaier and Gerhart Eigneberger, Compact Pressure Swing Adsorption Processes—Impact and Potential of New-type adsorbent-polymer monoliths, Adsorption, 11, pp. 515-520 (2005).

As another example, U.S. Pat. No. 4,769,053 describes a latent heat exchange media comprising a gas permeable matrix. The gas permeable matrix is formed of a sensible heat exchange material that is capable of absorbing sensible heat from a warm air stream and releasing the absorbed sensible heat into a cool air stream as the air streams flow through the heat exchange media. A layer of a coating composition comprising a molecular sieve is applied to at least a portion of the surface of the heat exchange material. The molecular sieve has pores that adsorbs moisture from a humid air stream flowing through the heat exchange media, and releases the adsorbed moisture into a dry air stream flowing through the heat exchange media. However, the heat exchange media does not appear to be capable of adsorbing contaminants from the respective streams.

While conventional approaches do perform dehydration on certain streams, these system have certain deficiencies, such as fouling and are not capable of handling rapid cycle processing of streams. Indeed, conventional systems, which may utilize adsorbent materials, such as 4A or 5A zeolites, silica or alumina, perform slow cycle dehydration processes. These processes involve equipment and units that have a larger footprint and/or weight more than rapid cycle processes.

Accordingly, there remains a need in the industry for apparatus, methods, and systems that provide enhancements in adsorbent materials for swing adsorption processes. Further, the present techniques provide adsorbent materials with enhanced kinetics for rapid cycle dehydration configurations, and enhanced foulant resistance. Accordingly, the present techniques overcome the drawbacks of conventional adsorbent materials.

SUMMARY OF THE INVENTION

In one embodiment, the present techniques describe a process for removing water from a gaseous feed stream. The process comprising performing a rapid cycle swing adsorption process by: a) performing an adsorption step, wherein the adsorption step comprises passing a gaseous feed stream through an adsorbent bed unit having a substantially parallel channel contactor to separate water from the gaseous feed stream to form a product stream, wherein the substantially parallel channel contactor comprises an adsorbent material being a zeolite 3A having (i) a K to Al atomic ratio is in a range between 0.3 and 1.0; and (ii) a Si to Al atomic ratio is in a range between 1.0 and 1.2; b) interrupting the flow of the gaseous feed stream; c) performing a regeneration step, wherein the regeneration step comprises removing at least a portion of the water from the substantially parallel channel contactor; and d) repeating the steps a) to c) for at least one additional cycle.

In another embodiment, a cyclical rapid cycle swing adsorbent system for removing water from a gaseous feed stream is described. The rapid cycle swing adsorbent system comprising one or more adsorbent bed units that each comprise: a housing forming an interior region; a substantially parallel channel contactor disposed within the interior region of the housing, wherein the substantially parallel channel contactor comprises an adsorbent material being a zeolite 3A having (i) a K to Al atomic ratio is in a range between 0.3 and 1.0; and (ii) a Si to Al atomic ratio is in a range between 1.0 and 1.2; and a plurality of valves secured to the housing, wherein each of the plurality of valves is in flow communication with a conduit and configured to control fluid flow along a flow path extending from a location external to the housing through the conduit and to the substantially parallel channel contactor through the valve.

In yet another embodiment, a composition or substantially parallel channel contactor is described. The composition or substantially parallel channel contactor may include an adsorbent material, wherein the adsorbent material is a zeolite 3A having (i) a K to Al atomic ratio is in a range between 0.3 and 1.0; and (ii) a Si to Al atomic ratio is in a range between 1.0 and 1.2. Further, the zeolite 3A comprise very good quality crystals or excellent quality crystals. Also, the adsorbent material has the K to Al atomic ratio is in a range between 0.35 and 0.98 or in a range between 0.4 and 0.8.

BRIEF DESCRIPTION OF THE FIGURES

The foregoing and other advantages of the present disclosure may become apparent upon reviewing the following detailed description and drawings of non-limiting examples of embodiments.

DETAILED DESCRIPTION OF THE INVENTION

Figure 1:
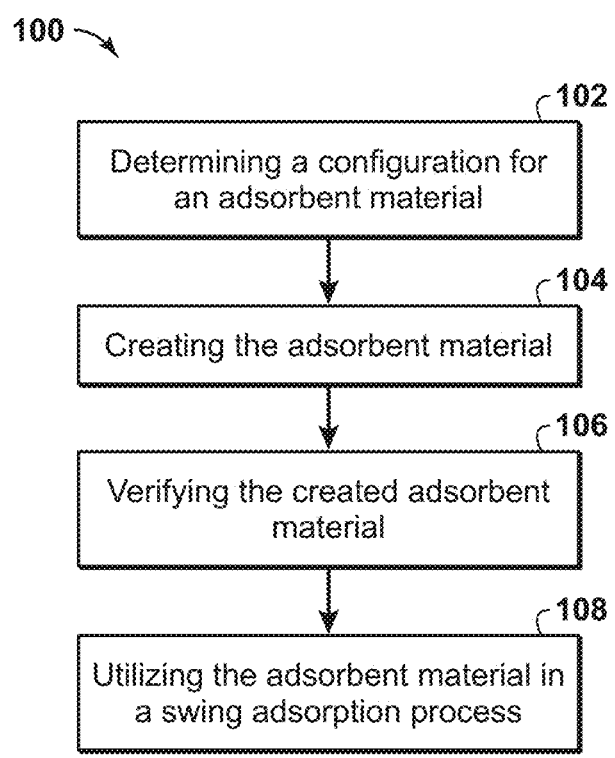
FIG. 1 is a flow diagram of a process for fabricating an adsorbent material in accordance with an embodiment of the present techniques.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

As used herein, "stream" refers to fluid (e.g., solids, liquid and/or gas) being conducted through various equipment. The equipment may include conduits, vessels, manifolds, units or other suitable devices.

As used herein, volume percent is based on standard conditions. The standard conditions for a method may be normalized to the temperature of 0° C. (e.g., 32° F.) and absolute pressure of 100 kilopascals (kPa) (1 bar).

The present techniques relate to the enhancement of adsorbent materials for rapid cycle swing adsorption systems used to dehydrate feed streams using zeolite 3A. Zeolite 3A are an LTA (e.g., a Zeolite structure type designated by the international zeolite association) structure type with a silicon (Si) to Aluminum (Al) (e.g., Si/Al) in a range between 1.2 and 1.0 (inclusive of 1.0) with ratio of Potassium (K) cations to Al (K/Al) in a range between 0.2 and 1.0 (inclusive of 1.0). When the K/Al ratio is less than 0.95, the majority (>50%) of the remaining cations are Sodium (Na) (e.g., the non-potassium cations). As such, there is a wide range of cation compositions that fall into the broad definition of zeolite 3A. Accordingly, the present techniques may include a preferred range of compositions and zeolite crystal quality for fouling tolerant rapid cycle rigorous dehydration swing adsorption processes. By way of example, one particular type of gas separation technology is swing adsorption, such as rapid temperature swing adsorption (RTSA), rapid cycle pressure absorption (RCPSA), rapid cycle partial pressure swing adsorption (RCPPSA), and not limited to but also combinations of the afore mentioned processes.

Swing adsorption processes may be used to remove water vapor from a gas mixture because water selectively adsorbs into the micropore of the adsorbent material, and may fill the micropores in certain situations. The swing adsorption processes (e.g., PSA and TSA) may be used to separate gases of a gas mixture because different gases tend to fill the micropore of the adsorbent material to different extents. For example, if a gas mixture, such as natural gas, is passed under pressure through a vessel, such as an adsorbent bed unit, containing an adsorbent material that is more selective towards water vapor than it is for methane, at least a portion of the water vapor is selectively adsorbed by the adsorbent material, and the gas exiting the vessel is enriched in methane. With highly selective adsorbent materials having a sufficiently strong isotherm, it is possible to rigorously dehydrate a methane or natural gas stream. Rigorous dehydration is the removal of water so that the concentration of water in the product gas or stream (e.g., the gas exiting the adsorbent bed, such as a substantially parallel channel contactor, during the adsorption step) is less than 50 ppm on a mole basis, preferably less than 1 ppm on a mole basis or even more preferably less than 0.1 ppm on a mole basis.

In performing rapid cycle swing adsorption system, the adsorbent bed (e.g., a substantially parallel channel contactor) is regenerated before the adsorbent material reaches the end of its capacity to adsorb water vapor. PSA processes can be used to regenerate the adsorbent used for dehydration, but sufficient regeneration involves low pressures (e.g., vacuum pressures) and long periods of time for regeneration. For rapid cycle dehydration processes, the adsorbent bed may be regenerated using rapid cycle PSA, rapid cycle TSA and/or rapid cycle PPSA processes. After regeneration, the adsorbent material is then purged and repressurized. For certain configurations, where methane comprises the feed to the separation process, it is often beneficial to use a purge gas comprising at least 40% methane by volume. Then, the adsorbent material is prepared for another adsorption cycle.

In rapid cycle processes the residence time of the gas contacting the adsorbent material in the adsorbent bed during the adsorption step is typically short. For rapid cycle swing adsorption processes, the residence time for gas contacting the adsorbent material in the adsorbent bed during the adsorption step is less than 2.5 seconds, preferably less than 0.5 seconds and even more preferably less than 0.1 seconds. Accordingly, the water removal adsorbent material has to equilibrate with the local gas environment in a time period that is less than one half of the gas residence time and more preferably less than one fifth of the gas residence time and even more preferably less than one tenth of the gas residence time. Residence time is defined as the length of the adsorbent bed divided by the average velocity of the feed stream passing through the adsorbent bed during the adsorption step of the swing adsorption process. It is defined at the temperature and pressure of the feed stream passing through the adsorbent bed during the adsorption step. For water removal, the adsorbent material has to equilibrate with the local gas environment in a time frame that is less than one half of the gas residence time and more preferably less than one fifth of the gas residence time and even more preferably less than one tenth of the gas residence time. Equilibration is defined as the time it takes to load the zeolite of at least half of the swing capacity of the adsorbent. For example, if a zeolite 3A adsorbent is initially loaded with 5 millimole per gram (g) of water and the local concentration of water at the surface of the crystal ultimately produces a loading of 12 millimole/g, or the swing capacity is 7 millimole/g. The swing capacity for water vapor may be defined at each location (point) within the adsorbent bed. A manifestation of sufficiently fast kinetics is that the water vapor concentration exiting the adsorbent bed does not rise during the adsorption step until an adsorption front passes through the adsorbent bed and a sharp breakthrough is observed. The swing capacity in the adsorbent bed at the initial breakthrough is at least one-third of the ultimate swing capacity, which can be defined as the loading of the adsorbent bed after it has equilibrated with the feed minus the initial loading of the adsorbent bed. More preferably, the swing capacity in the adsorbent bed at the initial breakthrough may be at least three-fourths of the ultimate swing capacity. Rapid cycle dehydration swing adsorption processes of the present techniques are performed so that the adsorption front does not break through the adsorbent bed during the adsorption step and the front is contained in the adsorbent bed. To prevent breakthrough of a water front in a rapid cycle swing adsorption dehydration processes, the adsorbent material has to equilibrate with the water vapor flowing through the adsorbent bed in a time frame of less than 0.5 seconds, preferably less than 0.1 seconds and even more preferably in a time frame of less than 0.025 seconds.

Dehydration is utilized in cryogenic natural gas processing because natural gas contains significant amount of water vapor, which condenses and forms solid ice-like crystals (e.g., hydrates) as temperature and pressure change in cryogenic processing facilities. The crystals build-up and foul processing equipment, such as heat exchangers. To prevent this fouling, the gas fed to the cryogenic processing facility has to be dehydrated to levels below parts per million (ppm) water levels. In pipeline operations, the gas stream has to be dehydrated to a specific dew point to produce pipeline quality product. The present techniques provide an adsorbent material composition that provides enhancements to dehydrating natural and associated gas using rapid cycle swing adsorption processes. The present techniques may be applicable to Liquefied Natural Gas (LNG) projects as well as Natural Gas Liquids (NGL) plants. The present techniques describe a method to dehydrate natural gas that may lessen capital expenses, lessen weight, lessen the footprint and lessen energy usage as compared to conventional systems. This may be particularly useful in floating facilities, subsea configurations along with NGL plants.

By way of example, conventional practices utilize large slow cycle molecular sieve adsorbent beds that are thermally regenerated. The adsorbent material used is typically zeolite 4A or 5A. In some approaches, the adsorbent used is silica or alumina. Combination or layers of adsorbent are used in many situations. By comparison, rapid cycle swing adsorption processes provide enhancements of using less adsorbent, reducing size of equipment to have less capital cost and foot print. In addition, the rapid cycle swing adsorption processes make possible a mobile system to be used in remote areas, offshore, and other hard to reach places. The technology can also be better integrated into NGL and LNG facilities than conventional slow cycle molecular sieve adsorbent beds that infrequently have regeneration gas.

Moreover, rapid cycle swing adsorption dehydration processes using appropriately selected zeolite 3A can be performed at various gas processing facilities, such as a gas plant, an offshore platform, as well as a wellhead on land or subsea for any dehydration processing. The advantages of rapid cycle dehydration processes using appropriately selected zeolite 3A are more effective for dehydration to below parts per million water levels in the feed gas to NGL or LNG plants that utilize cryogenic processing. Because the rapid kinetic transport of water in the zeolite 3A adsorbent involves regeneration with a modest amount of purge, it is possible to develop fouling tolerant dehydration processes that may be integrated into such facilities. By way of example, an adsorbent bed containing the zeolite 3A adsorbent may be capable of rigorous dehydration of high pressure natural gas streams (e.g., pressures greater than 300 psi, or more preferably greater than 600 psi). The rapid cycle swing adsorption process relies upon the kinetic adsorption rate of water on zeolite 3A, which is very fast even at various low water activities. Moreover, the rate of water adsorption is not hindered by foulants and adsorbents have a high re-generable water capacity (e.g., in excess of about 3 millimole per gram (mmol/g)) even at low water concentrations of tens to hundreds of ppm in the feed stream. Testing shows that a wet stream can pass through an adsorbent bed of 3A with less than 0.1 s residence time in the bed to achieve the desired water specifications of either pipeline or LNG. The adsorbent bed can then be taken off line and the water can be removed by either depressurizing and flushing the bed with dry gas or flushing the bed with hot gas with or without depressurization (e.g., performing a purge or heating step). To enhance the efficiency of water removal, it is preferred that the zeolite 3A adsorbent be a structured adsorbent bed that forms a contactor, such as a substantially parallel channel contactor. It is further preferred that the structured adsorbent bed be configured to operate in a parallel contacting mode so that a sharp adsorption front moves along the structured adsorbent during the adsorption or feed step. Specific zeolite 3A materials may be used to construct this contactor. In an alternative embodiment, the contactor may be fabricated with either zeolite 4A or 5A and ion exchanged to zeolite 3A after construction. Because the rapid kinetic transport of water in the 3A adsorbent, the adsorbent material may be regenerated with a modest amount of purge. The small effective pore size of the suitable zeolite 3A materials makes it is possible to develop fouling tolerant rigorous dehydration processes that are well integrated into NGL and LNG plants.

Zeolite 3A samples with fouling tolerance sufficient to be used in rapid cycle natural gas dehydration have a K cation content that on a molar basis is greater than 30% of the Al content. It is preferred that at least 90% of the remaining or non-potassium cations be Na. In a more preferred embodiment the fouling tolerance is enhanced with a K cation content that on a molar basis is greater than 35% of the Al content. In an even more preferred embodiment, fouling tolerance is further enhanced with a K cation content that on a molar basis is greater than 50% of the Al content. Extremely fouling tolerant zeolite 3A materials have a K cation content that on a molar basis is greater than 80% of the Al content. Two different methods may be used to assess the fouling tolerance of different zeolite 3A samples. The first method involves direct exposure to foulants and the measurement of how water transport (e.g., swing adsorption capacity and kinetics) are altered after exposure. Example 5 illustrates this methodology and shows the fouling tolerance of high quality zeolite 3A samples with 40% K content. A second method provides an approach to assess the fouling tolerance of different zeolite 3A samples from the isotherm of $CO_2$ measured when the sample has equilibrated with $CO_2$ for a time of less than 3 minutes. To have sufficient fouling tolerance, it is preferred to have a $CO_2$ capacity (25° C. and less than 3 minute equilibration times in isotherm measurement) of less than 2 milli moles/gram at 760 torr. A more preferred fouling tolerance is a $CO_2$ loading in an isotherm measurement (at 25° C. with less than 3 minute equilibration times) of less than 1.5 millimole/gram at 760 torr. An even more preferred fouling tolerance is a $CO_2$ loading in an isotherm measurement (at 25° C. with less than 3 minute equilibration times) of less than 0.5 millimole/gram at 760 torr.

To obtain rapid kinetics less than 10%, preferably less than 5% and even more preferably less 1% of the Al within the zeolite crystal should be extra framework aluminum. Extra framework aluminum blocks access of water into the micropore structure of zeolite 3A and can be measured in an aluminum Nuclear Magnetic Resonance (NMR) experiment. Ion exchange procedures that convert highly crystalline zeolite 4A into zeolite 3A can in many instances degrade the zeolite framework and yield extra framework aluminum. Example 6 shows how an ion exchange procedure using a buffer produced this type of degradation.

To obtain rapid kinetics, the zeolite 3A sample should be highly crystalline. X-ray diffraction can be used to assess the crystallinity of a zeolite sample. Amorphous material in the sample is shown by broad diffuse peak in the x-ray diffraction pattern. When the x-ray diffraction pattern is recorded using copper-potassium (Cu K) x-ray radiation a broad peak from amorphous material in the sample appears as a maximum at a two-theta of approximately 28 degree. Subtracting the baseline in the diffraction pattern provides a measure of the amplitude of this amorphous peak. The ratio of this amorphous peak amplitude to the strong sharp peak from zeolite 3A at a two-theta of about 24 degrees provides a measure of the amount of amorphous material in the sample. It is preferred that this ratio is less than 0.2, more preferably less than 0.1 and even more preferably less than 0.05. Another measure compares the amplitude of the amorphous peak to the peak a two-theta of 30 degrees. Further, the ratio may be preferred to be less than 0.2, more preferably less than 0.1 and even more preferably less than 0.05. Examples 6 and 8 show the ability of x-ray diffraction to detect amorphous materials in zeolite 3A samples.

To obtain rapid kinetics fouling tolerance and high working capacities in rapid cycle swing adsorption dehydration process, it is preferred to use a zeolite 3A with a K/Al atomic ratio between 0.3 and 1.0, preferably between 0.4 and 0.98, preferably between 0.35 and 0.98 and even more preferably between 0.4 and 0.8. It is preferred that more than 50% of the reaming cations in the zeolite 3A are Na, more preferably more than 80% and even more preferably more than 90%.

To obtain fast kinetic and rapid equilibration, it is preferred that the mass average zeolite crystal size be less than 20 microns, more preferable less than 10 microns, less than 5 microns and even more preferable less than 3 microns. Similarly the average size of zeolite aggregates should be less than 40 microns, more preferably less than 20 microns and even more preferably less than 10 microns.

Kinetics of zeolite samples can be measured in the laboratory using ballistic chromatography. For quantification of fast diffusivity measurements, a variation of the chromatographic breakthrough technique may be utilized. The technique has been described in U.S. Patent Publication No. 2016/0175759 in the context of $CO_2$ adsorption. In these measurements, a small amount of sample (e.g., zeolite crystals) is placed in a packed bed of about 1 centimeter (cm) in lengths, and about 0.1 cm in diameter. The weight of the dry sample in the packed bed is accurately measured and depending on how the packed bed is loaded can range between 2 milligrams (mg) and 20 mg. The sample placed into the packed bed is composed of individual zeolite crystals or small aggregates of the crystals. For water vapor delivery helium gas stream is passed through a bubbler, which is maintained at a temperature lower than the temperature of the adsorption bed to avoid condensation. A mass spectrometer with a fast data acquisition is used to monitor the effluent concentration of water vapors.

The gas residence time in such a system can be calculated based on equation (e1):

$$t_{res} = L/v \qquad (e1)$$

where L is the adsorption bed length, and v is the gas velocity. Also, the gas velocity is calculated based on equation (e2):

$$v = \frac{F_0}{\varepsilon S}\left(\frac{P_0}{P}\right)\left(\frac{T}{T_0}\right) \qquad (e2)$$

where $F_0$ is the volumetric flow rate at standard temperature $T_0$ and pressure $P_0$, S is the bed cross-sectional area, and $\varepsilon$ is the bed porosity (fraction of void space between zeolite crystals).

In the developed system, the gas is flowed into the bed at a flow rate of about 10 standard cubic centimeters (cc) per minute. Pressure drop through the bed may be in a range between about 5 to about 50 psi depending on the size of the crystals, the amount of sample and how they are packed into the bed. When there is a pressure drop through the bed, the pressure used to calculate the residence time is the average of the inlet and the outlet pressure. Typically, the gas velocity is on the order of about 30 centimeters per second (cm/s), and the corresponding gas residence time is very short, on the order of $t_{res}=0.03$ seconds (s). The response of the column is indicative of the equilibrium and kinetics of the adsorption process.

If the kinetics of the sample are fast, a sharp breakthrough front appears at a time that is more than 30 seconds later than the time at which a front appears with no sample in the cell. The swing adsorption capacity of the sample at the point of breakthrough can be calculated from the time of breakthrough and can be directly calculated from the rate at which molecules are being fed into the bed. It is preferred that this swing capacity at the initial breakthrough is at least one-third of the ultimate swing capacity which can be defined as the ultimate loading of the bed calculated from the shape of the breakthrough curve and the rate at which molecules are delivered. More preferably, the swing capacity in the bed at the initial breakthrough may be at least three-fourths of the ultimate swing capacity. The ultimate swing adsorption capacity can be calculated from the time average t[averaged] of the instantaneous concentration at the outlet c and the outlet concentration at long times $c_0$, as shown by equation (e3):

$$t[averaged] = \int_0^\infty (1 - c/c_0) dt \qquad (eq3)$$

where t=0 is taken to be the time at which a front appears with no sample in the cell. The ultimate swing adsorption of the column n[ultimate] is calculated from equation (e4):

$$n[ultimate] = \frac{F_0 t[averaged] c_0}{m} \qquad (e4)$$

where the swing adsorption rate the time (t[breakthrough) the sharp breakthrough front breaks through the column is $$n[breakthrough] = \frac{F_0 t[breakthrough] c_0}{m} \qquad (e5)$$

where samples with n[breakthrough]/n[ultimate]>⅓ have an initial breakthrough capacity greater than one-third of the ultimate swing capacity. Such samples are then candidates for qualifying as having fast kinetics.

These samples equilibrate with water vapor in a time frame that is less than one third of the gas residence time ($t_{res}$). As such, the ballistic chromatography method measures the time frame it takes water vapor to equilibrate with a zeolite 3A sample. It is preferred that this time frame is less than 0.5 seconds, preferably less than 0.1 seconds and even more preferably in a time frame of less than 0.025 seconds. When kinetic are slow, water breaks through the bed at time almost equal to a blank bed or the water baseline concentration rises noticeably before the breakthrough occurs. Similarly, the breakthrough capacity for samples with such slow kinetics are small. For zeolite 3A materials used in rapid cycle swing adsorption processes with a residence time for gas contacting the adsorbent material in the adsorbent bed during the adsorption step of less than 2.5 seconds, the time it takes water vapor to equilibrate with the zeolite 3A material should be less than 0.5 seconds. For Zeolite 3A materials used rapid cycle swing adsorption processes with a residence time for gas contacting the adsorbent material in the adsorbent bed during the adsorption step of less than 0.5 seconds, the time it takes water vapor to equilibrate with the zeolite 3A material should be less than 0.1 seconds.

Another parameter that may be used to describe the breakthrough when the gas residence time is less than 2.5 seconds more preferably less than 0.5 seconds and even more preferably less than 0.1 seconds is a parameter theta θ that can be estimated from the slope of the midpoint slope of the breakthrough response $c/c_0$, as shown by equation (e6):

$$\theta = t[res] * Slope * 1000 \qquad (e6)$$

where t[res] is the residence time of gas in the column, and Slope is the slope of the breakthrough curve $c/c_0$ between $c/c_0=0.4$ and $c/c_0=0.6$. For a fast kinetic processes, it is preferred that this parameter theta (θ) is greater than at least 0.2, or more preferentially greater than 0.5, and even more preferred greater than 2. For zeolite 3A materials used in rapid cycle swing adsorption processes with a residence time for gas contacting the adsorbent material in the adsorbent bed during the adsorption step of less than 2.5 seconds, the parameter theta (θ) should be greater than 0.2. For zeolite 3A materials used rapid cycle swing adsorption processes with a residence time for gas contacting the adsorbent material in the adsorbent bed during the adsorption step of less than 0.5 seconds, the parameter (θ) should be greater than 0.5.

Substantially parallel channel contactors with mass transfer characteristics closely resembling those of the zeolite 3A adsorbent can be constructed by coating thin layers of zeolite 3A and a binder onto a monolith. Substantially parallel channel contactors, such as monoliths, provide very low pressure drop as compared to conventional pellet or other packed beds, which provides a mechanism for the economic use of significantly higher gas velocities and hence higher productivity. One of the primary factors to the performance of a substantially parallel channel contactor and its application for rapid cycle swing adsorption systems is to avoid or minimize mass transfer resistances, and thus allow the intrinsic speed of the primary adsorber, typically a molecular sieve, such as zeolite 3A, to be realized. Avoidance of mass transfer resistances in rapid cycle contactors provide the conditions to facilitate the generation of sharp adsorption fronts, particularly for strong Type 1 isotherm adsorption systems, such as water, in 3A zeolite. Sharp fronts within the length of the adsorption contactor provide efficient adsorbate removal to very low concentrations.

Minimization of mass transfer resistance may be accomplished in a substantially parallel channel contactor by several steps. Gas film transfer resistance is minimized by making the gas channels in the contactor of small diameter, such that the distance any adsorbate species has to diffuse in the gas phase is limited to one half the diameter of the gas channel. Gas channel diameters, or heights, of less than 2 millimeter are preferred, less than 1 millimeter are more preferred, and less than 600 microns are most preferred. Secondly, limiting the thickness of adsorbate containing coatings reduces the distance that adsorbate species has to diffuse through the macropores and mesopores of the composited adsorbate coating. Preferably, the volume of the zeolite 3A or other molecular sieve is greater than that of the binder and thickness of the layer is less than 800 microns, preferably less than 200 microns and even more preferably less than 125 microns, most preferably less than 60 microns. Further, it is beneficial to minimize the amount of mesopores within the coating layer, with a predominance of macropores being preferred due to the faster diffusion speeds of gas species in macropores as compared to mesopores. It is preferred that at least 50% of the pore volume of the adsorbate coating layer is in macropores, i.e. pore diameters greater than 50 nanometers, more preferably at least 75%, and most preferably greater than 90%. Lastly, adsorbent coating layers with low intrinsic tortuosity are preferred.

While not limiting, suitable contactors may be constructed of adsorbate coatings on ceramic monoliths, or spaced laminated support sheets of metal, metal mesh, polymer, or polymer mesh, or various screens when laminated and spaced with spacers or other means to provide a gas flow channel parallel to the coating layers. Corrugated metal sheets, either layered or spiral wound coated with an adsorbent layer are particularly useful and flexible in their possible designs and gas channel characteristics. Contactors constructed from multiple monoliths or other such structures stacked in series are also particularly useful, as spaces between the monoliths or such provide gas mixing and can minimize front dispersion caused by variations in adsorbate coating thicknesses or gas channel diameters.

Beneficially, the present techniques provide suitable adsorbent materials that may be utilized to enhance kinetics for rapid cycle dehydration configurations, and to enhance foulant resistance (e.g., resistance to fouling from molecules including various hydrocarbons, amines, and alcohols). Further, the present techniques may be used to lessen the footprint of the contaminant removal system. For example, the molecular sieve adsorbent beds may be five times greater than the adsorbent beds utilized in swing adsorption processes in certain similar configurations. In addition, the weight of the molecular sieve adsorbent beds may be more than ten times greater than the adsorbent beds (e.g., substantially parallel channel contactor) utilized in swing adsorption processes. Further, the molecular sieve adsorbent beds typically use adsorbents, such as zeolite 5A and silica gel, which are prone to fouling. Adsorbent materials in the adsorbent bed is configured as millimeter sized pellets that have mass transfer limitations in dehydration processes, while the present techniques overcome the mass transfer and fouling limitations by utilizing specific adsorbent materials, such as certain zeolite 3A in a structured adsorbent.

In one configuration, a process for removing water from a gaseous feed stream. The process comprises performing a rapid cycle swing adsorption process by: a) performing an adsorption step, wherein the adsorption step comprises passing a gaseous feed stream through an adsorbent bed unit having a substantially parallel channel contactor to separate water from the gaseous feed stream to form a product stream, wherein the substantially parallel channel contactor comprises an adsorbent material being a zeolite 3A having (i) a K to Al atomic ratio is in a range between 0.3 and 1.0; and (ii) a Si to Al atomic ratio is in a range between 1.0 and 1.2; b) interrupting the flow of the gaseous feed stream; c) performing a regeneration step, wherein the regeneration step comprises removing at least a portion of the water from the substantially parallel channel contactor; and d) repeating the steps a) to c) for at least one additional cycle.

As further enhancements, the process may include some additional variations to the process. For example, the rapid cycle swing adsorption process may comprise a rapid cycle pressure swing adsorption process, a rapid cycle temperature swing adsorption process, a rapid cycle partial pressure swing adsorption process, or any combination thereof; the regeneration step may further comprise performing a purge step, wherein the purge step comprises passing a purge stream into the adsorbent bed unit to remove the at least a portion of the water from the substantially parallel channel contactor to form a purge product stream; the rapid cycle swing adsorption process may comprise a rapid cycle pressure swing adsorption process; may include performing one or more depressurization steps after step b) and prior to step c), wherein the pressure within the adsorbent bed unit is reduced by a predetermined amount with each successive depressurization step; may include heating the substantially parallel channel contactor to promote the removal of the at least a portion of the water from the substantially parallel channel contactor to form a purge product stream; and may include passing a heated purge stream through the substantially parallel channel contactor to promote the removal of the at least a portion of the water from the substantially parallel channel contactor to form a purge product stream; the feed pressure is in the range between 400 pounds per square inch absolute (psia) and 1500 psia; wherein the gaseous feed stream may comprise hydrocarbons and $H_2O$, wherein the $H_2O$ is in the range of two parts per million volume to saturation levels in the gaseous feed stream; wherein the gaseous feed stream may be a hydrocarbon containing stream having greater than one volume percent hydrocarbons based on the total volume of the feed stream; wherein the cycle duration is greater than 2 seconds and less than 300 seconds; wherein residence time for gas in the gaseous feed stream contacting the adsorbent material in the substantially parallel channel contactor during the adsorption step is less than 2.5 seconds, is less than 0.5 seconds or is less than 0.1 seconds; and/or wherein the concentration of water in the product stream is less than 50 parts per million on a mole basis, is less than 1 parts per million on a mole basis or is less than 0.1 parts per million on a mole basis.

As additional enhancements, the substantially parallel channel contactor may include certain variations. For example, the adsorbent material may have the K to Al atomic ratio is in a range between 0.35 and 0.98 or in a range between 0.4 and 0.8; the adsorbent material may have greater than 50% of the non-potassium cations in the zeolite 3A being Na, greater than 80% of the non-potassium cations in the zeolite 3A being Na, or greater than 90% of the non-potassium cations in the zeolite 3A being Na; wherein the adsorbent material may have a fouling tolerant, wherein fouling tolerant is defined as the adsorbent material having a $CO_2$ capacity at 25° C. and less than 3 minute equilibration times in isotherm measurement of less than 2 milli moles/gram at 760 torr or fouling tolerant is defined as the adsorbent material having a $CO_2$ capacity at 25° C. and less than 3 minute equilibration times in isotherm measurement of less than 0.5 milli moles/gram at 760 torr; wherein average size of zeolite aggregates in the zeolite 3A may be less than 40 microns or less than 10 microns; wherein mass average size of zeolite aggregates in the zeolite 3A may be less than 5 microns; wherein the purge stream may be predominately methane and/or wherein the zeolite 3A comprise very good quality crystals or excellent quality crystals. The present techniques may be further understood with reference to the FIGS. 1 to 22 below.

FIG. 1 is a flow diagram 100 of a process for fabricating an adsorbent material in accordance with an embodiment of the present techniques. In this diagram 100, the method involves determining an adsorbent material and using that adsorbent material in a swing adsorption process, such as a rapid cycle swing adsorption process. In particular, the method may include determining a configuration for the adsorbent material, as shown in block 102, producing the adsorbent material, as shown in blocks 104 and 106, and utilizing the adsorbent material in a swing adsorption process, as shown in block 108.

The method begins at block 102. In block 102, a configuration for an adsorbent material is determined. This determination may involve modeling and identifying various aspects of the configuration, such as determining the mechanical features of the configuration, determining flow paths through the configuration, determining the cell size, determining the pressure drop, determining the operating conditions that the configuration is subject to (e.g., pressures, temperatures and stream compositions), determining the contaminants to be adsorbed by the adsorbent material in the configuration; and/or entrance and exit valve configuration to control the various flows and/or velocities, and hence residence times during the process must also be determined.

Once the adsorbent material is determined, the adsorbent material is produced, as shown in blocks 104 and 106. At block 104, the adsorbent material is created. The creation of the adsorbent material may involve mixing an active adsorbent material with organic and/or inorganic binders to provide a specific formulation that provides good adhesion if used as a coating, or good structural stability if used as a self-supported monolith. At block 106, the created adsorbent material may be verified. The verification of the created adsorbent material may include using sensors to obtain measurements on the created adsorbent material to identify voids, fractures and/or non-homogeneous sections of the created adsorbent material.

Once produced, the adsorbent material may be utilized in a swing adsorption process, as shown in block 108. For example, the adsorbent material may be used in a rapid cycle swing adsorption process to remove one or more contaminants from a feed stream. Exemplary swing adsorption processes are described in U.S. Patent Application Publication Nos. 20170056810; 20170056813; 20170056814 and 20170056815, which are each herein incorporated by reference in their entirety.

In certain embodiment, a rapid cycle dehydration process may utilize specific zeolite 3A to enhance the process compared to conventional glycol dehydration and molecular sieve dehydration processes, which typically involve long time cycles. This rapid cycle utilizes the fast water kinetics on specific zeolite 3A in addition its high water capacity and enhanced fouling resistance. Accordingly, a wet stream may pass through an adsorption bed of specific zeolite 3A with less than 0.1 second residence time in the adsorbent bed to achieve the desired water specifications for a pipeline or a LNG system. The adsorbent bed can then have the adsorption step interrupted and a regeneration step may be performed to remove water through one or more depressurization steps and/or purge steps, which may involve a dry gas stream isothermally or with added heat.

In contrast to other proposed usage of zeolite 3A, the conventional usage of zeolite 3A is forming them as pellets instead of thin layers or structures used in a rapid cycle contactor. Conventional zeolite adsorbent materials are made by compressing or extruding zeolite crystals (e.g., about 1 micrometer (μm) in diameter) into pellets (e.g., a few millimeters in diameter) with the aid of a binder. The mass transfer in pellets may be controlled by macropore diffusion resistances in addition to mass transfer in zeolite crystals, also called micropore diffusion. Macropores (e.g., voids in the pellet) act as a conduit to transport the gas molecules from the pellet surface to the particle interior. A combination of two diffusion mechanisms, Knudsen diffusion and the molecular (bulk) diffusion, is possible in the macropore region depending on the size of the pore, the pressure, and the diffusing molecule. Once the macropore diffusion in the pellet is slower than the micropore diffusion in zeolite crystals, the rate dominating step is determined by the mass transfer in the macropores. This is often the case with the use of conventional pelletized adsorbent systems.

Example 1 is an example that provides evidence of fast kinetics for a good commercial sample of zeolite 3A crystals. The commercial 3A samples have a Si/Al ratio of about 1. Approximately 40 mole % of the cations in these samples were potassium (K) with the balance being Na. X-ray diffraction studies show that this was highly crystalline material with no detectable extra framework Al by NMR. The sample is highly crystalline, as shown by the flat baseline of the x-ray diffraction pattern in response 1206 in FIG. 12, which is discussed further below. Herein the magnitude of the amorphous alumina hump is defined as the elevation of the baseline measured near 28 degrees two-theta, when measured above a baseline drawn between about 20 degrees two-theta and 40 degrees two-theta in the x-ray diffraction pattern. The ratio of the amplitude of hump to the strong sharp peak at a two-theta of near 30 is almost zero, satisfying the most preferred ratio of less than 0.05 to have good crystallinity. Similarly, the comparison with the x-ray diffraction peak from zeolite 3A at a two-theta of 24 degrees is almost zero, satisfying the most preferred ratio of less than 0.05 to have good crystallinity.

Figure 2A:
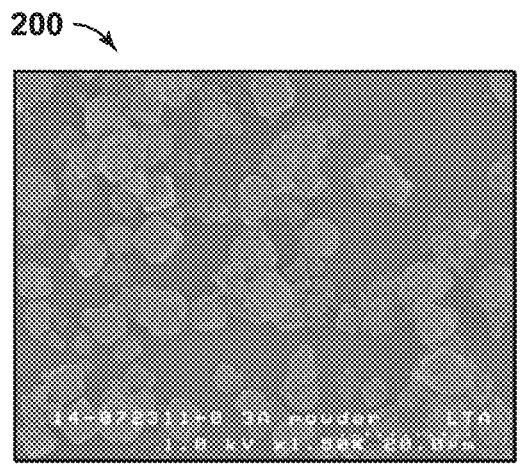
FIGS. 2A and 2B are exemplary SEM diagrams of an adsorbent material.
Figure 2B:
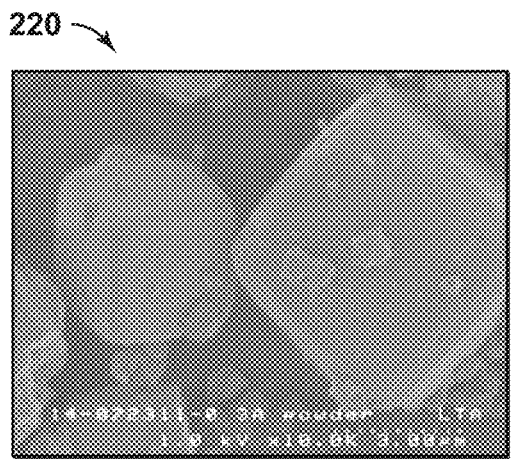
Figure 9A:
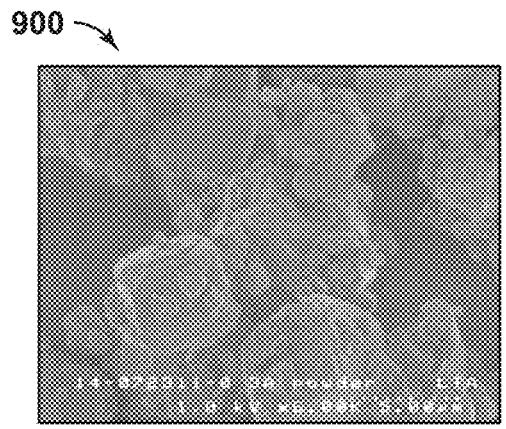
FIGS. 9A and 9B are exemplary SEM diagrams of distribution of particle sizes.
Figure 9B:
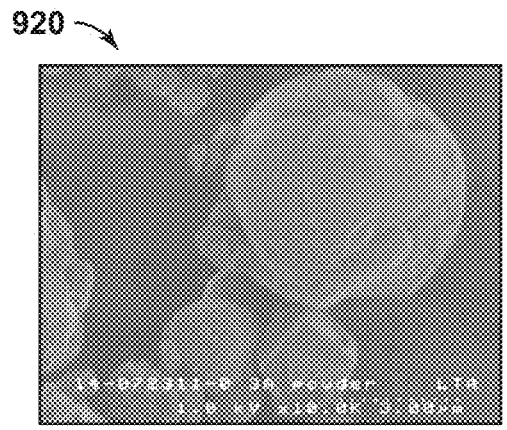

FIGS. 2A and 2B are exemplary SEM diagrams 200 and 220 of distribution of particle sizes for the commercial zeolite 3A, while FIGS. 9A and 9B are additional exemplary SEM diagrams 900 and 920 of distribution of particle sizes for the commercial zeolite 3A. There was a wide range of particle sizes in the sample with the bulk of the particles in a range from 1 to 3 microns. As such, the zeolite particle size is in the most preferred range for fast kinetics.

Figure 3:
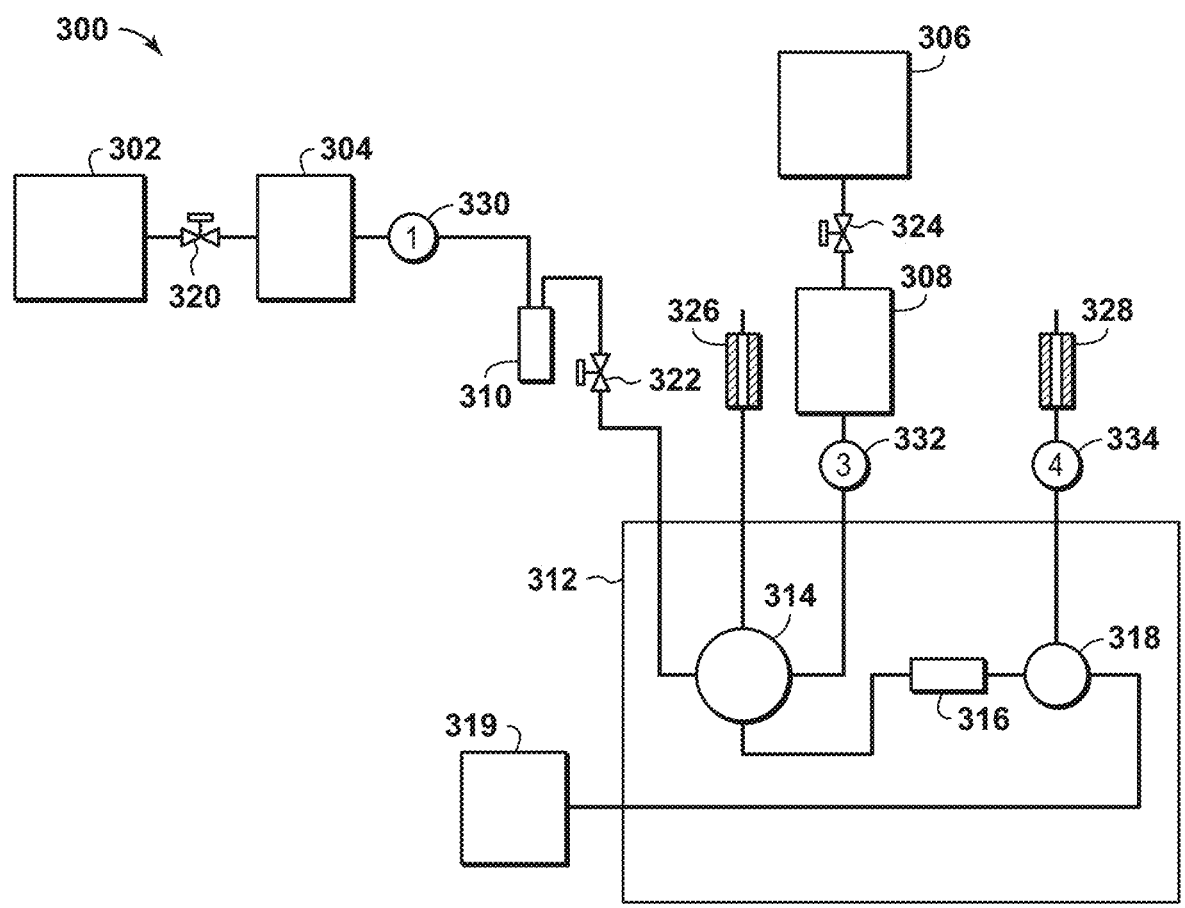
FIG. 3 is a diagram of the ballistic chromatography instrumentation.

FIG. 3 is a diagram 300 of the ballistic chromatography instrumentation, which is used in the present example. In this diagram 300, two Helium (He) gas cylinders, such as He gas cylinder 302 and 306, provide a stream to respective mass flow meters, such as mass flow meters 304 and 308. One stream is passed through a bubbler 310 before passing to a gas chromatograph (GC) oven 312, while the other stream passes directly into the GC oven 312. In the GC oven 312, the streams are passed through a valve 314 and then through the sample bed 316 to another valve 318 that provides the stream to an outlet or to a mass spectrometer 319.

In this instrumentation, the basic underlying principle of ballistic chromatography is the measurement of the adsorption and desorption of a gaseous adsorbate that is switched (e.g., valved) onto and off of a solid sample in an ultra-short (e.g., about 1 centimeter (cm) long), packed sample bed 316. The small bed size models a short bed residence time (e.g., 10's to 100's of milliseconds) of the sorbate gas, thus decreasing dispersion effects that can convolute the breakthrough curve. Water is introduced through using of a bubbler 310 to saturate the helium stream from the He gas cylinder 302. The concentration of water in the saturated helium stream is dependent on both the temperature and pressure inside the bubbler 310. The exact concentration of water is calculated for every run or test. Typical values are around 1% (mol/mol) water in helium. The flow rate is about 10 standard cubic centimeters per minute (sccm). Outlet pressure is open to atmosphere, and inlet pressure is in the range from about 0.5 bar to 3 bar higher than outlet pressure. The pressure drop through the small packed bed 316 is related to a function of bed packing.

To manage the flow of fluids, various equipment may be used within the system. For example, various valves may be disposed along the connections between equipment. These valves may include butterfly valve or plug valve, for example. As a specific example, a valve 320 may be disposed between the He gas cylinder 302 and the mass flow meter 304, while valve 322 may be disposed between the bubbler 310 and the GC oven 312 and valve 324 may be disposed between the He gas cylinder 306 and the mass flow meter 308. Each of these valves 320, 322 and 324 may be configured to independently block passage of the fluid flow or permit fluid flow based on the setting of the respective valve. In addition, other valves may be used to pass the streams from the GC oven 312 to other equipment or for venting. For example, a needle valve 326 may be in fluid communication with the GC oven 312 and configured to vent the stream from the valve 314, while the needle valve 328 may be in fluid communication with the GC oven 312 and configured to vent the stream from the valve 318. These various valves may manage the flow within the system.

In addition, various monitors or gauges, such as temperature and/or pressure gauges, may be used within the system to measure conditions of the streams at various locations within the system. For example, a first pressure gauge 330 may be disposed between the mass flow meter 304 and the bubbler 310 to monitor the pressure or changes in stream at this location, while a second pressure gauge 332 may be disposed between the mass flow meter 308 and the valve 314 to monitor the pressure or changes in stream at this location and a third pressure gauge 334 may be disposed between the valve 318 and the outlet, or the needle valve 328, to monitor the pressure or changes in stream at this location. Each of these gauges may be communicate with a control unit (not shown) to manage the operation of the system.

Figure 4:
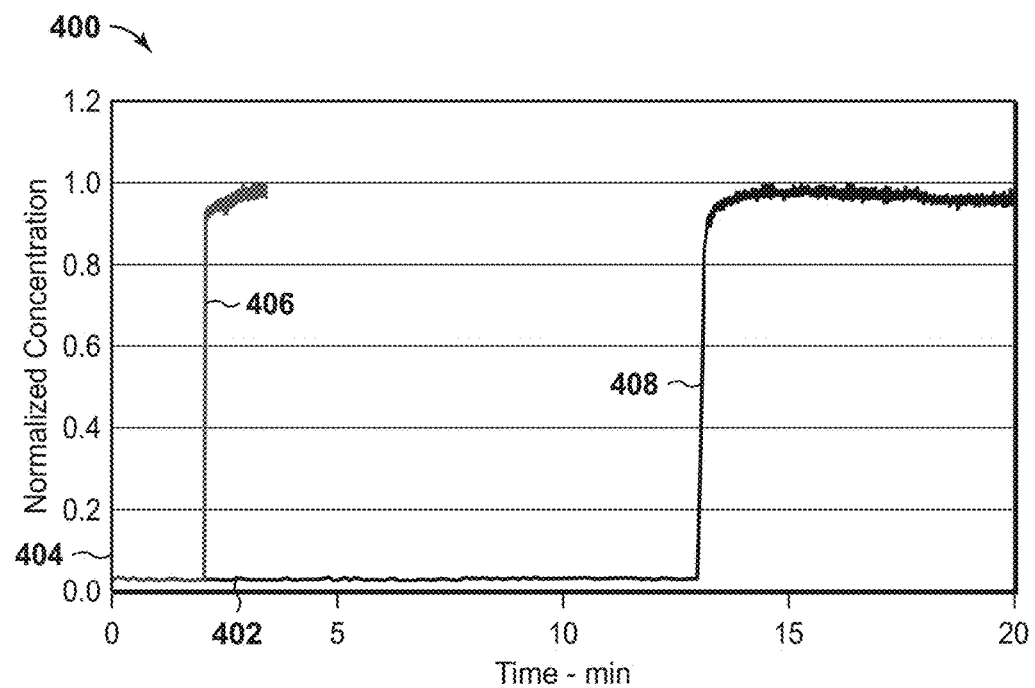
FIG. 4 is a diagram of the water breakthrough on a 3A packed adsorbent bed.

To establish the intrinsic kinetics of zeolite 3A using ballistic chromatography, small (e.g., 3 milligram (mg) to 10 mg) packed adsorbent bed of zeolite crystals were used to measure breakthrough in a short residence time. FIG. 4 is a diagram 400 of the water breakthrough on a 3A packed adsorbent bed. In this diagram 400, a first response 406 and a second response 408 are shown along a time after water exposure axis 402 in minutes and a relative abundance axis 404. In this diagram 400, the breakthrough curves of 3A samples at water concentration of 3 percent (%) in a packed bed configuration along with the associated blank configuration. The first response 406 is for an empty bed, while the second response 408 is for 3A packed bed. The data is relatively flat before the breakthrough front, with no initial bleed through of water. Thus, the uptake of water is faster than the residence time of the water in the sample beds. To achieve this type of performance, the sample has to equilibrate with the flow gas stream in a time that is at least five times shorter than the residence time of gas through the sample bed. In the example, the residence time is 31 milliseconds through the packed bed. Because there was a sharp breakthrough front in diagram 400 with good swing adsorption capacity, the time to equilibrate water vapor with the zeolite 3A sample was less than about one-third of the residence time or less than 10 milliseconds. The blank response 406 is similar to the 3A packed bed response 408. The zeolite 3A adsorption front breakthrough time is measured from the time at which the blank breaks through. To calculate the fraction of the ultimate capacity at breakthrough the concentration after breakthrough is adjusted by the response of the blank. Because the shape of the response curve for 3A zeolite in the bed after breakthrough is very similar to that of the blank, the adsorption capacity at breakthrough is more than 75% of the ultimate swing adsorption capacity. As such, the kinetics of the sample are nearly in the most preferred range. Accordingly, the slope of the breakthroughs for the 3A zeolite samples is indicative of the adsorption kinetics. The theta parameter as defined above is equal to 3.66, and the ratio for theta is in the most preferred range. The estimated capacity from the breakthrough is about 17.5 weight percent (wt %) this corresponds to a swing adsorption capacity at breakthrough of 9.8 millimole/gram.

Example 2 is an example that provides evidence of fast kinetics for the commercial zeolite 3A crystals studied in Example 1 with a different ballistic breakthrough unit.

Figure 5:
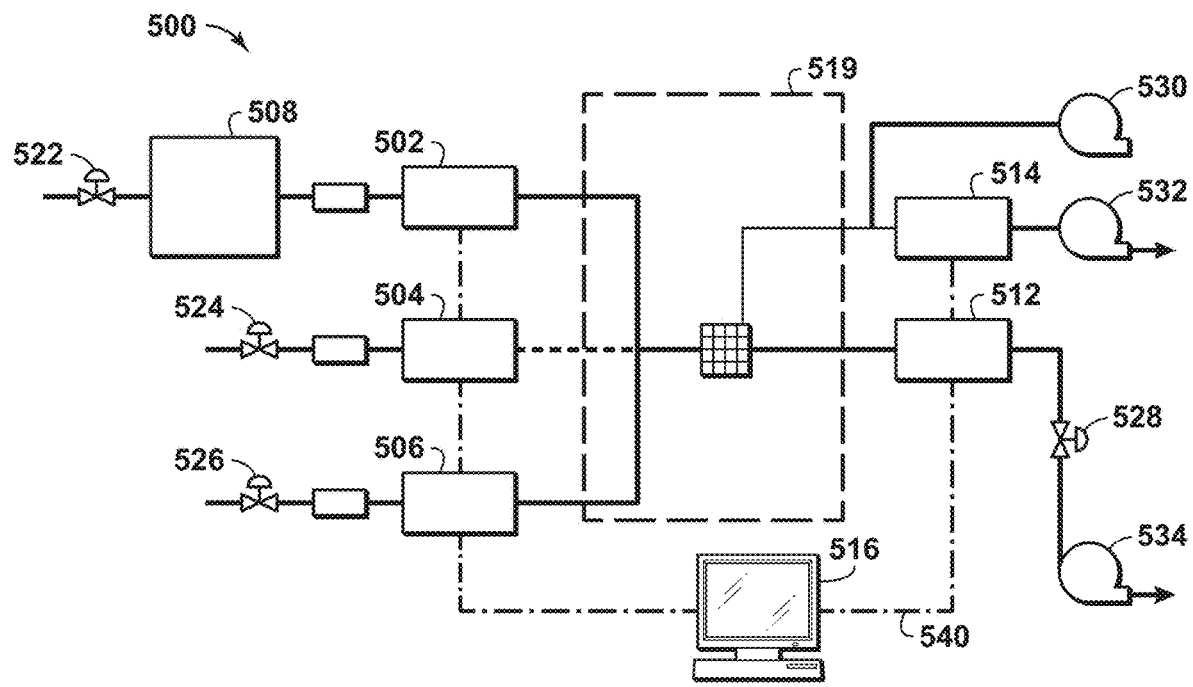
FIG. 5 is a diagram of the water breakthrough unit.

To measure the water breakthrough at different concentrations, an independent water breakthrough unit may be utilized, which is shown in FIG. 5. The advantage of this water breakthrough unit compared to the unit in Example 1 is to provide a wide range of feed concentrations instead of using a single concentration condition by utilizing a dilution stream. FIG. 5 is an exemplary diagram 500 of a water breakthrough unit. In this diagram 500, various He sources are provided via mass flow controllers (MFCs), such as MFC 502, 504 and 506. Each of the streams from the MFC 502, 504 and 506 is passed to the sample 510. One of the streams has a water sparger 508 in the flow path from the He source to the MFC 502. After passing through the sample 510, the stream is conducted away from the sample and may be passed to a pressure controller (PC) 512 and mass spectrometer (MS) 514 or to a conduit 518. Further, the sample may be disposed within an enclosure 519, which is configured to isolate sample 510 from external conditions and may be configured to adjust the conditions (e.g., pressure, temperature, etc.) that the sample 510 is exposed to within the enclosure 519.

To manage the operation of the unit, a control unit 516 manages and/or controls the operation of the various components in this system. As this system has flexibility of diluting water concentration by mixing gases and adjusting temperature of water sparger 508, water concentration can be adjusted to a desired level in addition to saturated water concentration. The control unit 516 may be configured to communicate with the MFCs 502, 504 and 506, pressure controller (PC) 512 and mass spectrometer (MS) 514, which may be via communication equipment or lines 540.

To manage the flow of fluids, various equipment may be used. For example, various valves may be disposed along the connections between equipment. These valves may include butterfly valve or plug valve, for example. As a specific example, a valve 520 may be disposed between the He source (e.g., a He gas cylinder) and the water sparger 508, while a valve 522 may be disposed between the He source (e.g., a He gas cylinder) and the MFC 504 and a valve 524 may be disposed between the He source (e.g., a He gas cylinder) and the MFC 506. Also, a valve 526 may be disposed downstream of the PC 512. Each of these valves 520, 522, 524 and 526 may be configured to independently block passage of the fluid flow or permit fluid flow based on the setting of the respective valve. In addition to valves, other equipment, such as blowers or compressors, may be used to conduct away the streams from the sample 510. For example, a first blower 530 may be in fluid communication with the conduit upstream of the MS 514 and configured to conduct away the stream from the sample 510, while a second blower 532 may be in fluid communication with the stream downstream of the MS 514 and configured to conduct away the stream from the MS 514. Also, a third blower 534 may be in fluid communication with the stream downstream of the PC 512 and configured to conduct away the stream from the PC 512. Accordingly, in certain configurations, these various valves and blowers may be used to manage the flow within the system.

Figure 6A:
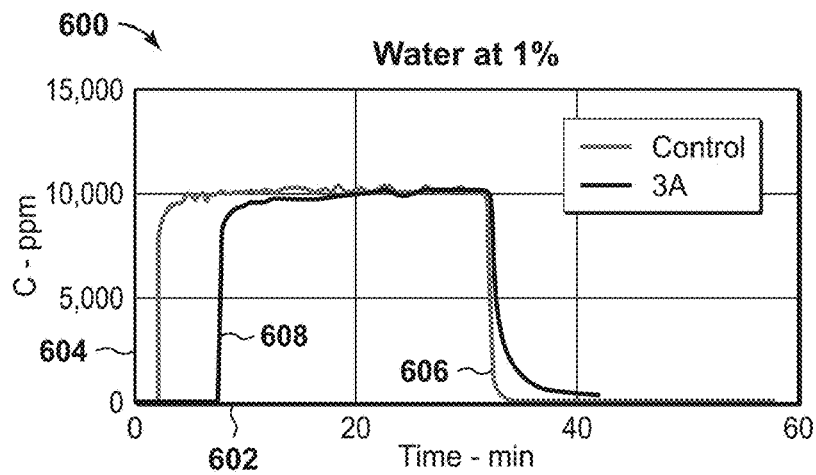
FIGS. 6A, 6B and 6C are diagrams of water breakthrough results on a 3A zeolite at various concentrations.
Figure 6B:
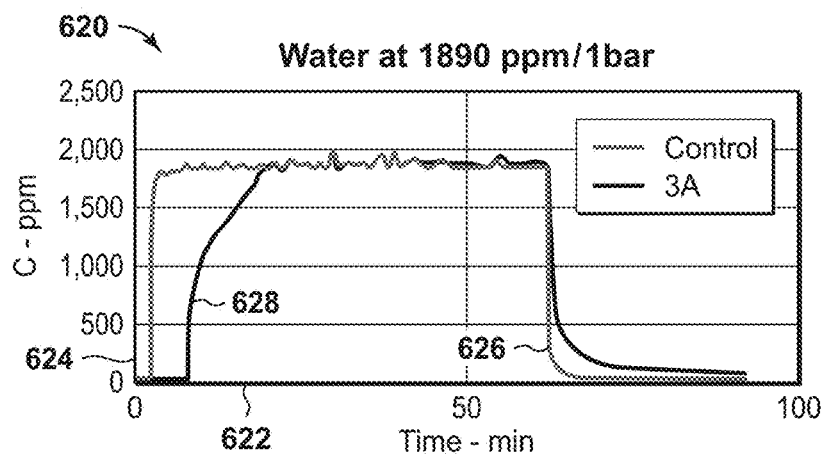
Figure 6C:
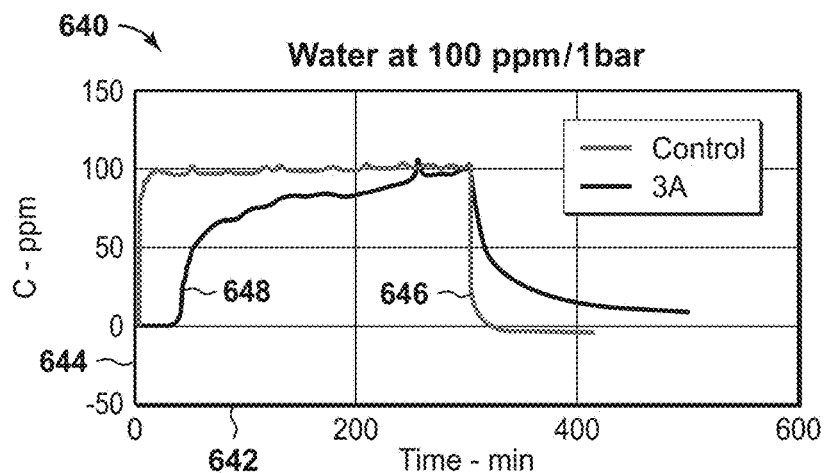

Results from the water breakthrough unit in FIG. 5 are shown in FIGS. 6A, 6B and 6C. FIGS. 6A, 6B, 6C are diagrams 600, 620 and 640 of water breakthrough results on a 3A zeolite at various concentrations. FIG. 6A is a diagram 600 of water at 10000 ppmv (1%) at 1 bar. In this diagram 600, a first response 608 and a second response 606 are shown along a time axis 602 in minutes and a concentration axis 604 in parts per million (ppm). The first response 608 is a blank, while the second response 606 is a 3A. FIG. 6B is a diagram 620 of water at 1890 ppm at 1 bar. In this diagram 620, a first response 628 and a second response 626 are shown along a time axis 622 in minutes and a concentration axis 624 in parts per million (ppm). The first response 628 is a control, while the second response 626 is a 3A. FIG. 6C is a diagram 640 of water at 100 ppm at 1 bar. In this diagram 640, a first response 648 and a second response 646 are shown along a time axis 642 in minutes and a concentration axis 644 in parts per million (ppm). The first response 648 is a blank sample, while the second response 646 is a 3A sample.

The initial sharp front of water breakthrough is proportional to the adsorption rate. The steeper the curve, the higher is the value of the mass transfer coefficient. The residence times for these experiments are less than 100 ms. No water bypasses prior to breakthrough. These confirm that fast kinetics observed for various partial water pressure of 10000 ppm (1%), 1890 ppm, and 100 ppm at 1 bar. The water capacity estimated at the breakthrough is about 9.5 millimole/gram, 10.5 millimole/gram, and 8 millimole/gram, correspondingly. Because the ultimate capacity from water isotherm is known to be 12.2 millimole/gram, 11 millimole/gram, 8.5 millimole/gram for three examples, the ratio of adsorption capacity at breakthrough is more than 75% of the ultimate swing adsorption capacity, which are in the preferred range and the time for equilibration was less than 30 milliseconds which is nearly in the most preferred range.

Example 3 is an example that provides evidence of fast kinetics for a commercial zeolite 3A crystals bounded on a capillary column with binder. The zeolite 3A crystals are from the same batch used in example 1.

Figure 7:
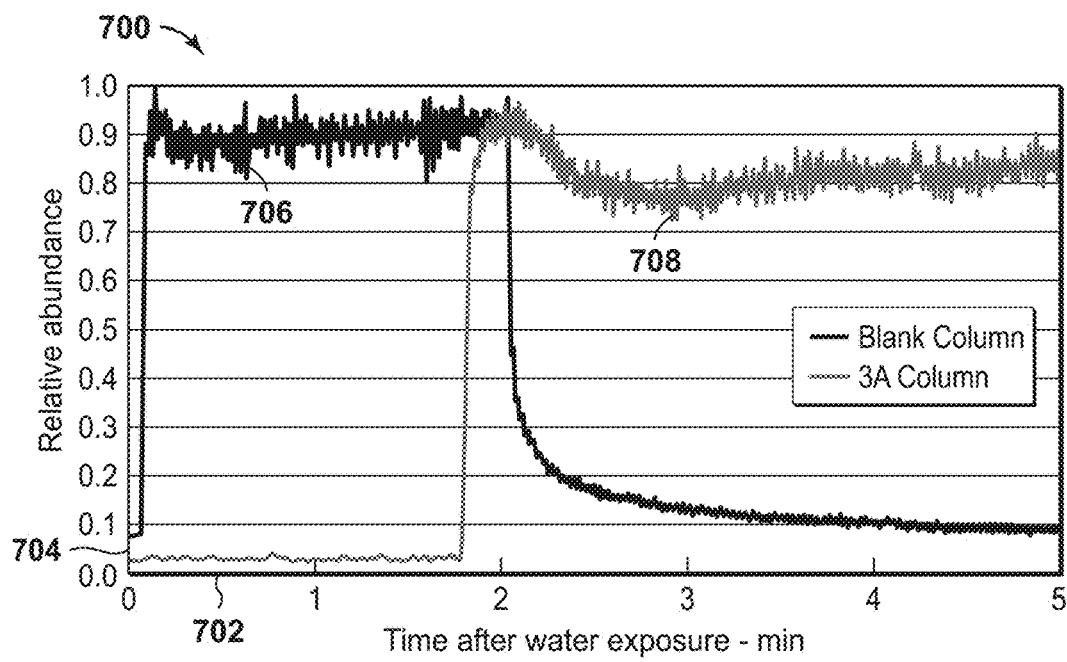
FIG. 7 is an exemplary diagram of water breakthrough results on a 3A zeolite capillary column.

To further establish that structured adsorbents may have rapid kinetics, more ballistic tests with bound 3A crystal coated on interior surface of 530 micron internal diameter (ID) capillary column was performed to validate fast water kinetics. FIG. 7 is an exemplary diagram 700 of water breakthrough results on a 3A zeolite capillary column. In this diagram 700, a first response 706 and a second response 708 are shown along a time after water exposure axis 702 in minutes and a relative abundance axis 704. The first response 706 is a blank glass capillary column, while the second response 708 is a 3A zeolite capillary column. This diagram 700 represents that breakthrough results on 3A coated in a thin film, which has thickness of 15 microns. The residence time is about 290 milliseconds (ms) for this run, and the slope of water breakthrough curve is substantially similar to the control curve. This example shows that for a formulated (bound) zeolite film the kinetics can be less than 100 milliseconds, (one-third of residence time) which provides sharp fronts and is in a kinetically preferred range.

Figure 8:
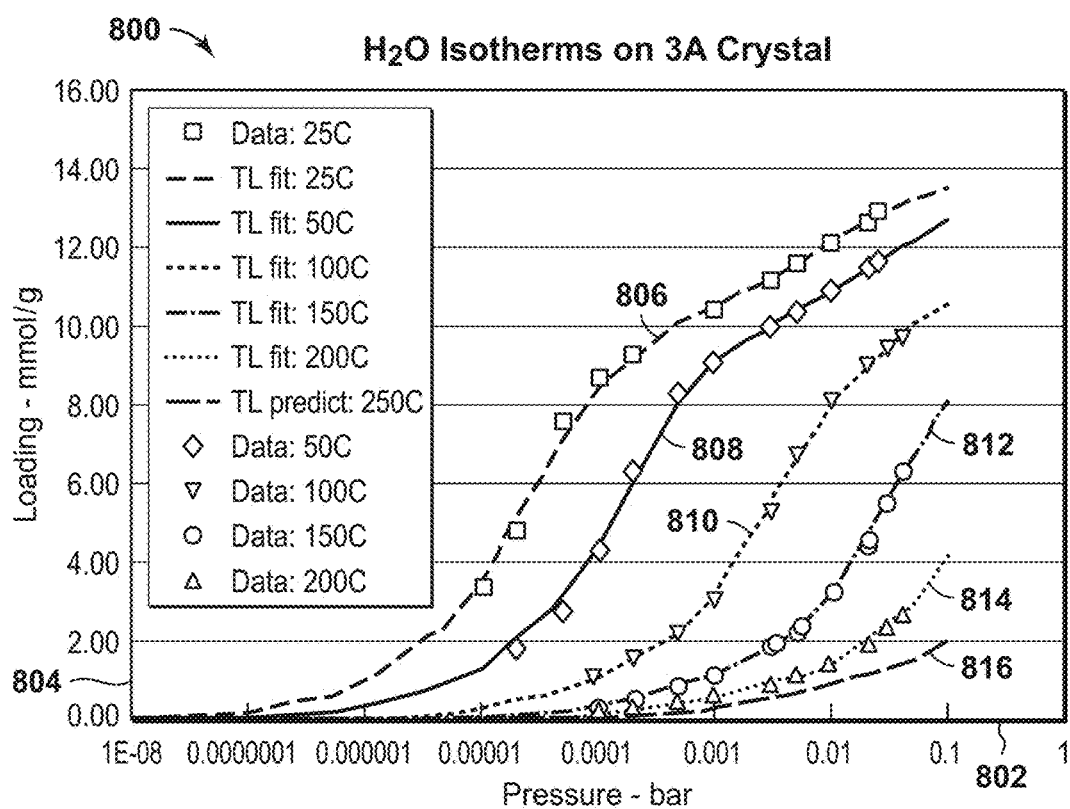
FIG. 8 is an exemplary diagram of water isotherms on 3A zeolite crystal over temperature and pressure ranges.

Example 4 is an example that provides evidence of high water capacity on the same batch of zeolite 3A crystals used in Example 1. FIG. 8 is an exemplary diagram 800 of water isotherms on 3A zeolite crystal over temperature (25° C. to 200° C.) and water pressure ranges (0 to close to saturated pressure). The wide range of temperature measurement provides data for design basis for a TSA cycle, and the wide range of pressure measurements additionally provides data for the design basis for deep dehydration cycles to sub ppm level additionally utilizing pressure swing. In this diagram 800, various responses 806, 808, 810, 812, 814 and 816 are shown along a pressure axis 802 in bars and a loading axis 804 in milli moles per gram (mmol/g). The first response 806 is for a 25° C., the second response 808 is for a 50° C., the third response 810 is for 100° C., the fourth response 812 is for 150° C., the fifth response 814 is for 200° C. and the sixth response 816 is for 250° C.

The responses 806, 808, 810, 812, 814 and 816 of the isotherms of 3A zeolite crystals involve a wide range of temperatures and pressures. As water removal for LNG specifications has to meet 0.1 ppmv, water isotherms have been measured down to this range for design purposes. High capacity of water over 3 moles per kilogram (mol/kg) on 3A at 1e-5 bar water pressure is shown at room temperature.

With rapid kinetics, processes may be configured to approximate instantaneous equilibration between the water fugacity in the gas phase and that in the zeolite crystal and/or structured adsorbent (e.g., crystals and binder formatted into a thin layer) provided kinetics of the adsorber system is sufficiently fast. Because only water goes into the 3A crystal, the process operating conditions can be calculated without having to account for competitive adsorption in the 3A crystal.

Example 5 is an example that provides evidence of good fouling resistance on the same batch of zeolite 3A that was used in Example 1. This batch of crystals have kinetics that are nearly in the most preferred operating range.

To experimental demonstrate fouling tolerance, zeolite 3A samples were exposed to a variety of contaminants at high pressures in a fouling test unit. In the fouling test unit, a base high pressure gas mixture was doped with individual foulants. The base gas mixture has the composition of 6.08% ethane, 1.90% propane, 0.16% n-butane, 0.13% isobutene, 0.01% isopentane, 0.01% hexane and 91.7% methane. Foulants studied were heavy hydrocarbons, TEG (Triethylene glycol), MDEA (Methyl Di-Ethanol Amine), MEA (Mono Ethyl Amine), and methanol. Fouling was accessed using breakthrough experiments with short residence time and TGA measurement of water uptake. No change in kinetics or adsorption capacity was detected in fouled samples.

Another enhancement in using zeolite 3A is the fouling resistance for contaminants. As noted above, conventional systems utilize silica gel, activated alumina, and molecular sieves as adsorbents. Unlike molecular sieves, silica gel and activated alumina have larger pores and open surfaces and have a wide distribution of pore sizes in the range between 100 nanometers (nm) and 500 nm. The pores sizes of the zeolite molecular sieves type 3A, 4A, 5A, and 13X are approximately 0.3 nm, 0.4 nm, 0.5 nm, and 1.0 nm, respectively. Water molecules, with an approximate molecular diameter of 0.28 nm, can easily penetrate the pores of the molecular sieve 3A adsorbent, while other hydrocarbons, including $CO_2$ (e.g., about 0.35 nm) and $CH_4$ (e.g., about 0.36 nm), are not readily adsorbed in the zeolite 3A, but are able to penetrate the pores of zeolite 4A and 5A. Accordingly, the utilization of zeolite 3A can provide an enhanced foulant resistance material compared to zeolite 4A and zeolite 5A. Thus, zeolite 3A is expected to be more fouling tolerant, as compared to other adsorbents.

Example 6 is an example that provides evidence that extra framework aluminum and loss of crystallinity can completely destroy the kinetic and reduce the measurable water adsorption capacity to zero.

A commercial zeolite 4A material with fast kinetic and good crystallinity was ion exchanged to a zeolite 3A material. The ion exchange procedure used the following steps: 1) adding 10 gram (g) 4A zeolite into 100 milliliter (ml) of deionized H₂O and then add 10 g of KCl into the mixture held in a glass beaker while mixing with a stir bar; 2) adjusting the pH to 5 using dilute HCl/NH₄OH as a buffer; 3) adjusting the temperature to 60° C. to 80° C. and stir covered for one hour; 4) filtering and washing with deionized water; 5) drying in 115° C. oven then calcine for three hours at 350° C.; 6) repeating steps 1 to 5 for two additional times. Inductive Couples Plasma Emission Spectroscopy (ICP) results show this sample has about 92 mole % K with the balance being Na.

Figure 10:
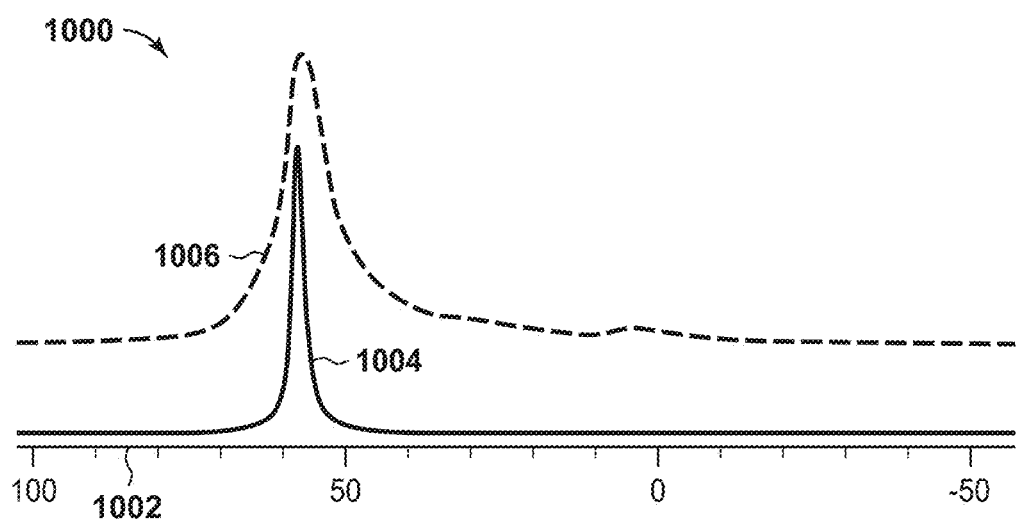
FIG. 10 is an exemplary diagram of the Al NMR spectrum.

The ion exchanged sample was determined to have significantly degraded performance that was due to extra framework of Al and lack of full crystallinity. Degradation of crystallinity and formation of extra framework Al occurred during the ion exchange procedure that used a buffer solution to set the pH to 5. The extra framework Al was measured with NMR and the lack of full crystallinity in the zeolite was measured with x-ray diffraction (XRD). FIG. 10 is an exemplary diagram 1000 of the Al NMR spectrum. Response 1006 in FIG. 10 shows recorded NMR spectrum of the ion exchanged sample. It is seen that there is a large and small peak in the spectrum. The small peak is a resonance at about 4 ppm and is due to non-framework alumina in the ion exchanged sample. The intensity of the peak compared to the large peak represents about 6.4% of the aluminum in the sample being non-framework. Also, the main tetrahedral peak at 58 ppm is very broad indicating that the tetrahedral alumina species are highly distorted due to strain in the crystals from partial loss of crystallinity. This degree of non-framework aluminum outside of the preferred ranges for fast kinetics.

Figure 11:
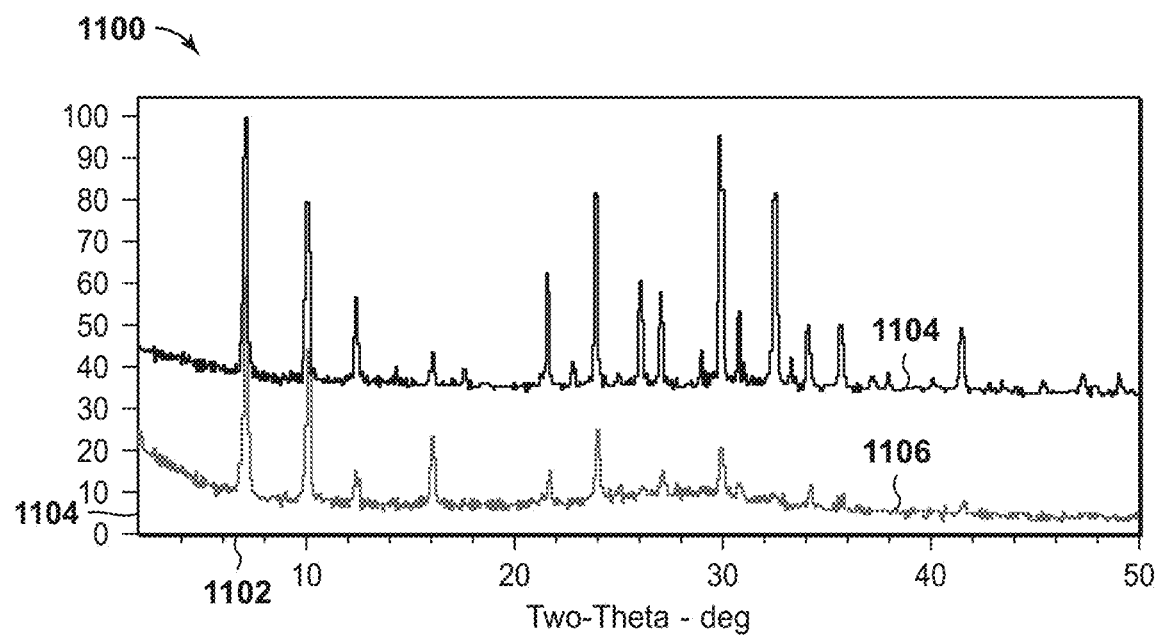
FIG. 11 is an exemplary diagram of the XRD pattern that shows the sample has lost crystallinity.

FIG. 11 is an exemplary diagram 1100 of the XRD pattern that shows the sample has lost crystallinity. The XRD pattern 1106 is from the ion exchanged sample and the XRD pattern 1104 is from a highly crystalline ion exchanged sample that is discussed in Example 7. The presence of amorphous material in the XRD pattern 1106 is indicated by the hump in the baseline between 20° and 36° two-theta (2θ). X-ray diffraction can be used to assess the crystallinity of a zeolite sample. Amorphous material in the sample are indicated as a broad diffuse peak in the x-ray diffraction pattern. When the x-day diffraction pattern is recorded using Cu K-alpha radiation the broad peak from amorphous materials appears as a maximum at a two-theta of 28. Subtracting the baseline in the diffraction pattern provides a measure of the amplitude of this amorphous peak at two-theta of near 24. The ratio of this to the strong sharp peak at a two-theta of near 28 is estimated to be 0.4. The ratio of this to the second strong sharp peak at a two-theta of near 30 is estimated to be 0.5. This ratio provides a measure of the amount of amorphous material in the sample. It is greater than the preferred range of ratio which is less than 0.2.

The ion exchanged material of this example shows negligible water capacity based on four instruments: two gravimetric instruments that measure equilibrium water adsorption, and the two ballistic chromatography units described in Examples 1 and 2. In the ballistic chromatography units the breakthrough is very similar to control (e.g., a blank) experiment with breakthrough time less than 10 seconds different from the control. Results from one gravimetric instrument are shown in 1306 of FIG. 13, which is discussed further below. It shows that the uptake is nearly zero at all water activities. As such, this example provides evidence that extra framework Al and reduced crystallinity is deleterious to performance. This degradation occurred with a relatively standard ion exchange process that used a buffer solution to control pH.

Example 7 is an example that provides evidence of reasonably fast kinetics for a zeolite 3A sample with a high K content of 98% and good crystallinity. The sample used in this example was ion exchanged from zeolite 4A without using the buffer solution employed in Example 6 (e.g., the procedure was the same as in Example 6 with the omission of step number 2).

FIG. 10 is an exemplary diagram 1000 showing Al NMR spectra used to detect extra framework Al. The ion exchanged sample from this example is spectra 1004. It is shown that there is one narrow resonance at 59 ppm indicating a fully crystalline material in which all the alumina is in highly symmetrical tetrahedral framework environments (e.g., no detectable extra framework Al).

Examination of the powder XRD shows the sample has good crystallinity based on the sharp high intensity peaks and the absence of a broad amorphous peak centered at a two-theta of 28. FIG. 11 is an exemplary XRD diagram 1100. The absence of any noticeable hump in the XRD pattern (line 1104) of 3A sample along with the strong intensities of the peaks indicates that sample is fully crystalline. The ratio of the amplitude of hump to the strong sharp peak at a two-theta of near 30 is almost zero. As such this sample has good crystallinity and falls within the preferred ratio of the amorphous to crystalline peak intensity of less than 0.05.

Figure 14:
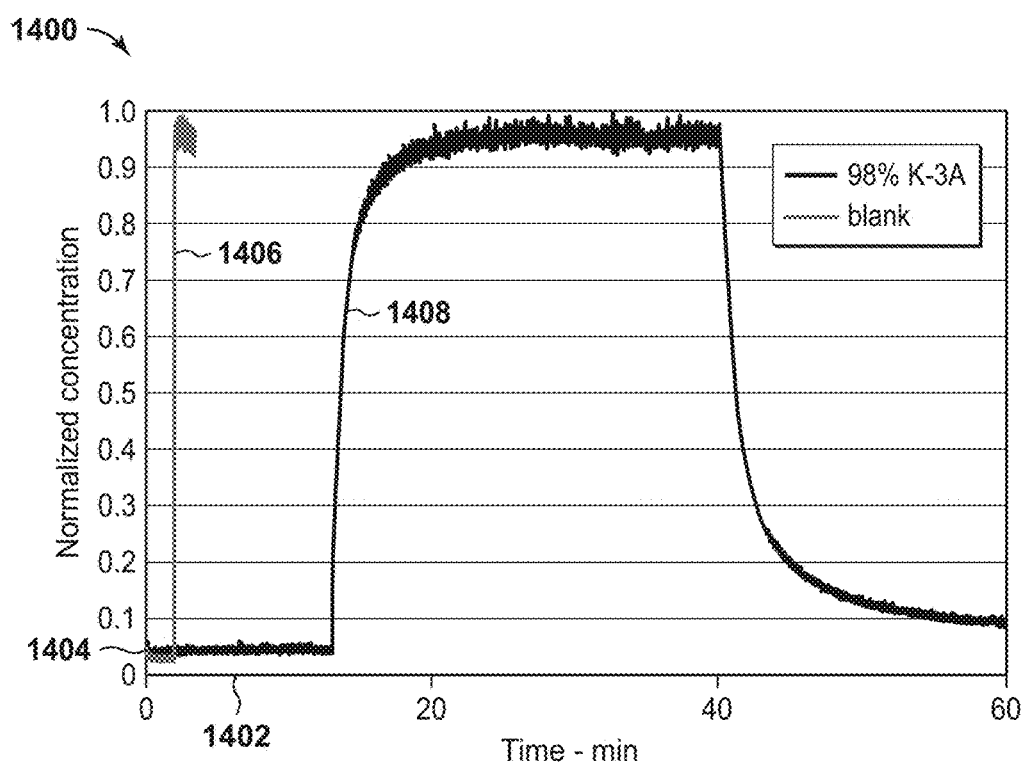
FIG. 14 is an exemplary diagram of the water breakthrough on a 3A packed adsorbent bed.

To establish the intrinsic kinetic of zeolite 3A ballistic chromatography, small packed adsorbent bed of zeolite crystals (e.g., 3 milligram (mg) to 10 mg) were reviewed to measure breakthrough in a short residence time. FIG. 14 is a diagram 1400 of the water breakthrough on a 3A packed adsorbent bed. In this diagram 1400, a first response 1406 and a second response 1408 are shown along a time after water exposure axis 1402 in minutes and a relative abundance axis 1404. In this diagram 1400, the breakthrough curves of 3A samples at water concentration of 2.3% in a packed bed configuration along with the associated blank configurations. The first response 1406 is for a blank configuration, while the second response 1408 is for 3A packed bed. The data is relatively flat before the breakthrough front, with no initial bleed through of water. Thus, the uptake of water is as much faster than the residence time of the water in the sample beds. To achieve this type of performance, the sample has to equilibrate with the flow gas stream in a time that is at least five times shorter than the residence time of gas through the sample bed. In the diagram 1400, the residence times are 81 milliseconds through the packed bed. Because there was a relatively sharp breakthrough fronts with good swing adsorption capacity, the time to equilibrate water vapor with the zeolite 3A sample was less than about one-third of the residence time or less than 27 milliseconds. The blank response 1406 is faster than the 3A packed bed response 1408. To calculate the fraction of the ultimate capacity at breakthrough, the concentration after breakthrough is adjusted by the response of the blank. The swing adsorption capacity at breakthrough is 8.9 mole/kg, more than 75% of the ultimate swing adsorption capacity of 10.5 mole/kg. As such, the kinetics of the sample are nearly in the most preferred range. The theta parameter (θ) for this breakthough curve was determined to be 0.7 indicating that its kinetics are not as good as the sample in Example 1. However, the kinetics are still in a preferred range, but not the most preferred range that enable ultra-fast swing adsorption processes.

Figure 12:
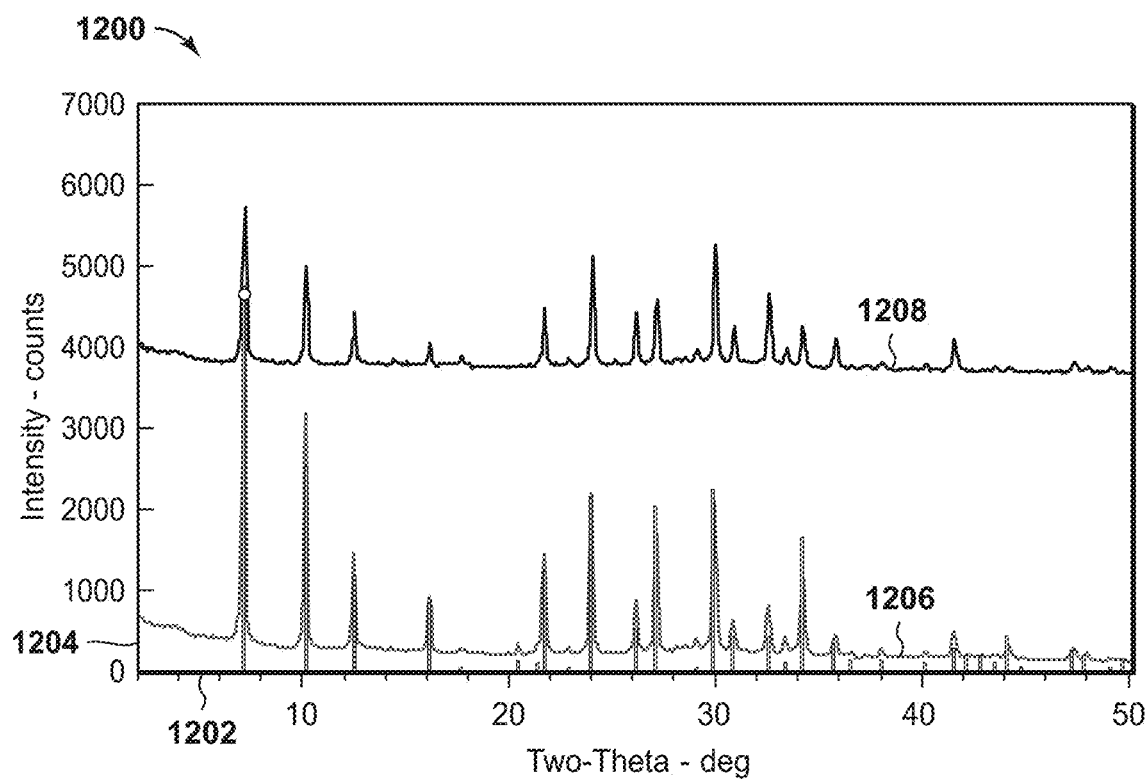
FIG. 12 is an exemplary diagram of an exemplary XRD spectra recorded with Cu K radiation.

Example 8 is an example that provides evidence of reasonable kinetics and lower adsorption capacity in a zeolite 3A sample with a K content of 81% and somewhat reduced crystallinity. This sample was ion exchanged from the zeolite 3A sample from example 1. The ion exchange process yielded a sample with 81% K cations with the balance of the cations being Na and slightly reduced the crystallinity. FIG. 12 is an exemplary diagram 1200 of an exemplary XRD spectra recorded with Cu K radiation. In FIG. 12, response 1206 is the XRD spectra of the parent 3A and response 1208 is the XRD spectra of the ion exchanged material of this example. The calculated mass absorption coefficient, $\mu$, for 40% K (e.g., spectra response 1206) LTA is 41.7 centimeter squared per gram (cm$^2$/g), while for 81% K exchanged LTA (e.g., spectra response 1208), $\mu$=52.6 cm$^2$/g.)

The presence of amorphous material in the XRD pattern in response 1208 is indicated by the hump in the baseline between 20° and 36° two-theta (2θ), peaking at a two-theta of 28 degrees. Subtracting the baseline in the diffraction pattern provides a measure of the amplitude of this amorphous peak at two-theta of near 28. The ratio of this to the strong sharp peak from the ion exchanged zeolite 3A at a two-theta of near 24 degrees is estimated to be 0.1. The ratio of this amorphous peak to the second strong sharp peak at a two-theta of near 30 degrees is estimated to be 0.09. This ratio provides a measure of the amount of amorphous material in the sample. It is within an allowable range for good crystallinity, but outside the most preferred range. The parent material shown in spectra response 1206 has almost no detectable amorphous peak and the ratio of the amorphous to crystalline peaks falls within the most preferred range (e.g., the parent was highly crystalline).

Compared XRD pattern of this 3A sample with its parent material of commercial 3A (same used in example 1) shows this 3A sample has some loss of crystallinity from the reduced intensities of the peaks although the direct comparison is not as valid because the compositions have changed. The calculated mass absorption coefficient, $\mu$, for 41% K ex. LTA is 41.7 centimeter squared per gram (cm$^2$/g), while for 81% K ex. LTA, $\mu$=52.6 cm$^2$/g for Cu K radiation.)

Figure 15:
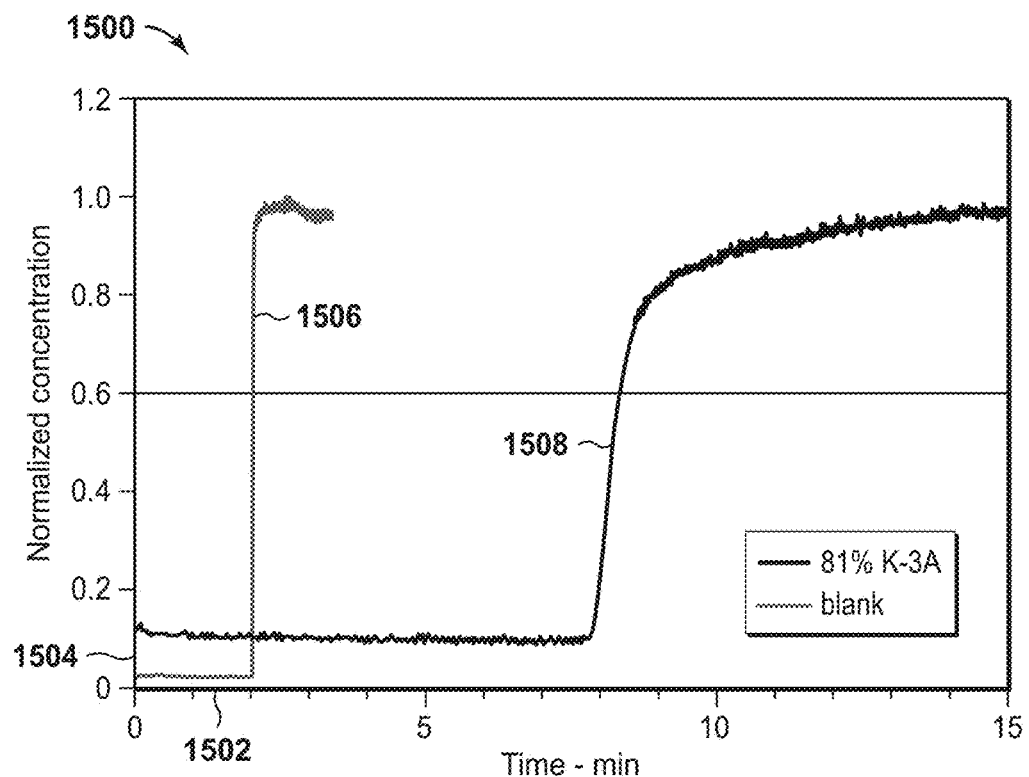
FIG. 15 is another exemplary diagram of the water breakthrough on a 3A packed adsorbent bed.

To establish the intrinsic kinetic of zeolite 3A ballistic chromatography, small (e.g., 3 milligram (mg) to 10 mg) packed adsorbent bed of zeolite crystals were reviewed to measure breakthrough in a short residence time. FIG. 15 is a diagram 1500 of the water breakthrough on a 3A packed adsorbent bed. In this diagram 1500, a first response 1506 and a second response 1508 are shown along a time after water exposure axis 1502 in minutes and a relative abundance axis 1504. In this diagram 1500, the breakthrough curves of 3A samples at water concentration of 2.3% in a packed bed configuration along with the associated blank configurations. The first response 1506 is for a blank configuration, while the second response 1508 is for 3A packed bed. The data is relatively flat before the breakthrough front, with no initial bleed through of water. Thus, the uptake of water is faster than the residence time of the water in the sample beds. To achieve this type of performance, the sample has to equilibrate with the flow gas stream in a time that is at least five times shorter than the residence time of gas through the sample bed. In the diagram 1500, the residence times are about 60 milliseconds through the packed bed. Because there was a relatively sharp breakthrough fronts with good swing adsorption capacity, the time to equilibrate water vapor with the zeolite 3A sample was less than about one-third of the residence time or less than 20 milliseconds. The blank response 1506 is faster than the 3A packed bed response 1508. To calculate the fraction of the ultimate capacity at breakthrough, the concentration after breakthrough is adjusted by the response of the blank.

The swing adsorption capacity at breakthrough is 4.7 mole/kg, more than 75% of the ultimate swing adsorption capacity of 5.74 mole/kg, which is significantly reduced from the parent material shown is Example 1. The kinetics of the sample are nearly in the most preferred range. The theta parameter (θ) for this breakthrough curve was determined to be 0.85 indicating that its kinetics are not as good as the sample in Example 1. However, the kinetics are still in a preferred range, but not the most preferred range that enable ultra-fast swing adsorption processes.

Figure 13:
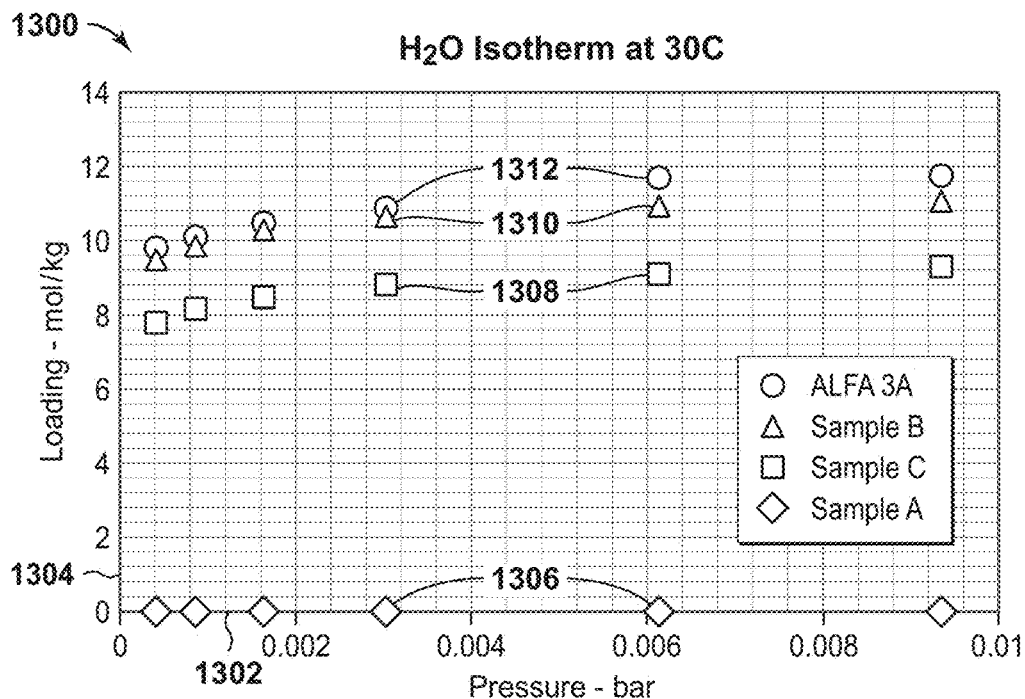
FIG. 13 is an exemplary diagram of water isotherms for different samples.

Example 9 is an example that provides a comparison of water isotherms for 3A samples with different K content. FIG. 13 is a diagram 1300 of water isotherms for different samples. Sample A is has about 92 mole % K and was described in example 6. Sample B has about 98 mole % K, and was described in example 7. Sample C has about 81 mole % K, and was described in example 8. Sample ALFA 3A has 40% K and was described in Example 1. In FIG. 13, sample A measurements are labeled 1306, sample B measurements are labeled 1310, sample C measurements are labeled 1308, and ALFA 3A are labeled 1312. The x-axis (pressure) 1302 and the y-axis (loading in mole per kilogram) 1304 are shown in the diagram 1300. Water uptake measurements 1306 show the sample A with a significant amount of extra framework Al and significantly reduced crystallinity has negligible water uptake. Measurements for sample C 1308, which has some loss of crystallinity, show a decreased water uptake, about 20% to 30% lower compared to its parent material—ALFA 3A. Also, measurements 1308 of sample B (e.g., are about 98% K) shows similar, but slightly lower water capacity on a weight basis compared to ALFA 3A which has about 41% K. Given the calculated density for 41% K-LTA is 1.59 g/cc while for 98% K-LTA is density is 1.69 g/cc, the small difference of 5% to 10% is expected from the density difference of 6%.

Figure 16:
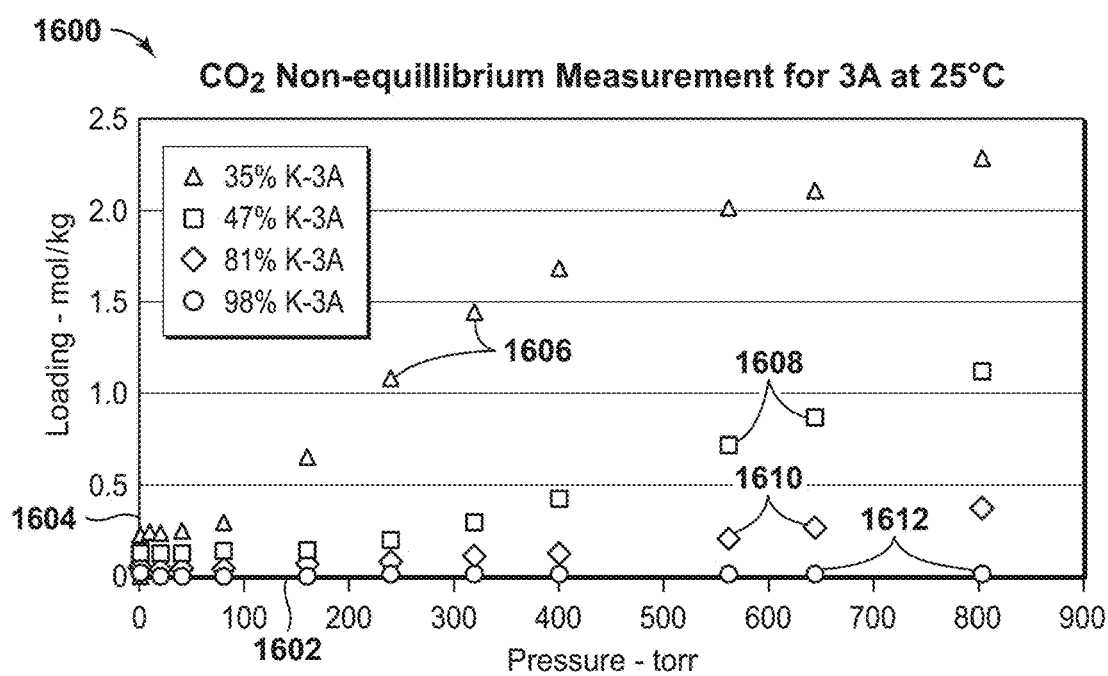
FIG. 16 is another exemplary diagram of the $CO_2$ non-equilibrium isotherm measurements for different zeolite 3A samples.

Example 10 is an example that illustrates an alternative method to assess the fouling tolerance of different zeolite 3A samples. The isotherm of $CO_2$ measured when the sample has equilibrated with $CO_2$ for a time of less than 3 minutes is used to assess fouling tolerance. The $CO_2$ isotherm measurements were performed using a commercial volumetric adsorption system (Quantochrome Autosorb). Measurements were performed at 25° C. after samples had been heated to 350° C. for 4 hours under vacuum to remove adsorbed water that reduces $CO_2$ uptake. $CO_2$ is larger than the effective pore size of all 3A samples studied and as such has slow kinetics. All foulant molecules have molecular sizes larger than $CO_2$. Due to slow kinetics for $CO_2$ in 3A samples, the system cannot reach equilibrium in practical time frame. Instead, an equilibration time of about 3 minutes was used for each point on the isotherm. FIG. 16 shows comparison of $CO_2$ capacity at this non-equilibrium conditions for 3A with different K content. In this diagram 1600, the kinetically limited uptake of $CO_2$ in 3A samples can be quantified with K content in the samples. The higher the K content, the lower $CO_2$ capacity. This shows preferable K content in 3A are needed for fouling tolerance.

FIG. 16 is another exemplary diagram of the $CO_2$ non-equilibrium isotherm measurements for different zeolite 3A samples. In this diagram 1600, a plot of the $CO_2$ non-equilibrium isotherm measurements for different zeolite 3A samples is shown along a pressure axis 1602 in torrs and a loading axis 1604 in mol/kg. The isotherm 1612 is for a zeolite sample having about 98 mole % K that was described in example 7, while the isotherm 1610 is for a sample with about 81 mole % K that was described in example 8. The isotherm 1608 is for a zeolite 3A sample that was ion exchanged to have 47% K, while the isotherm 1606 is for a zeolite 3A sample that was ion exchanged to have 35% K. To have sufficient fouling tolerance, it is preferred the have a $CO_2$ capacity (25° C. and less than 3 minute equilibration times in isotherm measurement) of less than 2 milli moles/gram at 760 torr. A more preferred fouling tolerance is a $CO_2$ loading in an isotherm measurement (at 25° C. with less than 3 minute equilibration times) of less than 1.5 millimole/gram at 760 torr. An even more preferred fouling tolerance is a $CO_2$ loading in an isotherm measurement (at 25° C. with less than 3 minute equilibration times) of less than 0.5 millimole/gram at 760 torr. For rapid cycle swing adsorption processes, the residence time for gas contacting the adsorbent material in the adsorbent bed during the adsorption step is less than 2.5 seconds, preferably less than 0.5 seconds and even more preferably less than 0.1 seconds.

Example 11 is yet another example based on Examples 1 to 10 and other data on the performance of different Zeolite 3A samples in rapid cycle swing adsorption processes used for rigorous dehydration. The grouping is based on a characteristic of the zeolite crystal quality. Zeolite 3A crystals with good crystal quality have less than 10% extra framework Al as measured by NMR and/or in and XRD pattern recorded with Cu K radiation a ratio of the amorphous peak height (or intensity) to either of the neighboring peaks (two-theta equals about 24 degrees or about 30 degrees) being less than 0.2. Zeolite 3A crystals with very good crystal quality have less than 5% extra framework Al as measured by NMR and/or in and XRD pattern recorded with Cu K radiation a ratio of the amorphous peak height (or intensity) to either of the neighboring peaks (two-theta equals about 24 degrees or about 30 degrees) being less than 0.1. Zeolite A crystals with very excellent crystal quality have less than 1% extra framework Al as measured by NMR and/or in and XRD pattern recorded with Cu K radiation a ratio of the amorphous peak height (or intensity) to either of the neighboring peaks (two-theta equals about 24 degrees or about 30 degrees) being less than 0.05. It is most preferred to use crystals with excellent crystal quality. This is particularly true in rapid cycle swing adsorption rigorous dehydration processes where the residence time for gas contacting the adsorbent material in the adsorbent bed during the adsorption step is preferably less than 0.1 seconds. The use of excellent quality crystals enhances kinetics and allows the use of the most fouling tolerant K cation contents to provide the most fouling tolerant rapid cycle in rapid cycle swing adsorption rigorous dehydration processes. With excellent quality crystals the K cation content can be as high as 1.0 in a swing adsorption process with the residence time for gas contacting the adsorbent material in the adsorbent bed during the adsorption step is being less than 2.5 seconds. With excellent quality crystals the K cation content can be as high as 98% in a swing adsorption process with the residence time for gas contacting the adsorbent material in the adsorbent bed during the adsorption step is being less than 0.5 seconds. With very good crystal quality the cation content for rapid cycle swing adsorption rigorous dehydration processes should be in a range from 35% to 85%. It should be noted that a cation content of 35% is defined to be a K/Al ratio of 0.35.

Example 12 is an example that provides evaluation of fast water kinetics for the zeolite 3A crystals studied in example 1 with a concentration-swing frequency response unit. By incorporation of large 3A synthesized crystals (e.g., with the crystal size approximately 10 times larger), the water transport diffusivity can be obtained through a macroscopic method and thus compared for the 3A samples with different K contents. Preferably, the fast water kinetics may be maintained through micron-size crystals.

To evaluate the water kinetics in 3A crystal, a concentration frequency response method has been utilized in addition to breakthrough method described in example 2. The centration frequency response method is known to those skilled in the art. See e.g., Wang Y, LeVan M D, Mixture diffusion in nanoporous adsorbents: Development of Fickian flux relationship and concentration-swing frequency response method, Industrial & Engineering Chemistry Research. Mar. 28, 2007; 46(7): p. 2141 to 2154. The operation of the method is similar to that noted above in relation to FIG. 5. The helium gas flows through a sparger 508 to provide a saturated vapor feed at pre-set temperature. The flow rate is controlled by MFC 502 to vary sinusoidally. The resulting stream is then mixed with another line of helium with a sinusoidal flow rate controlled by MFC 506 with the same amplitude perturbation, but in reverse phase. A third line of helium, which has the flow rate controlled by MFC 504, is optional to provide a further dilution of feed concentration. The perturbation of flow rate is maintained small to maintain a linear system for analysis. The total pressure is also controlled constantly by the pressure controller 512. Therefore, the total inlet flow rate and the pressure in the adsorption system are constant, but the inlet concentration is a time-varying sinusoidal wave. The concentration variation causes the gases to diffuse into or out of the sample (e.g., 3A crystals), where they adsorb and desorb, which causes the mole fractions outside of the sample and the flow rate out of the sample to change. The mole fractions in the effluent of the sample respond in a periodic sinusoidal manner, which is recorded and measured by a mass spectrometer 514. The amplitude ratio of outlet and inlet composition is used to extract mass transfer rates from the mathematical models. The system may also be configured to perform regeneration in-situ and has flexibility to perform experiments at various concentrations and operating conditions of temperatures and pressures.

To evaluate fast kinetics, the system volume is maintained small (e.g., less than several $cm^3$) to allow fast perturbation and detection up to 1 hertz (Hz) by Agilent MS 5977. By way of example, for the water kinetics study, about 9 milligrams (mg) 3A crystals are packed in a zero length column type bed. This configuration may lessen or eliminate axial dispersion effect and provides a simple model to extract mass transfer rates. The flow-through mode minimizes heat effects which has been shown in previous publications.

Figure 17:
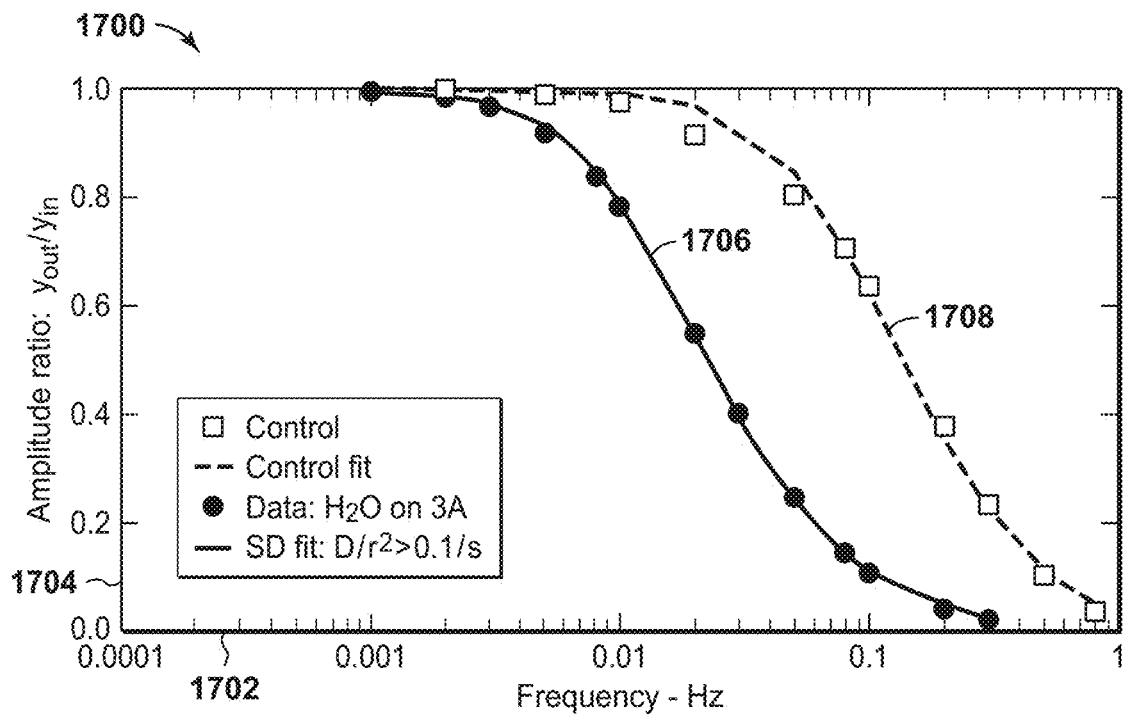
FIG. 17 is an exemplary diagram of frequency response curves for water on 3A crystals and control experiments.

FIG. 17 is an exemplary diagram 1700 of frequency response curves for water on commercial 3A crystals and control experiments at partial water pressure of 0.009 bar. The 3A crystals may have a radius of 1 to 2 micrometers (µm). In diagram 1700, a first response 1706 and a second response 1708 are shown along a frequency axis 1702 in hertz (Hz) and an amplitude ratio axis 1704, which is the ratio of outlet composition to inlet composition ($Y_{out}$ to $Y_{in}$). The first response 1706 and a second response 1708 are results from a concentration frequency response (CSFR) unit for water concentration at 0.01 bar. In this diagram 1700, the axis 1702 is the perturbation frequency and the axis 1704 is the amplitude ratio of outlet and inlet composition. The square symbols represent a control experiment, which is performed in an empty bed, while the circles represent the response curve on a bed having 3A crystals. The first response 1706 is a best fit (e.g., a fit within the threshold) from a diffusion model with diffusion time constants fast than 0.1 second for measurement points (e.g., a surface diffusion (SD) fit: $D/r^2$ greater than 0.1 per second), while the second response 1708 is the control fit to the control points.

Figure 18:
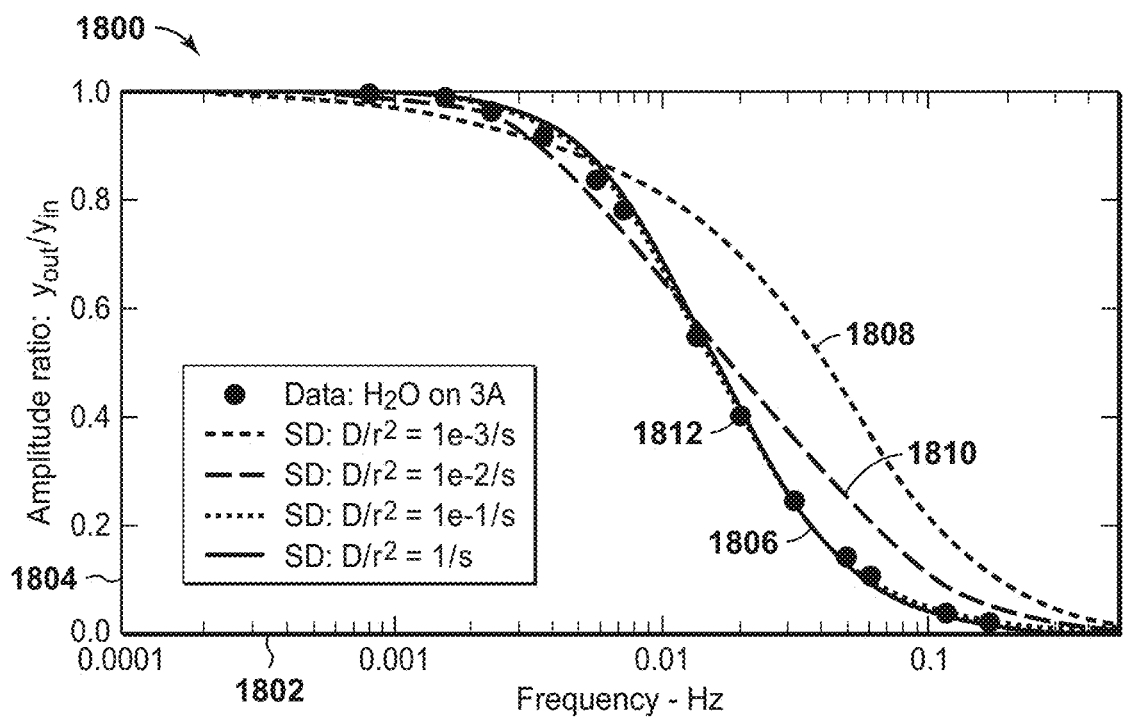
FIG. 18 is an exemplary diagram of a sensitivity analysis for frequency response experiments on $H_2O$ on 3A crystals.

FIG. 18 is an exemplary diagram 1800 of a sensitivity analysis for frequency response experiments on $H_2O$ on commercial 3A crystals at a partial water pressure of 0.009 bar. In diagram 1800, a first response 1806, a second response 1808, a third response 1810 and a fourth response 1812 are shown along a frequency axis 1802 in hertz (Hz) and an amplitude ratio axis 1804, which is the ratio of outlet composition to inlet composition ($Y_{out}$ and $Y_{in}$). This diagram 1800 describes the sensitivity analysis on the system for various diffusion time constants ranging from 1e-3 (e.g., $1\times10^{-3}$) per second to 1 per second. The system clearly differentiates kinetics for diffusion time constants slower than 0.1 second. For example, the second response 1808 represents the curve for 0.001 per second (e.g., a micropore diffusion (MD) or surface diffusion (SD) fit: $D/r^2$ equal to 0.001 per second), which behaves quite differently from the response curve 1810 that represents the curve for 0.01 per second (e.g., a surface diffusion (SD) fit: $D/r^2$ equal to 0.01 per second). However, once kinetics become fast enough, the system reaches the detection limit and thus the curves becomes very similar for the fourth response 1812 that represents 0.1 per second (e.g., a surface diffusion (SD) fit: $D/r^2$ equal to 0.1 per second) and the first response 1806 that represents 1 per second (e.g., a surface diffusion (SD) fit: $D/r^2$ equal to 1 per second). Therefore, it may be validated that the water on 3A crystals has diffusion time constants per radius squared ($D/r^2$) faster than 0.1 per second, wherein the radius is of the crystals. For the sample with crystal radius of about 1 to 2 microns, as shown in FIGS. 2A and 2B, the transport diffusivity of water on 3A is shown to be faster than 1e-13 meter squared per second ($m^2/s$).

Figure 19A:
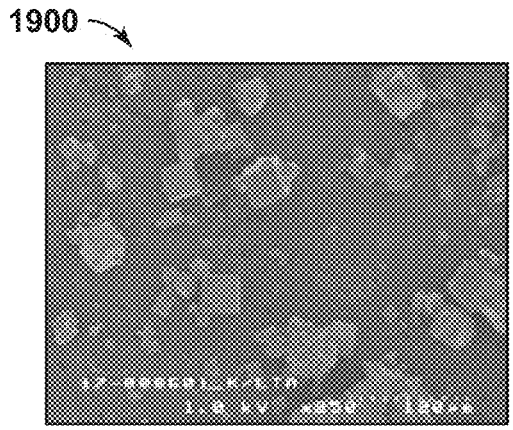
FIGS. 19A and 19B are exemplary SEM diagrams of an adsorbent material.
Figure 19B:
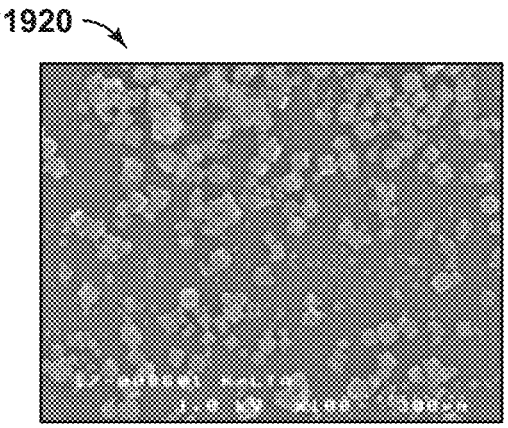

To accurately determinate the transport diffusivity with macroscopic methods, one approach is to synthesize large crystals to aid diffusion measurements in zeolites, as the diffusion time constants decrease with the increase of the radius of the crystal size (e.g., as the square of radius ($r^2$) increases). Thus, larger crystal size 4A has been synthesized and then exchanged to have 3A crystal samples with two levels of potassium K content, such as 48% K content and 81% K content, respectively. FIGS. 19A and 19B are exemplary SEM diagrams 1900 and 1920 of an adsorbent material. The SEM images are shown for these two samples in diagrams 1900 and 1920 with an average size estimated to be in a range between 10 μm and 20 μm.

Figure 20:
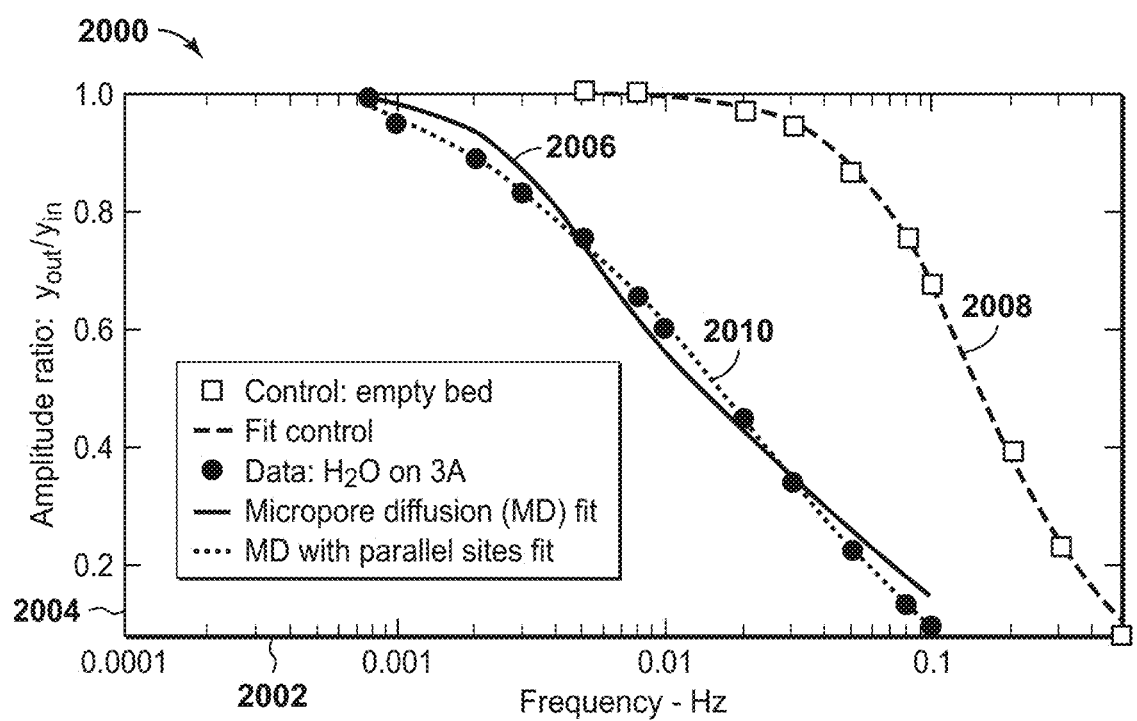
FIG. 20 is an exemplary diagram of frequency response curves for water on larger crystal size 3A with 48% K.

Further, FIG. 20 is an exemplary diagram 2000 of frequency response curves for water on larger crystal size 3A with 48% K at a partial water pressure of 0.009 bar. In diagram 2000, symbols represent experimental data (e.g., circles represent $H_2O$ on 3A and squares represent a control empty bed), while the responses 2006, 2008 and 2010 represent the model fits to the experimental data, which are shown along a frequency axis 2002 in hertz (Hz) and an amplitude ratio axis 2004, which is the ratio of outlet composition to inlet composition ($Y_{out}$ to $Y_{in}$). Specifically, the first response 2006 represents a micropore diffusion (MD) fit, with the second response 2008 represents a fit control and the third response 2010 represents micropore diffusion (MD) fit with two crystal size fit. In the diagram 2000, CSFR results for $H_2O$ on large crystal size 3A with 48% K at 1% water feed concentration. The response 2006 (e.g., the solid line), which is the micropore diffusion model fit, represents the experimental data reasonably well. The extracted diffusion time constants ($D/r^2$) is about 0.007 per second. With estimated crystal size of 12 um, the diffusivity for water on 3A is about 9E-13 $m^2/s$. This suggests that the time to reach 50% equilibrium in the samples with smaller crystals (1 micron radius) is less than 0.033 seconds and the time to reach full equilibrium is less than 0.10 seconds. It is expected to have faster water diffusivity at higher water concentration and slower diffusivity at lower concentration based on Darken equation. See, e.g., Do, D. D., Adsorption Analysis: Equilibrium and Kinetics, 1998, Imperial College Press, London, p. 412. As the frequency response is unique to determine the dominating resistance, the better description from micropore diffusion with parallel sites, shown in black dashed line, independently indicates the existence of the bimodal distribution of crystal sizes, which has been confirmed by the SEMs in FIGS. 19A and 19B. See, e.g., Song L, Rees LVC, Frequency Response Measurements of Diffusion in Microporous Materials, *Mol Sieves*. Vol 7: Springer-Verlag Berlin Heidelberg; 2007: p. 235 to 276. The diffusivity has been extracted to have values of 9e-13 $m^2/s$ with crystal size distributed in two regions, such as one having larger crystal sizes around about 20 um in parallel to small crystals around about 1 micron range.

Figure 21:
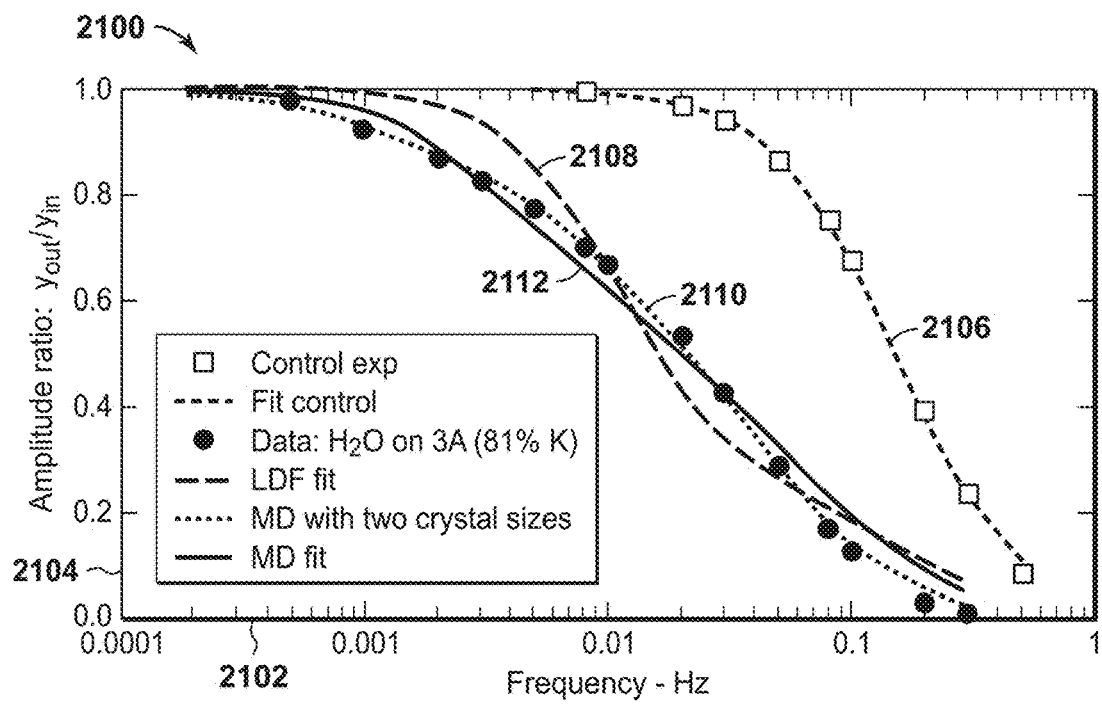
FIG. 21 is an exemplary diagram of frequency response curves for water on larger crystal size 3A with 81% K.

FIG. 21 is an exemplary diagram 2100 of frequency response curves for water on larger crystal size 3A with 81% K. In diagram 2100, symbols represent experimental data (e.g., circles represent $H_2O$ on 3A (81% K) and squares represent a control empty bed), while the responses 2106, 2108, 2110 and 2112 represent the model fits to the experimental data, which are shown along a frequency axis 2102 in hertz (Hz) and an amplitude ratio axis 2104, which is the ratio of outlet composition to inlet composition ($Y_{out}$ to $Y_{in}$) Specifically, the first response 2106 represents a fit control, the second response 2108 represents a linear driving force (LDF) fit, the third response 2110 is a micropore diffusion (MD) with two crystal sizes, and the fourth response 2112 represents a micropore diffusion (MD) fit. In the diagram 2100, a kinetics study on the large crystal size of 3A with higher K content of 81% is shown. The data is best described by the parallel micropore diffusion model, compared to surface barrier model represented by LDF and a single site micropore diffusion model. The extracted diffusivities based on average crystal size is about 5e-13 $m^2/s$, which drops about 50% compared to 3A with lower K content of 48%. Accordingly, the comparison indicates that the diffusivities slightly decrease with increase of K content for the range studied under 80% K.

In certain configurations, the present techniques may be utilized in a swing adsorption process (e.g., a rapid cycle process) for the removal of one of more contaminants from a feed stream. In particular, the present techniques involve a one or more adsorbent bed units to perform a swing adsorption process or groups of adsorbent bed unit configured to perform a series of swing adsorption processes. Each adsorbent bed unit is configured to perform a specific cycle, which may include an adsorption step and a regeneration step. By way of example, the steps may include one or more feed steps, one or more depressurization steps, one or more purge steps, one or more recycle steps, and one or more re-pressurization steps. The adsorption step may involve passing a feed stream through the adsorbent bed to remove contaminants from the feed stream. The regeneration step may include one or more purge steps, one or more blow-down steps, one or more heating steps and/or one or more repressurization steps.

The present techniques may also include adsorbent materials that are configured to perform at various operating conditions. For example, the feed pressure may be based on the preferred adsorption feed pressure, which may be in the range from 400 pounds per square inch absolute (psia) to 1,400 psia, or in the range from 600 psia to 1,200 psia. Also, the purge pressure may be based on the sales pipeline pressure, which may be in the range from 400 psia to 1500 psia, in the range from 600 psia to 1200 psia.

Figure 22:
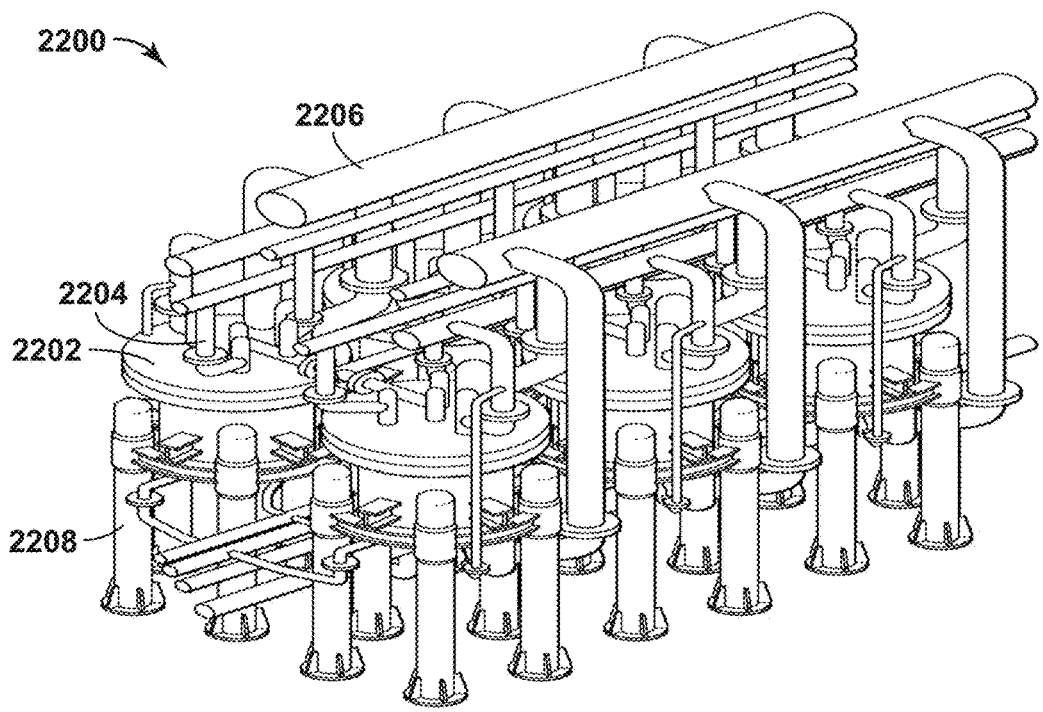
FIG. 22 is a three-dimensional diagram of the swing adsorption system with six adsorbent bed units and interconnecting piping in accordance with an embodiment of the present techniques.

By way of example, FIG. 22 is a three-dimensional diagram of the swing adsorption system 2200 having six adsorbent bed units and interconnecting piping. While this configuration is a specific example, the present techniques broadly relate to adsorbent bed units that can be deployed in a symmetrical orientation, or non-symmetrical orientation and/or combination of a plurality of hardware skids. Further, this specific configuration is for exemplary purposes as other configurations may include different numbers of adsorbent bed units. In this configuration, the adsorbent bed units may include adsorbent materials, which may preferably be formed as adsorbent bed such as a substantially parallel channel contactor.

In this system, the adsorbent bed units, such as adsorbent bed unit 2202, may be configured for a cyclical swing adsorption process for removing contaminants from feed streams (e.g., fluids, gaseous or liquids). For example, the adsorbent bed unit 2202 may include various conduits (e.g., conduit 2204) for managing the flow of fluids through, to or from the adsorbent bed within the adsorbent bed unit 2202. These conduits from the adsorbent bed units 2202 may be coupled to a manifold (e.g., manifold 2206) to distribute the flow of the stream to, from or between components. The adsorbent bed within an adsorbent bed unit may separate one or more contaminants from the feed stream to form a product stream. As may be appreciated, the adsorbent bed units may include other conduits to control other fluid steams as part of the process, such as purge streams, depressurizations streams, and the like. Further, the adsorbent bed unit may also include one or more equalization vessels, such as equalization vessel 2208, which are dedicated to the adsorbent bed unit and may be dedicated to one or more step in the swing adsorption process.

In certain configurations, the adsorbent material may be utilized in an adsorbent bed unit that includes a housing, which may include a head portion and other body portions, that forms a substantially gas impermeable partition. The housing may include the adsorbent material (e.g., formed as an adsorbent bed or substantially parallel channel contactor) disposed within the housing and a plurality of valves (e.g., poppet valves) providing fluid flow passages through openings in the housing between the interior region of the housing and locations external to the interior region of the housing. Each of the poppet valves may include a disk element that is seatable within the head or a disk element that is seatable within a separate valve seat inserted within the head (not shown). The configuration of the poppet valves may be any variety of valve patterns or configuration of types of poppet valves. As an example, the adsorbent bed unit may include one or more poppet valves, each in flow communication with a different conduit associated with different streams. The poppet valves may provide fluid communication between the adsorbent bed or substantially parallel channel contactor and one of the respective conduits, manifolds or headers. The term "in direct flow communication" or "in direct fluid communication" means in direct flow communication without intervening valves or other closure means for obstructing flow. As may be appreciated, other variations may also be envisioned within the scope of the present techniques.

The adsorbent bed or substantially parallel channel contactor comprises adsorbent material formed into the adsorbent material, which is capable of adsorbing one or more components from the feed stream. Such adsorbent materials are selected to be durable against the physical and chemical conditions within the adsorbent bed unit and can include metallic, ceramic, or other materials, depending on the adsorption process.

By way of example, a cyclical rapid cycle swing adsorbent system for removing water from a gaseous feed stream may include one or more adsorbent bed units. Each of the adsorbent bed units may include: a housing forming an interior region; a substantially parallel channel contactor disposed within the interior region of the housing, wherein the substantially parallel channel contactor comprises an adsorbent material being a zeolite 3A having (i) a K to Al atomic ratio is in a range between 0.3 and 1.0; and (ii) a Si to Al atomic ratio is in a range between 1.0 and 1.2; a plurality of valves secured to the housing, wherein each of the plurality of valves is in flow communication with a conduit and configured to control fluid flow along a flow path extending from a location external to the housing through the conduit and to the substantially parallel channel contactor through the valve. The housing may be configured to maintain a pressure within the range between 400 pounds per square inch absolute (psia) and 1500 psia.

Further, additional enhancements may also be provided. For example, the rapid cycle swing adsorption system is configured to perform a rapid cycle pressure swing adsorption process to dehydrate a gaseous feed stream; to perform a rapid cycle temperature swing adsorption process to dehydrate a gaseous feed stream and/or to perform a rapid cycle partial pressure swing adsorption process to dehydrate a gaseous feed stream. Also, the rapid cycle swing adsorption system may be configured to perform a cycle duration that is greater than 2 seconds and less than 300 seconds, and may be configured to provide a residence time for gas in the gaseous feed stream contacting the adsorbent material in the substantially parallel channel contactor during the adsorption step being less than 2.5 seconds, less than 0.5 seconds. The rapid cycle swing adsorption system may be configured to provide a product stream having a concentration of water in the product stream is less than 50 parts per million on a mole basis or less than 1 parts per million on a mole basis.

Further, the additional enhancements may also be provided in the substantially parallel channel contactor. For example, the adsorbent material has the K to Al atomic ratio is in a range between 0.35 and 0.98 or in a range between 0.4 and 0.8. The adsorbent material may have greater than 50% of the non-potassium cations in the zeolite 3A are Na, greater than 80% of the non-potassium cations in the zeolite 3A are Na or greater than 90% of the non-potassium cations in the zeolite 3A are Na. Also, the adsorbent material may be fouling tolerant, wherein fouling tolerant may be defined as the adsorbent material having a $CO_2$ capacity at 25° C. and less than 3 minute equilibration times in isotherm measurement of less than 2 milli moles/gram at 760 torr or may be defined as the adsorbent material having a $CO_2$ capacity at 25° C. and less than 3 minute equilibration times in isotherm measurement of less than 0.5 milli moles/gram at 760 torr. Further, the average size of zeolite aggregates in the zeolite 3A may be less than 40 microns or less than 10 microns. In addition, the zeolite 3A may comprise very good quality crystals or excellent quality crystals.

In yet another configuration, a substantially parallel channel contactor may be formed from the adsorbent material. The adsorbent material is a zeolite 3A having (i) a K to Al atomic ratio is in a range between 0.3 and 1.0; and (ii) a Si to Al atomic ratio is in a range between 1.0 and 1.2. The adsorbent material has the K to Al atomic ratio is in a range between 0.35 and 0.98 or in a range between 0.4 and 0.8. In addition, the zeolite 3A may comprise very good quality crystals or excellent quality crystals.

In certain configurations, the swing adsorption system, which includes the adsorbent material, may process a feed stream that predominately comprises hydrocarbons along with one or more contaminants. For example, the feed stream may be a hydrocarbon containing stream having greater than one volume percent hydrocarbons based on the total volume of the feed stream. Further, the feed stream may include hydrocarbons along with $H_2O$, $H_2S$, and $CO_2$. By way of example, the stream may include $H_2O$ as one of the one or more contaminants and the gaseous feed stream may comprise $H_2O$ in the range of 50 parts per million (ppm) molar to 1,500 ppm molar; or in the range of 500 ppm to 1,500 ppm molar. Moreover, the feed stream may include hydrocarbons and $H_2O$, wherein the $H_2O$ is one of the one or more contaminants and the feed stream comprises $H_2O$ in the range of two ppm molar to saturation levels in the feed stream.

In addition, the present techniques may provide an adsorption system that utilizes a rapid cycle swing adsorption process to separate acid gas contaminants from feed streams, such as acid gas from hydrocarbon streams. Acid gas removal technology may be useful for gas reserves exhibit higher concentrations of acid gas (e.g., sour gas resources). Hydrocarbon feed streams vary widely in amount of acid gas, such as from several parts per million acid gas to 90 volume percent (vol. %) acid gas. Non-limiting examples of acid gas concentrations from exemplary gas reserves include concentrations of at least: (a) 1 vol. % $H_2S$, 5 vol. % $CO_2$, (b) 1 vol. % $H_2S$, 15 vol. % $CO_2$, (c) 1 vol. % $H_2S$, 60 vol. % $CO_2$, (d) 15 vol. % $H_2S$, 15 vol. % $CO_2$, and (e) 15 vol. % $H_2S$, 30 vol. % $CO_2$. Accordingly, the present techniques may include equipment to remove various contaminants, such as $H_2S$ and $CO_2$ to desired levels. In particular, the $H_2S$ may be lowered to levels less than 4 ppm, while the $CO_2$ may be lowered to levels less than 1.8 molar percent (%) or, preferably, less than 50 ppm. As a further example, the acid gas removal system may remove $CO_2$ to LNG specifications (e.g., less than or equal to 50 parts per million volume (ppmv) $CO_2$).

In certain configurations, the adsorbent material may be used in a rapid cycle swing adsorption process, such as a rapid cycle PSA process, to remove moisture from the feed stream. The specific level may be related to dew point of desired output product (e.g., the water content should be lower than the water content required to obtain a dew point below the lowest temperature of the stream in subsequent process and is related to the feed pressure). As a first approximation, and not accounting for fugacity corrections as a function of pressure, the water concentration in ppm that yields a certain dew point varies inversely with the pressure. For example, the output stream from the adsorbent bed may be configured to be the cryogenic processing feed stream, which satisfies the cryogenic processing specifications (e.g., approximately −150° F. (−101.1° C.) dew point for NGL processes or approximately −60° F. (−51.1° C.) for Controlled Freeze Zone (CFZ) processes. The cryogenic processing feed stream specification may include a water content in the stream (e.g., output stream from the adsorbent bed or feed stream to the to be cryogenic processing) to be in the range between 0.0 ppm and 10 ppm, in the range between 0.0 ppm and 5.0 ppm, in the range between 0.0 ppm and 2.0 ppm, or in the range between 0.0 ppm and 1.0 ppm. The resulting output stream from the adsorbent beds during the purge step may include a water content in the stream to be in the range between 0.0 ppm and 7 pounds per standard cubic feet (1b/MSCF).

In one or more embodiments, the present techniques can be used for any type of swing adsorption process. Non-limiting swing adsorption processes for which the present techniques may include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes, such as pressure and/or temperature swing adsorption. Exemplary swing adsorption processes are described in U.S. Patent Application Publication Nos. 2008/0282892, 2008/0282887, 2008/0282886, 2008/0282885, 2008/0282884 and 2014/0013955 and U.S. Ser. Nos. 15/233,617; 15/233,623; 15/233,631 and 16/233,640, which are each herein incorporated by reference in their entirety. However, rapid cycle may be preferred to process the stream. However, the adsorbent materials may be preferably utilized with rapid cycle swing adsorption processes.

Further, in certain configurations of the system, the present techniques may include a specific process flow to remove contaminants, such as water ($H_2O$) or acid gas, in the swing adsorption system. For example, the process may include an adsorbent step and a regeneration step, which form the cycle. The adsorbent step may include passing a feed stream at a feed pressure and feed temperature through an adsorbent bed unit having an adsorbent material (e.g., adsorbent bed or substantially parallel channel contactor) to separate one or more contaminants from the feed stream to form a product stream. The feed stream may be passed through the substantially parallel channel contactor in a forward direction (e.g., from the feed end of the substantially parallel channel contactor to the product end of the substantially parallel channel contactor). Then, the flow of the feed stream may be interrupted for a regeneration step. The regeneration step may include one or more depressurization steps, one or more purge steps and/or one or more re-pressurization steps. The depressurization steps may include reducing the pressure of the adsorbent bed unit by a predetermined amount for each successive depressurization step, which may be a single step and/or may be a blowdown step. The depressurization step may be provided in a forward direction or may preferably be provided in a countercurrent direction (e.g., from the product end of the substantially parallel channel contactor to the feed end of the substantially parallel channel contactor). The purge step may include passing a purge stream into the adsorbent bed unit, which may be a once through purge step and the purge stream may be provided in countercurrent flow relative to the feed stream. The purge product stream from the purge step may be conducted away and recycled to another system or in the system. Then, the one or more re-pressurization steps may be performed, wherein the pressure within the adsorbent bed unit is increased with each re-pressurization step by a predetermined amount with each successive re-pressurization step. Then, the cycle may be repeated for additional feed streams and/or the cycle may be adjusted to perform a different cycle for a second configuration. The cycle duration may be for a period greater than 1 second and less than 600 seconds, for a period greater than 2 second and less than 300 seconds, for a period greater than 2 second and less than 200 seconds, or for a period greater than 2 second and less than 90 seconds.

Also, the present techniques may be integrated into a various configurations, which may include a variety of compositions for the streams. Adsorptive separation processes, apparatus, and systems, as described above, are useful for development and production of hydrocarbons, such as gas and oil processing. Particularly, the provided processes, apparatus, and systems are useful for the rapid, large scale, efficient separation of a variety of target gases from gas mixtures. In particular, the processes, apparatus, and systems may be used to prepare feed products (e.g., natural gas products) by removing contaminants and heavy hydrocarbons (e.g., hydrocarbons having at least two carbon atoms). The provided processes, apparatus, and systems are useful for preparing gaseous feed streams for use in utilities, including separation applications. The separation applications may include dew point control; sweetening and/or detoxification; corrosion protection and/or control; dehydration; heating value; conditioning; and/or purification. Examples of utilities that utilize one or more separation applications include generation of fuel gas; seal gas; non-potable water; blanket gas; instrument and control gas; refrigerant; inert gas; and/or hydrocarbon recovery.

To provide fluid flow paths through the adsorbent material in an adsorbent bed unit, valve assemblies may include poppet valves, which each may include a disk element connected to a stem element which can be positioned within a bushing or valve guide. The stem element may be connected to an actuating means, such as actuating means, which is configured to have the respective valve impart linear motion to the respective stem. As may be appreciated, the actuating means may be operated independently for different steps in the process to activate a single valve or a single actuating means may be utilized to control two or more valves. Further, while the openings may be substantially similar in size, the openings and inlet valves for inlet manifolds may have a smaller diameter than those for outlet manifolds, given that the gas volumes passing through the inlets may tend to be lower than product volumes passing through the outlets. Further, while this configuration has valve assemblies, the number and operation of the valves may vary (e.g., the number of valves) based on the specific cycle being performed.

In one or more embodiments, the rapid cycle swing adsorption process that utilize the adsorbent materials in the present techniques may include rapid cycle temperature swing adsorption (RCTSA) and/or rapid cycle pressure swing adsorption (RCPSA). For example, the total cycle times may be less than 600 seconds, less than 300 seconds, preferably less than 200 seconds, more preferably less than 90 seconds, and even more preferably less than 60 seconds.

In view of the many possible embodiments to which the principles of the disclosed invention may be applied, it should be recognized that the illustrative embodiments are only preferred examples of the invention and should not be taken as limiting the scope of the invention.

What is claimed is:

1. A cyclical rapid cycle swing adsorbent system for removing water from a gaseous feed stream, the rapid cycle swing adsorbent system comprising one or more adsorbent bed units that each comprise:
   a housing forming an interior region;
   a substantially parallel channel contactor disposed within the interior region of the housing, wherein the substantially parallel channel contactor comprises an adsorbent material being a zeolite 3A having (i) a K to Al atomic ratio is in a range between 0.3 and 1.0; and (ii) a Si to Al atomic ratio is in a range between 1.0 and 1.2;
   a plurality of valves secured to the housing, wherein each of the plurality of valves is in flow communication with a conduit and configured to control fluid flow along a flow path extending from a location external to the housing through the conduit and to the substantially parallel channel contactor through the valve; and
   wherein the rapid cycle swing adsorption system is configured to provide a residence time for gas in the gaseous feed stream contacting the adsorbent material in the substantially parallel channel contactor during the adsorption step being less than 2.5 seconds.

2. The cyclical rapid cycle swing adsorbent system of claim 1, wherein the rapid cycle swing adsorption system is configured to perform a rapid cycle pressure swing adsorption process to dehydrate a gaseous feed stream.

3. The cyclical rapid cycle swing adsorbent system of claim 1, wherein the rapid cycle swing adsorption system is configured to perform a rapid cycle temperature swing adsorption process to dehydrate a gaseous feed stream.

4. The cyclical rapid cycle swing adsorbent system of claim 1, wherein the rapid cycle swing adsorption system is configured to perform a rapid cycle partial pressure swing adsorption process to dehydrate a gaseous feed stream.

5. The cyclical rapid cycle swing adsorbent system of claim 1, wherein the rapid cycle swing adsorption system is configured to perform for a cycle duration that is greater than 2 seconds and less than 300 seconds.

6. The cyclical rapid cycle swing adsorbent system of claim 5, wherein the rapid cycle swing adsorption system is configured to provide a residence time for gas in the gaseous feed stream contacting the adsorbent material in the substantially parallel channel contactor during the adsorption step being less than 0.5 seconds.

7. The cyclical rapid cycle swing adsorbent system of claim 1, wherein the adsorbent material has the K to Al atomic ratio is in a range between 0.35 and 0.98.

8. The cyclical rapid cycle swing adsorbent system of claim 1, wherein the adsorbent material has the K to Al atomic ratio is in a range between 0.4 and 0.8.

9. The cyclical rapid cycle swing adsorbent system of claim 1, wherein the adsorbent material has greater than 80% of the non-potassium cations in the zeolite 3A are Sodium (Na).

10. The cyclical rapid cycle swing adsorbent system of claim 1, wherein the adsorbent material has greater than 90% of the non-potassium cations in the zeolite 3A are Sodium (Na).

11. The cyclical rapid cycle swing adsorbent system of claim 1, wherein the adsorbent material is fouling tolerant, wherein fouling tolerant is defined as the adsorbent material having a $CO_2$ capacity at 25° C. and less than 3 minute equilibration times in isotherm measurement of less than 2 milli moles/gram at 760 torr.

12. The cyclical rapid cycle swing adsorbent system of claim 1, wherein the adsorbent material is fouling tolerant, wherein fouling tolerant is defined as the adsorbent material having a $CO_2$ capacity at 25° C. and less than 3 minute equilibration times in isotherm measurement of less than 0.5 milli moles/gram at 760 torr.

13. The cyclical rapid cycle swing adsorbent system of claim 1, wherein mass average size of zeolite aggregates in the zeolite 3A are less than 40 microns.

14. The cyclical rapid cycle swing adsorbent system of claim 1, wherein mass average size of zeolite aggregates in the zeolite 3A are less than 10 microns.

15. The cyclical rapid cycle swing adsorbent system of claim 1, wherein mass average size of zeolite aggregates in the zeolite 3A are less than 5 microns.

16. A substantially parallel channel contactor comprising an adsorbent material, wherein the adsorbent material is a zeolite 3A having (i) a K to Al atomic ratio is in a range between 0.3 and 1.0; and (ii) a Si to Al atomic ratio is in a range between 1.0 and 1.2.

17. The substantially parallel channel contactor of claim 16, wherein the adsorbent material has the K to Al atomic ratio is in a range between 0.35 and 0.98.

18. The substantially parallel channel contactor of claim 16, wherein the adsorbent material has the K to Al atomic ratio is in a range between 0.4 and 0.8.

19. The substantially parallel channel contactor of claim 17, wherein the adsorbent material has greater than 80% of the non-potassium cations in the zeolite 3A are Sodium (Na).

20. The substantially parallel channel contactor of claim 17, wherein the adsorbent material has greater than 90% of the non-potassium cations in the zeolite 3A are Sodium (Na).

21. The substantially parallel channel contactor of claim 16, wherein mass average size of zeolite aggregates in the zeolite 3A are less than 10 microns.

22. The substantially parallel channel contactor of claim 16, wherein mass average size of zeolite aggregates in the zeolite 3A are less than 5 microns.

23. The substantially parallel channel contactor of claim 16, wherein the adsorbent material is fouling tolerant, wherein fouling tolerant is defined as the adsorbent material having a $CO_2$ capacity at 25° C. and less than 3 minute equilibration times in isotherm measurement of less than 2 milli moles/gram at 760 torr.

24. The substantially parallel channel contactor of claim 16, wherein the adsorbent material is fouling tolerant, wherein fouling tolerant is defined as the adsorbent material having a $CO_2$ capacity at 25° C. and less than 3 minute equilibration times in isotherm measurement of less than 0.5 milli moles/gram at 760 torr.

* * * * *